(12) United States Patent
Woods et al.

(10) Patent No.: US 8,107,535 B2
(45) Date of Patent: Jan. 31, 2012

(54) METHOD AND APPARATUS FOR SCALABLE MOTION VECTOR CODING

(75) Inventors: John W. Woods, Clifton Park, NY (US); Yongjun Wu, Redmond, WA (US)

(73) Assignee: Rensselaer Polytechnic Institute (RPI), Troy, NY (US)

( * ) Notice: Subject to any disclaimer, the term of this patent is extended or adjusted under 35 U.S.C. 154(b) by 1728 days.

(21) Appl. No.: 11/370,948

(22) Filed: Mar. 9, 2006

(65) Prior Publication Data

US 2006/0193388 A1 Aug. 31, 2006

Related U.S. Application Data

(63) Continuation-in-part of application No. 10/965,237, filed on Oct. 14, 2004, which is a continuation-in-part of application No. 10/864,833, filed on Jun. 9, 2004, now Pat. No. 7,627,040.

(60) Provisional application No. 60/659,423, filed on Mar. 9, 2005, provisional application No. 60/477,183, filed on Jun. 10, 2003, provisional application No. 60/512,120, filed on Oct. 17, 2003.

(51) Int. Cl.
*H04N 7/18* (2006.01)

(52) U.S. Cl. .......... 375/240.16; 375/240.25; 375/240.26

(58) Field of Classification Search . 375/240.01–240.29
See application file for complete search history.

(56) References Cited

U.S. PATENT DOCUMENTS

| | | | |
|---|---|---|---|
| 4,849,810 A | 7/1989 | Ericsson | |
| 5,408,274 A | 4/1995 | Chang et al. | |
| 5,757,969 A | 5/1998 | Kim | |
| 6,108,448 A | 8/2000 | Song et al. | |
| 7,463,683 B2 * | 12/2008 | Van Der Schaar et al. | 375/240.1 |
| 2003/0202597 A1 | 10/2003 | Turaga et al. | |
| 2003/0202598 A1 | 10/2003 | Turaga et al. | |
| 2003/0202599 A1 | 10/2003 | Turaga et al. | |
| 2004/0008785 A1 | 1/2004 | Turaga et al. | |

FOREIGN PATENT DOCUMENTS

| | | |
|---|---|---|
| KR | 2001-0105361 A | 11/2001 |
| KR | 2002-0081777 A | 10/2002 |
| WO | WO 01/49037 A1 | 7/2001 |
| WO | WO 03/017672 A2 | 2/2003 |

OTHER PUBLICATIONS

Peisong Chen, et al., "Bidirectional MC-EZBC With Lifting Implementation", 2004 IEEE, pp. 1183, 1194.
Michael T. Orchard, et al., "Overlapped Block Motion Compensation: An Estimation-Theoretic Approach", 1994 IEEE, pp. 693699.

(Continued)

*Primary Examiner* — Andy Rao
(74) *Attorney, Agent, or Firm* — Sughrue Mion, PLLC

(57) ABSTRACT

A method and apparatus for scalable coding of a motion vector generated during motion estimation, in which a generated motion vector field is separated into a base layer and an enhancement layer according to pixel accuracies to obtain a layered structure for a motion vector. In addition, the motion vector field has a layered structure including a base layer composed of motion vectors of blocks larger than or equal to a predetermined size and at least one enhancement layer composed of motion vectors of blocks smaller than a predetermined size.

24 Claims, 36 Drawing Sheets

OTHER PUBLICATIONS

Ostermann and Zhang, "Video Processing and Comunications", 2002, pp. 182-187.

S. Choi et al., "Motion-compensated 3-D subband coding of video", IEEE Trans. Image Processing, vol. 8, pp. 155-167, Feb. 1999.

Shih-Ta Hsiang, et al., "Embedded video coding using invertible motion compensated 3-D subband/wavelet filter bank", Signal Processing: Image Communication, vol. 16, pp. 705-724, May 2001.

J.-R. Ohm, "Three-dimensional subband coding with motion compensation,"IEEE Trans. Image Processing, vol. 3, pp. 559-571, Sep. 1994.

B. Pesquet-Popescu et al., "Three-dimensional lifting schemes for motion compensated video compression,"Proc. ICASSP, pp. 1793-1796, May 2001.

L. Luo et al., "Motion Compensated Lifting Wavelet and Its Application to Video Coding", Proc. ICME'o 1, Tokyo, Japan, Aug. 2001.

P. Chen et al., Improved MC-EZBC with Quarter-pixel Motion Vectors, ISO/IECJTCI/SC29/WG11MPEG2002/M8366, May 2002, Fairfax, VA.

T. Rusert, et al., Recent Improvements to MC-EZBC, ISO/IEC JTC1/SC29/WG11MPEG2002/M9232, Dec. 2002, Awaji Island, Japan.

Y. Wu, et al., Recent Improvements to the MC-EZBC Video Coder, ISO/IEC JTC1/SC29/WG11MPEG2003/M10396, Dec. 2003, Hawaii, USA.

* cited by examiner

| | u[0] | u[1] | u[2] | u[3] | |
|---|---|---|---|---|---|
| lf[0] | in[0] | in[1] | in[2] | in[3] | r[0] |
| lf[1] | in[4] | in[5] | in[6] | in[7] | r[1] |
| lf[2] | in[8] | in[9] | in[10] | in[11] | r[2] |
| lf[3] | in[12] | in[13] | in[14] | in[15] | r[3] |
| | lw[0] | lw[1] | lw[2] | lw[3] | |

FIG. 7A

| | | | |
|---|---|---|---|
| 45 → 5 | 4 | 3 | 2 |

40 →

| | | | |
|---|---|---|---|
| 41 → 5 | 3 | 2 | 1 |
| 42 → 3 | 3 | 2 | 2 |
| 43 → 4 | 4 | 3 | 2 |
| 44 → 5 | 4 | 3 | 3 |

| | | | |
|---|---|---|---|
| 41 → 5 | 4 | 3 | 2 |
| 42 → 5 | 4 | 3 | 2 |
| 43 → 5 | 4 | 3 | 2 |
| 44 → 5 | 4 | 3 | 2 |

FIG. 7C

| | | | |
|---|---|---|---|
| 0 | -1 | -1 | -1 |
| -2 | -1 | -1 | 0 |
| -1 | 0 | 0 | 0 |
| 0 | 0 | 0 | +1 |

FIG. 9A

| P11 | P12 | P13 | P14 | P15 | P16 | P17 | P18 | P19 |
|-----|-----|-----|-----|-----|-----|-----|-----|-----|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

FIG. 9B

| P11 | P12 | P13 | P14 | P15 | P16 | P17 | P18 | P19 |
|---|---|---|---|---|---|---|---|---|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

FIG. 9D

| P11 | P12 | P13 | P14 | P15 | P16 | P17 | P18 | P19 |
|-----|-----|-----|-----|-----|-----|-----|-----|-----|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

FIG. 9E

| P11 | P12 | P13 | P14 | P15 | P16 | P17 | P18 | P19 |
|---|---|---|---|---|---|---|---|---|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

FIG. 9F

| P11 | P12 | P13 | P14 61 | P15 | P16 | P17 | P18 | P19 |
|---|---|---|---|---|---|---|---|---|
| P21 | P22 101 | P23 | P24 | P25 | P26 | P27 | P28 | P29 |
| P31 | P32 102 | P33 | P34 | P35 | P36 | P37 | P38 | P39 |
| P41 | P42 103 | P43 | P44 | P45 | P46 | P47 | P48 | P49 |
| P51 | P52 104 | P53 | P54 | P55 | P56 | P57 | P58 | P59 |
| P61 | P62 105 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

FIG. 10

| P11 | P12 | P13 | P14 61 | P15 | P16 | P17 | P18 | P19 |
|---|---|---|---|---|---|---|---|---|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 /121 | P53 | P54 | P55 | P56 | P57 | P58 | P59 |
| P61 | P62 /122 | P63 | P64 | P65 | P66 | P67 | P68 | P69 |
| P71 | P72 /123 | P73 | P74 | P75 | P76 | P77 | P78 | P79 |
| P81 | P82 /θ)124 | P83 | P84 | P85 | P86 | P87 | P88 | P89 |
| P91 | P92 | P93 | P94 | P95 | P96 | P97 | P98 | P99 |

60

FIG. 18A $$\begin{bmatrix} 2 & 2 & 2 & 3 & 3 & 2 & 2 & 2 \\ 1 & 1 & 1 & 2 & 2 & 1 & 1 & 1 \\ 1 & 1 & 1 & 1 & 1 & 1 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$ UPPER 274C $$\begin{bmatrix} 2 & 1 & 1 & 0 & 0 & 0 & 0 & 0 \\ 2 & 1 & 1 & 0 & 0 & 0 & 0 & 0 \\ 2 & 1 & 1 & 0 & 0 & 0 & 0 & 0 \\ 3 & 2 & 1 & 0 & 0 & 0 & 0 & 0 \\ 3 & 2 & 1 & 0 & 0 & 0 & 0 & 0 \\ 2 & 1 & 1 & 0 & 0 & 0 & 0 & 0 \\ 2 & 1 & 1 & 0 & 0 & 0 & 0 & 0 \\ 2 & 1 & 1 & 0 & 0 & 0 & 0 & 0 \end{bmatrix}$$ LEFT 273C
$$\begin{bmatrix} 4 & 5 & 5 & 5 & 5 & 5 & 5 & 4 \\ 5 & 6 & 6 & 6 & 6 & 6 & 6 & 5 \\ 5 & 6 & 6 & 7 & 7 & 6 & 6 & 5 \\ 5 & 6 & 7 & 8 & 8 & 7 & 6 & 5 \\ 5 & 6 & 7 & 8 & 8 & 7 & 6 & 5 \\ 5 & 6 & 6 & 7 & 7 & 6 & 6 & 5 \\ 5 & 6 & 6 & 6 & 6 & 6 & 6 & 5 \\ 4 & 5 & 5 & 5 & 5 & 5 & 5 & 4 \end{bmatrix}$$ SELF 270C
$$\begin{bmatrix} 0 & 0 & 0 & 0 & 0 & 1 & 1 & 2 \\ 0 & 0 & 0 & 0 & 0 & 1 & 1 & 2 \\ 0 & 0 & 0 & 0 & 0 & 1 & 1 & 2 \\ 0 & 0 & 0 & 0 & 0 & 1 & 2 & 3 \\ 0 & 0 & 0 & 0 & 0 & 1 & 2 & 3 \\ 0 & 0 & 0 & 0 & 0 & 1 & 1 & 2 \\ 0 & 0 & 0 & 0 & 0 & 1 & 1 & 2 \\ 0 & 0 & 0 & 0 & 0 & 1 & 1 & 2 \end{bmatrix}$$ RIGHT 271C $$\begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 1 & 1 & 1 & 1 & 1 & 1 & 1 \\ 1 & 1 & 1 & 2 & 2 & 1 & 1 & 1 \\ 2 & 2 & 2 & 3 & 3 & 2 & 2 & 2 \end{bmatrix}$$ LOWER 272C

FIG. 18B $$\text{UPPER } 274D = \begin{bmatrix} 2.5 & 3.0 & 3.0 & 4.5 & 4.5 & 3.0 & 3.0 & 2.5 \\ 1.5 & 1.5 & 1.5 & 3.0 & 3.0 & 1.5 & 1.5 & 1.5 \\ 1.5 & 1.5 & 1.5 & 1.5 & 1.5 & 1.5 & 1.5 & 1.5 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$\text{LEFT } 273D = \begin{bmatrix} 2.5 & 1.5 & 1.5 & 0 & 0 & 0 & 0 & 0 \\ 3.0 & 1.5 & 1.5 & 0 & 0 & 0 & 0 & 0 \\ 3.0 & 1.5 & 1.5 & 0 & 0 & 0 & 0 & 0 \\ 4.5 & 3.0 & 1.5 & 0 & 0 & 0 & 0 & 0 \\ 4.5 & 3.0 & 1.5 & 0 & 0 & 0 & 0 & 0 \\ 3.0 & 1.5 & 1.5 & 0 & 0 & 0 & 0 & 0 \\ 3.0 & 1.5 & 1.5 & 0 & 0 & 0 & 0 & 0 \\ 2.5 & 1.5 & 1.5 & 0 & 0 & 0 & 0 & 0 \end{bmatrix}$$

$$\text{SELF } 270D = \begin{bmatrix} 3.0 & 3.5 & 3.5 & 3.5 & 3.5 & 3.5 & 3.5 & 3.0 \\ 3.5 & 5.0 & 5.0 & 5.0 & 5.0 & 5.0 & 5.0 & 3.5 \\ 3.5 & 5.0 & 5.0 & 6.5 & 6.5 & 5.0 & 5.0 & 3.5 \\ 3.5 & 5.0 & 6.5 & 8.0 & 8.0 & 6.5 & 5.0 & 3.5 \\ 3.5 & 5.0 & 6.5 & 8.0 & 8.0 & 6.5 & 5.0 & 3.5 \\ 3.5 & 5.0 & 5.0 & 6.5 & 6.5 & 5.0 & 5.0 & 3.5 \\ 3.5 & 5.0 & 5.0 & 5.0 & 5.0 & 5.0 & 5.0 & 3.5 \\ 3.0 & 3.5 & 3.5 & 3.5 & 3.5 & 3.5 & 3.5 & 3.0 \end{bmatrix}$$

$$\text{RIGHT } 271D = \begin{bmatrix} 0 & 0 & 0 & 0 & 0 & 1.5 & 1.5 & 2.5 \\ 0 & 0 & 0 & 0 & 0 & 1.5 & 1.5 & 3.0 \\ 0 & 0 & 0 & 0 & 0 & 1.5 & 1.5 & 3.0 \\ 0 & 0 & 0 & 0 & 0 & 1.5 & 3.0 & 4.5 \\ 0 & 0 & 0 & 0 & 0 & 1.5 & 3.0 & 4.5 \\ 0 & 0 & 0 & 0 & 0 & 1.5 & 1.5 & 3.0 \\ 0 & 0 & 0 & 0 & 0 & 1.5 & 1.5 & 3.0 \\ 0 & 0 & 0 & 0 & 0 & 1.5 & 1.5 & 2.5 \end{bmatrix}$$

$$\text{BOTTOM } 272D = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1.5 & 1.5 & 1.5 & 1.5 & 1.5 & 1.5 & 1.5 & 1.5 \\ 1.5 & 1.5 & 1.5 & 3.0 & 3.0 & 1.5 & 1.5 & 1.5 \\ 2.5 & 3.0 & 3.0 & 4.5 & 4.5 & 3.0 & 3.0 & 2.5 \end{bmatrix}$$

```
   ┌─290A──────────┬─292A──────────┐  ┌─291A──────┐
   │ 4  5  5  5   │ 5  5  5  4    │  │ 0  1  1  2 │
   │ 5  6  6  6   │ 6  6  6  5    │  │ 0  1  1  2 │
   │ 5  6  6  7   │ 7  6  6  5    │  │ 0  1  1  2 │
   │ 5  6  7  8   │ 8  7  6  5    │  │ 0  1  2  3 │
   │ 5  6  7  8   │ 8  7  6  5    │  └────────────┘
   │ 5  6  6  7   │ 7  6  6  5    │
   │ 5  6  6  6   │ 6  6  6  5    │
   │ 4  5  5  5   │ 5  5  5  4    │
   └──────────────┴───────────────┘
```

```
   ┌─290A──────────┬─292A──────────┐  ┌─291A──────┐
   │ 4  5  5  5   │ 5  6  6  6    │  │ 0  0  0  0 │
   │ 5  6  6  6   │ 6  7  7  7    │  │ 0  0  0  0 │
   │ 5  6  6  7   │ 7  7  7  7    │  │ 0  0  0  0 │
   │ 5  6  7  8   │ 8  8  8  8    │  │ 0  0  0  0 │
   │ 5  6  7  8   │ 8  7  6  5    │  └────────────┘
   │ 5  6  6  7   │ 7  6  6  5    │
   │ 5  6  6  6   │ 6  6  6  5    │
   │ 4  5  5  5   │ 5  5  5  4    │
   └──────────────┴───────────────┘
```

METHOD AND APPARATUS FOR SCALABLE MOTION VECTOR CODING

CROSS REFERENCE TO RELATED APPLICATIONS

The present application claims priority from U.S. Provisional Application No. 60/659,423 filed Mar. 9, 2005, the disclosure of which is incorporated herein by reference in its entirety. The present application is also a continuation-in-part application of U.S. application Ser. No. 10/864,833 filed Jun. 9, 2004 now U.S. Pat. No. 7,627,040 which claims priority from U.S. Provisional Application No. 60/477,183 filed Jun. 10, 2003, the disclosures of which are incorporated herein by reference in their entirety. The present application is also a continuation-in-part application of U.S. application Ser. No. 10/965,237 filed Oct. 14, 2004, which claims priority from U.S. Provisional Application 60/512,120, filed Oct. 17, 2003, the disclosures of which are incorporated herein by reference in their entirety.

BACKGROUND OF THE INVENTION

1. Technical Field

Methods and apparatuses consistent with the present invention relate to scalable video coding, and more specifically, to scalable motion vector coding by providing motion vector with scalability, i.e., adjusting the amount of bit allotted to motion vector and coding motion vector residual based on Context Based Adaptive Binary Arithmetic Coder (CABAC).

2. Related Art

In scalable video coding, bitstream is generally divided into motion vector information (motion vector, divided block map, etc) and texture information including residual obtained by motion estimation. Motion information is losslessly compressed. However, currently used motion vector coding in the context of scalable video coders collects all the motion information together and places it at the beginning of the compressed bitstream. Because it contains the motion vectors at the highest frame rate and for the best image quality, this portion of data takes a large amount of bits. Hence, the coding performance at low bit-rates is relatively poor because the truncated bitstream contains mostly the motion information. Thus, there is a need for dividing motion information according to its importance and transmitting a portion of motion vector depending on channel condition in the context of scalable video coders.

SUMMARY OF THE INVENTION

The present invention provides a scalable motion vector coding method comprising: estimating a motion vector of a current block with a first pixel accuracy; separating the estimated motion vector into a base layer's motion vector component having a second pixel accuracy and an enhancement layer's motion vector component having a third pixel accuracy; and coding the base layer's motion vector component and the enhancement layer's motion vector component respectively.

The present invention provides a scalable motion vector coder comprising: a motion estimation unit estimating a motion vector of a current block with a first pixel accuracy; a separating unit separating the estimated lu motion vector into a base layer's motion vector component having a second pixel accuracy and an enhancement layer's motion vector component having a third pixel accuracy; and a motion vector coding unit coding the base layer's motion vector component and the enhancement layer's motion vector component.

The present invention provides a scalable motion vector coding method comprising: dividing a current frame into a plurality of blocks and performing motion estimation to determine a motion vector for each of the divided blocks; forming a base layer including motion vectors of blocks larger than or equal to a predetermined size and at least one enhancement layer including motion vectors of blocks smaller than the predetermined size, using the motion vectors of the divided blocks; and coding the base layer and the enhancement layer, respectively.

The present invention provides a scalable motion vector coder comprising: a motion estimation unit dividing a current frame into a plurality of blocks and performing motion estimation to determine a motion vector for each of the divided blocks; a layer forming unit forming a base layer including j motion vectors of blocks larger than or equal to a predetermined size and at least one enhancement layer including motion vectors of blocks smaller than the predetermined size, using the motion vectors of the divided blocks; and a layered motion vector coding unit coding the base layer and the enhancement layer, respectively.

The present invention provides a scalable motion vector decoding method for decoding a motion vector coded into a base layer and an enhancement layer, comprising: extracting motion vector information by analyzing an input bitstream; restoring motion vector components of the base layer and the enhancement layer from the extracted motion vector information; and summing the restored motion vector components of the base layer and the enhancement layer to output a layered motion vector, wherein the base layer has a pixel accuracy that is lower than that of an estimated motion vector and the enhancement layer has a pixel accuracy that is higher than that of the motion vector component of the base layer.

The present invention provides a scalable motion vector decoder for decoding a motion vector coded into a base layer and an enhancement layer, comprising: a motion vector restoring unit extracting motion vector information by analyzing an input bitstream and restoring motion vector components of the base layer and the enhancement layer from the extracted motion vector information; and a summing unit summing the restored motion vector components of the base layer and the enhancement layer to output a layered motion vector, wherein the base layer has a pixel accuracy that is lower than that of an estimated motion vector and the enhancement layer has a pixel accuracy that is higher than that of the motion vector component of the base layer.

The present invention provides a scalable motion vector decoding method for decoding a motion vector coded into a base layer and an enhancement layer, comprising: extracting motion vector information by analyzing an input bitstream; restoring motion vector components of the base layer and the enhancement layer from the extracted motion vector information; and summing the restored motion vector components of the base layer and the enhancement layer to output a layered motion vector, wherein the base layer includes information about motion vectors of blocks larger than or equal to a predetermined size and the enhancement layer includes information about motion vectors of blocks smaller than the predetermined size.

The present invention provides a scalable motion vector decoder for decoding a motion vector coded into a base layer and an enhancement layer, comprising: a motion vector restoring unit extracting motion vector information by analyzing an input bitstream and restoring motion vector components of the base layer and the enhancement layer from the extracted motion vector information; and a summing unit summing the restored motion vector components of the base layer and the enhancement layer to output a layered motion vector, wherein the base layer includes information about motion vectors of blocks larger than or equal to a predetermined size and the enhancement layer includes information about motion vectors of blocks smaller than the predetermined size.

The present invention advantageously provides motion vector scalability with respect to temporal, SNR and resolution in the context of scalable video coders and enhances the visual quality of video in the low bit-rate and resolution than currently exists in the related art.

BRIEF DESCRIPTION OF THE DRAWINGS

FIGS. 7A-7C illustrate spatial interpolation of an I-BLOCK for a case in which only one neighbor block is available, in accordance with an exemplary embodiment of the present invention.

FIGS. 9A-9F illustrate directional spatial interpolation of an I-BLOCK, in accordance with an exemplary embodiment of the present invention.

FIG. 10 illustrates hybrid spatial interpolation of an I-BLOCK, in accordance with an exemplary embodiment of the present invention.

FIG. 18A illustrates 8×8 weighting windows, wherein a self block is a motion block, in accordance with an exemplary embodiment of the present invention.

FIG. 18B illustrates 8×8 weighting windows, wherein a self block is an I-BLOCK, in accordance with an exemplary embodiment of the present invention.

DETAILED DESCRIPTION OF THE INVENTION

Figure 1:
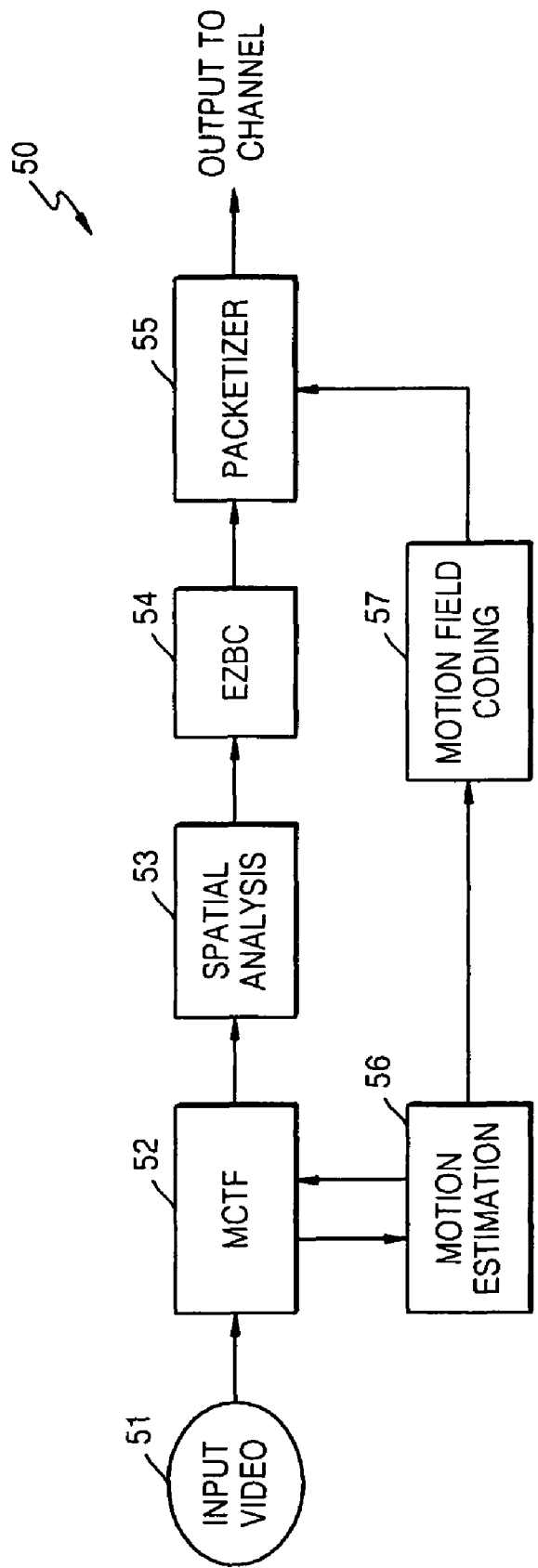
FIG. 1 illustrates a video coding system comprising a Motion Compensated Temporal Filtering (MCTF) processor, in accordance with an exemplary embodiment of the present invention.

Hereinafter, exemplary embodiments of the present invention will be described in detail with reference to the accompanying drawings. The present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Video compression schemes remove redundant information from input video signals before their transmission, by encoding frames of the input video signals into compressed information that represents an approximation of the images comprised by the frames of the input video signals. Following the transmission of the compressed information to its destination, the video signals are reconstructed by decoding the approximation of the images from the compressed information. With temporal redundancy, pixel values are not independent but are correlated with their neighbors across successive frames of the input video signals.

In Moving Pictures Experts Group (MPEG) hybrid coding, temporal redundancy may be removed by motion-compensated prediction (MCP). A video signal is typically divided into a series of groups of pictures (GOP), where each GOP begins with an intra-coded frame (I) followed by an arrangement of forward predictive-coded frames (P) and bidirectional predicted frames (B). Both P-frames and B-frames are interframes. A target macroblock in a P-frame can be predicted from one or more past reference frames (forward prediction). Bidirectional prediction, also called motion-compensated (MC) interpolation, is an important feature of MPEG video. B-frames coded with bidirectional prediction use two reference frames, one in the past and one in the future. A target macroblock in a B-frame can be predicted from past reference frames (forward prediction) or from future reference frames (backward prediction), or by an average of these two predictions (interpolation). The target macroblock in either a P-frame or a B-frame can also be intra coded as an I-BLOCK or a P-BLOCK as defined infra.

Forward or backward prediction encodes data in a current input frame (i.e., picture) based upon the contents of a preceding or succeeding reference frame, respectively, in consideration of luminance and/or chrominance values at the pixels in both the current input frame and one or more reference frames. Thus the reference frames used for the predictive encoding are either preceding reference frames or succeeding reference frames. For a given input block of pixels (e.g., a 16×16 array of pixels) in the current input frame, the predictive encoding utilizes motion compensated prediction (MCP) to successively shift blocks in the reference frames, within a predetermined search range, to determine whether there is a 16×16 array of pixels found within a reference frame which has at least a given minimum degree of correlation with the input block. If the given minimum degree of correlation is determined to exist, then the amount and direction of displacement between the found 16×16 pixel array in the reference frame and the input block is obtained in the form of a motion vector (MV), with horizontal and vertical components. The respective values of the difference between the pixel values (e.g., luminance values alone or luminance and chrominance values) of the input block and the corresponding pixels within the found 16×16 array of pixels in the reference frame are motion compensated prediction error values, sometimes called prediction residuals or simply residuals. As stated supra, prediction from a preceding reference frame is referred to as forward prediction, and from a succeeding reference frame is referred to as backward prediction. If no correlated 16×16 blocks in the reference frames are found within the search range, then the input block may be intra-coded within the input frame, and is referred to as an I-BLOCK. With bidirectional prediction, values for the input block may be predicted based on 16×16 blocks of pixels within both preceding and succeeding reference frames, respectively. The preceding discussion of 16×16 pixel blocks is merely illustrative and the scope of the present invention includes pixel blocks of any pixel array size. With variable size block matching (VSBM), for example, the block sizes are at least 4×4.

An unconnected block within a current input frame is classified to be either an I-BLOCK or a P-BLOCK. An I-BLOCK is defined as an input block in the current input frame that does not have sufficient correlation (e.g., a given minimum degree of correlation) with a corresponding block of pixels in the reference frame that is being used for forward or backward prediction in relation to the frame. Due to the lack of sufficient correlation, an I-BLOCK is encoded entirely within the given frame independent of a reference frame. A P-BLOCK is encoded by: forward prediction from the reference frame under the assumption that the reference frame precedes the given frame; backward prediction from the reference frame under the assumption that the reference frame succeeds the given frame; or bidirectional prediction using both a preceding and succeeding reference frame.

An example of an I-BLOCK is a block of newly uncovered pixels in the current input frame having no corresponding pixels in the preceding frame. Other examples of I-BLOCKs include poorly matched motion blocks such as, inter alia, a block of partially covered or partially occluded pixels in the current input frame wherein the block does not have sufficient correlation with a corresponding block of pixels in the reference frame. The present invention provides a method of determining and encoding I-BLOCKs.

The present invention is directed to the quality of the motion, since Motion Compensated Temporal Filtering (MCTF) is rather sensitive to the quality. The conventionally used block based motion in MPEG video standards is not of sufficient high quality to avoid the creation of artifacts in the lower frame rate videos output by the MCTF and resultant scalable video coder. Currently, even VSBM is not sufficient to reliably avoid artifacts. In contrast, the present invention provides a method of determining and coding a more smooth and consistent motion for MCTF use.

Also, the present invention provides method and apparatus for scalable motion vector coding based on CABAC for MC-Embedded Zero Block Coding (EZBC). A layered structure for motion vector coding and Alphabet General Partition (AGP) of motion vector symbols are employed for signal-to-noise ration (SNR) and resolution scalability of motion vector bitstream. With these two features and the careful arrangement of motion vector bitstream already existing in MC-EZBC, the present invention provides temporal, SNR and resolution scalability for motion vectors, and improve significantly both visual and objective results for low rates and low resolution with slight PSNR loss and unnoticeable visual loss at high rates.

DEFINITIONS

The following definitions apply herein to the description of the present invention:

A "video coding system" is a system that encodes video data.

A "video coder" is an algorithm which reduces the number of bits necessary to store a video clip by removing redundancy and introducing controlled distortion A "subband/wavelet coder" is a video coder that uses the subband/wavelet transformation in the process of redundancy reduction A "temporal correlation" is a correlation between pixels in adjacent or nearby frames "Spatial correlation" is a correlation between pixels in the same frame "Motion estimation" is estimation of a motion or displacement vector that locates a matching block in another frame "Motion compensation" (MC) is a process of actually an alignment of a block in the present frame with a matching block in a different frame.

Figure 2:
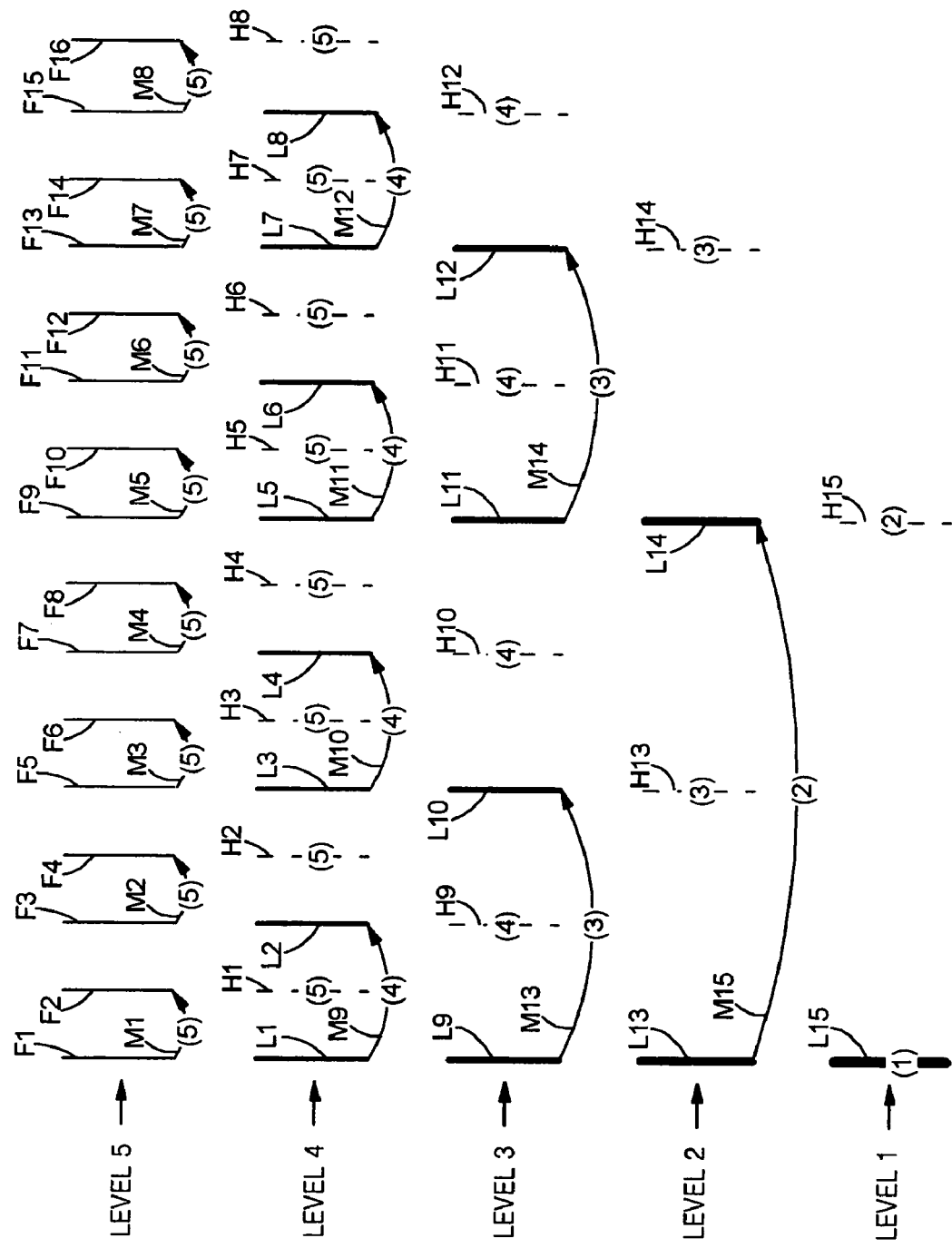
FIG. 2 illustrates the MCTF process implemented by the MCTF processor of FIG. 1, in accordance with an exemplary embodiment of the present invention.

"Motion compensated temporal filtering" (MCTF) is a process of filtering a block or array of pixels along the time axis (i.e., motion trajectory) in a manner to be described infra in conjunction with FIG. 2.

"Temporal low frame" is a frame containing the spatial low frequencies that are common in a pair (or larger set) of frames.

"Temporal high frame" is a frame containing the spatial high frequencies that constitute the MC difference in a pair (or larger set) of frames "Temporal redundancy" denotes a dependency between pixels in adjacent or nearby frames "Block matching" is a method that assigns one motion to a block of pixels.

"Variable size block matching" (VSBM) is a block matching motion estimation using variable size blocks to better represent the motion. Block sizes may range, inter alia, from 4×4 to 64×64.

"Hierarchical VSBM" (HVSBM) is a motion estimation method that uses a hierarchy of spatial resolutions to perform the VSBM, progressing from lowest to highest (full) resolution.

"Overlapped block motion compensation" (OBMC) is a method of enhancing block-based motion to make the resulting motion based prediction smoother and reduce or eliminate the effect of motion vector discontinuities between neighboring blocks.

A "global motion vector" is a motion vector that is used for the entire frame, wherein the pertinent block size is equal to the frame size.

An "unconnected area" is an area of the image frame that does not have a corresponding region in the reference frames or a region where the motion is too complicated for the motion estimator to track properly.

"Motion compensated prediction" (MCP) is a data reduction technique, wherein motion vectors are used to warp a previously transmitted frame prior to its use as a prediction of the current frame, and only the resulting prediction error is quantized and transmitted for this frame.

"Displaced frame difference" (DFD) is an error resulting from a motion compensated prediction.

A "hybrid coder" is a video coder such as MPEG-2 that makes use of MC prediction inside a feedback loop to temporally compress the data, and then a spatial transform coder to code the resulting prediction error.

Motion Compensated Temporal Filtering (MCTF)

Moving Picture Experts Group (MPEG), which is one of subcommittees of International Organization for Standardization (ISO), is exploring scalable coding. The purpose of MPEG is to design international standards for the transmission and storage of combined audio and video signals. A key element in this is the compression of these audiovisual signals due to their large uncompressed size. A scalable video coder provides an embedded bit stream containing a whole range of bit rates, lower resolutions, and lower frame rates, in addition to the full frame rate and full resolution input to the scalable coder. With the embedding, the lower bit rate result is embedded in each of the higher bit rate streams.

FIG. 1 illustrates a video coding system 50, in accordance with an exemplary embodiment of the present invention. Input video 51 is received by an MCTF processor 52 and comprises a group of pictures (GOP) such as 16 input frames. Each frame has pixels, and each pixel has pixel value for the pixel characteristics of luminance and chrominance. For each block of data processed by the MCTF processor 52, the MCTF processor 52 needs motion information in the form of a motion vector. Accordingly, the input video 51 data is sent from the MCTF processor 52 to a motion estimation unit 56 which determines the motion vectors and sends the determined motion vectors back up to the MCTF processor 52 to perform the motion compensated temporal filtering. In addition, the motion information is coded in the motion field coding processor 57, and then transmitted to the packetizer 55. Especially, the motion field coding processor 57 according to the present invention codes the motion information scalablely using CABAC.

The MCTF processor 52 generates output frames comprising one temporal low frame and multiple temporal high frames of transformed pixel values, derived from the input frames of the input video 51 as will be described infra in conjunction with FIG. 2. The generated output frames are processed by spatial analysis unit 53 by being analyzed spatially with a subband wavelet coder, namely a discrete wavelet transform. By using the MCTF processor 52, the video coding system 50 does not suffer the drift problem exhibited by hybrid coders that have feedback loops.

The spatial analysis unit 53 decomposes the generated output frames (i.e., one temporal low frame and multiple temporal high frames) into one low frequency band and bands having increasing scales of higher and higher frequency. Thus, the spatial analysis unit 53 performs a spatial pixel transformation to derive spatial subbands in a manner that is analogous to pixel transformation performed by the MCTF processor 52 in the time domain. The output of spatial analysis unit 53 is uncompressed floating point data and many of the subbands may comprise mostly near zero values.

These spatial subbands in space generated by the spatial analysis unit 53 are sent to an embedded zero block coder 54 which is one of a family of subband/wavelet coders that exploit temporal correlation but is fully embedded in quality/bit-rate, spatial resolution, and frame rate. The embedded zero block coder 54 algorithm provides the basic scalability properties by individually coding each spatial resolution and temporal high subband. The embedded zero block coder 54 includes a compression block that quantizes the subband coefficients and assigns bits to them. The quantizing converts the floating point output of spatial analysis unit 53 to a binary bit representation, followed by truncating the binary bit representation to discard relatively insignificant bits such that no more than negligible distortion is generated from the truncation. The embedded zero block coder 54 is an adaptive arithmetic coder which converts the fixed bit strings into variable length strings, thereby achieving further compression. Thus, the embedded zero block coder 54 is both a quantizer and a variable length coder called a conditional adaptive arithmetic coder. Whereas the quantizer is throwing away bits, the variable length coder compresses output from the quantizer losslessly. The bit streams generated by the embedded zero block coder 54 are interleaved and sent to the packetizer 55. The embedded zero block coder 54 can be substituted by another suitable embedded or layered coder, e.g., JPEG 2000 and others.

The packetizer 55 combines the bits of the streams generated by the embedded zero block coder 54 with the bits of motion vectors (needed for doing decoding later) transmitted from the motion field coding processor 57 and separates the combination of bits into packets of desired sizes (e.g., Internet packets of 500 kilobytes or less). The packetizer 55 subsequently sends the packets over a communication channel to a destination (e.g., a storage area for storing the encoded video information).

FIG. 2 illustrates the MCTF process implemented by the MCTF processor 52 of FIG. 1 for an exemplary GOP size of 16 frames, in accordance with an exemplary embodiment of the present invention. FIG. 2 shows 5 levels in the MCTF process of successive filtering, namely levels 5, 4, 3, 2, and 1 having 16, 8 4, 2, and 1 frames therein, respectively. Thus, each level N contains $2^{N-1}$ frames for N=1, 2, 3, 4, 5. Level 5 contains the 16 input frames of the input video 51 of FIG. 1, namely input frames F1, F2, ..., F16 ordered in the direction of increasing time from left to right. MC temporal filtering is performed on pairs of frames to produce temporal low (t-L) and high (t-H) subband frames at the next lower temporal scale or frame rate. In FIG. 2, solid lines indicate the temporal low frames and dashed lines indicate the temporal high frames. At each temporal scale, curved lines indicate the corresponding motion vectors.

The MC temporal filtering is performed four times in FIG. 2 to generate 5 temporal scales or frame rates, the original frame rate and four lower frame rates. The frame rates generated are full rate, ½ full rate, ¼ full rate, ⅛ full rate, and 1/16 full frame rate at levels 5, 4, 3, 2, and 1, respectively. Thus, if the input frame rate were 32 frames per second (fps), then the lowest frame rate out is 2 fps at level 1. In FIG. 2, the lowest frame rate is denoted (1), the next higher frame rate is denoted as (2), etc.

In motion estimation and associated temporal filtering from level 5 to level 4, the motion estimation unit 56 of FIG. 1 performs motion estimation from F1 to F2, F3 to F4, F5 to F6, F7 to F8, F9 to F10, F11 to F12, F13 to F14, and F15 to F16, and determines the associated motion vectors M1, M2, M3, M4, M5, M6, M7, and M8, respectively. The MCTF processor 52 of FIG. 1 performs temporal filtering on frames F1 and F2 to generate temporal low frame L1 and temporal high frame H1; temporal filtering on frames F3 and F4 to generate temporal low frame L2 and temporal high frame H2; temporal filtering on frames F5 and F6 to generate temporal low frame L3 and temporal high frame H3; temporal filtering on frames F7 and F8 to generate temporal low frame L4 and temporal high frame H4; temporal filtering on frames F9 and F10 to generate temporal low frame L5 and temporal high frame H5; temporal filtering on frames F11 and F12 to generate temporal low frame L6 and temporal high frame H6; temporal filtering on frames F13 and F14 to generate temporal low frame L7 and temporal high frame H7; and temporal filtering on frames F15 and F16 to generate temporal low frame L8 and temporal high frame H18. Generally, the frames being temporally filtered into temporal low and temporal high frames are called "child frames". For example, the F1 and F2 frames are child frames of the L1 and H1 frames. Generally, if corresponding pixel values in the child frames are $V_A$ and $V_B$, then the corresponding pixel values in the temporal low and temporal high frames are proportional to $V_A+V_B$ and $V_A-V_B$, respectively, in the special case where Haar filters are used for temporal filtering. Thus, pixel values in temporal low frames are proportional to the average of the corresponding pixel values in the child frames. In contrast, pixel values in temporal high frames are proportional to the difference between corresponding pixel values in the child frames. Thus, if the pixel values in the child frames are close to each other, then the pixels in the temporal high frames generally have a low energy (i.e., a large number of near zero values) and are therefore highly compressible.

In motion estimation and associated temporal filtering from level 4 to level 3, the motion estimation unit 56 of FIG. 1 further performs motion estimation from L1 to L2, L3 to L4, L5 to L6, and L7 to L8, and determines the associated motion vectors M9, M10, M11, and M12, respectively. The MCTF processor 52 of FIG. 1 further performs: temporal filtering on frames L1 and L2 to generate temporal low frame L9 and temporal high frame H9; temporal filtering on frames L3 and L4 to generate temporal low frame L10 and temporal high frame H10; temporal filtering on frames L5 and L6 to generate temporal low frame L11 and temporal high frame H11; and temporal filtering on frames L7 and L8 to generate temporal low frame L12 and temporal high frame H12.

In motion estimation and associated temporal filtering from level 3 to level 2, the motion estimation unit 56 of FIG. 1 further performs: motion estimation from: L9 to L10 and L11 to L12 and determines the associated motion vectors M13 and M14, respectively. The MCTF processor 52 of FIG. 1 further performs temporal filtering on frames L9 and L10 to generate temporal low frame L13 and temporal high frame H13; and temporal filtering on frames L11 and L12 to generate temporal low frame L14 and temporal high frame H14.

In motion estimation and associated temporal filtering from level 2 to level 1, the motion estimation unit 56 of FIG. 1 further performs motion estimation from L13 to L14, and determines the associated motion vector M15. The MCTF processor 52 of FIG. 1 further performs temporal filtering on frames L13 and L14 to generate temporal low frame L15 and temporal high frame H15.

As a result of the MCTF of FIG. 2, the 16 frames in this 5 level example, consisting of the temporal low frame L15 and the temporal high frames H1, H2, ..., H15 are output from the MCTF processor 52 to the spatial analysis unit 53 of FIG. 1. Since the temporal high frames H1, H2, . . . , H15 may comprise a large number of near zero values, as explained supra, the temporal high frames H1, H2, . . . , H15 frames are amenable to being highly compressed.

Given frames L15, H1, H2, . . . , H15, the frames in Levels 2, 3, 4, and 5 may be regenerated by sequentially reversing the process that generated frames L15, H1, H2, . . . , H15. For example, frames L15 and H15 of Level 1 may be mathematically combined to regenerate frames L13 and L14 of Level 2. Similarly, frames L13 and H13 of Level 2 may be mathematically combined to regenerate frames L9 and L10 of Level 3, and frames L14 and H14 of Level 2 may be mathematically combined to regenerate frames L11 and L12 of Level 3. This process may be sequentially continued until frames F1, F2, . . . , F16 of Level 1 are regenerated. Since the compression performed by the embedded zero block coder 54 of FIG. 1 is lossy, the regenerated frames in Levels 2-5 will be approximately, but not exactly, the same as the original frames in Levels 2-5 before being temporally filtered.

Detecting and Processing I-BLOCKs

Because the MCTF decomposition is applied similarly to multiple pairs of frames as explained supra in conjunction with FIG. 2, attention is next focused on a representative pair of successive frames in a level of FIG. 2 (e.g., frames L1 and L2 in level 4). The representative two frames of this pair of successive frames are denoted as frames A and B, wherein forward estimation is performed from frame A to frame B, so that frame A is earlier in time than frame B. Newly uncovered pixels in frame B have no corresponding pixels in frame A. Similarly, occluded pixels in frame A have no corresponding pixel in frame B. The present invention utilizes I-BLOCKs to deal locally with poorly matched motion blocks resulting from the newly uncovered pixels in frame B. For I-BLOCKs identified in accordance with the present invention as described infra, MC temporal filtering is omitted and spatial interpolation is used instead to determine pixel values in the I-BLOCK. The resulting spatial interpolation error block for the I-BLOCK (also called the residual error block of the interpolated I-BLOCK) is subsequently overlayed on (i.e., inserted into) the corresponding block within the associated MCTF temporal high frame.

The present invention discloses a method of compressing video that involves a spatiotemporal or space-time transformation utilizing motion compensated blocks in pairs of input frames, such as the representative pair having input frames A and B. These blocks are of various sizes and are chosen to match the local motion vector field, so there are small blocks where the field has a high spatial gradient and large blocks in more flat regions where the spatial gradient is small. This block based motion field is used to control the spatiotemporal transformation so that it filters along approximate motion trajectories. The output of such a transformation is compressed for transmission or storage.

Some of the blocks may be unconnected with neighbors in the next frame (timewise) because of covering or uncovering of regions in the frame due to motion, e.g., a ball moving in front of a background object that is stationary. Such regions (i.e., I-BLOCKs) should not take part in the MC temporal filtering, since the MC temporal filtering would lead to artifacts in the low frame rate video. These I-BLOCKs need to be compressed along with the other blocks (i.e., P-BLOCKs) in the temporal high frame. The P-BLOCKs can be used to spatially predict the unconnected I-BLOCKs via spatial interpolation. These I-BLOCKs are thus suited to work with non-hybrid MCTF.

Figure 3:
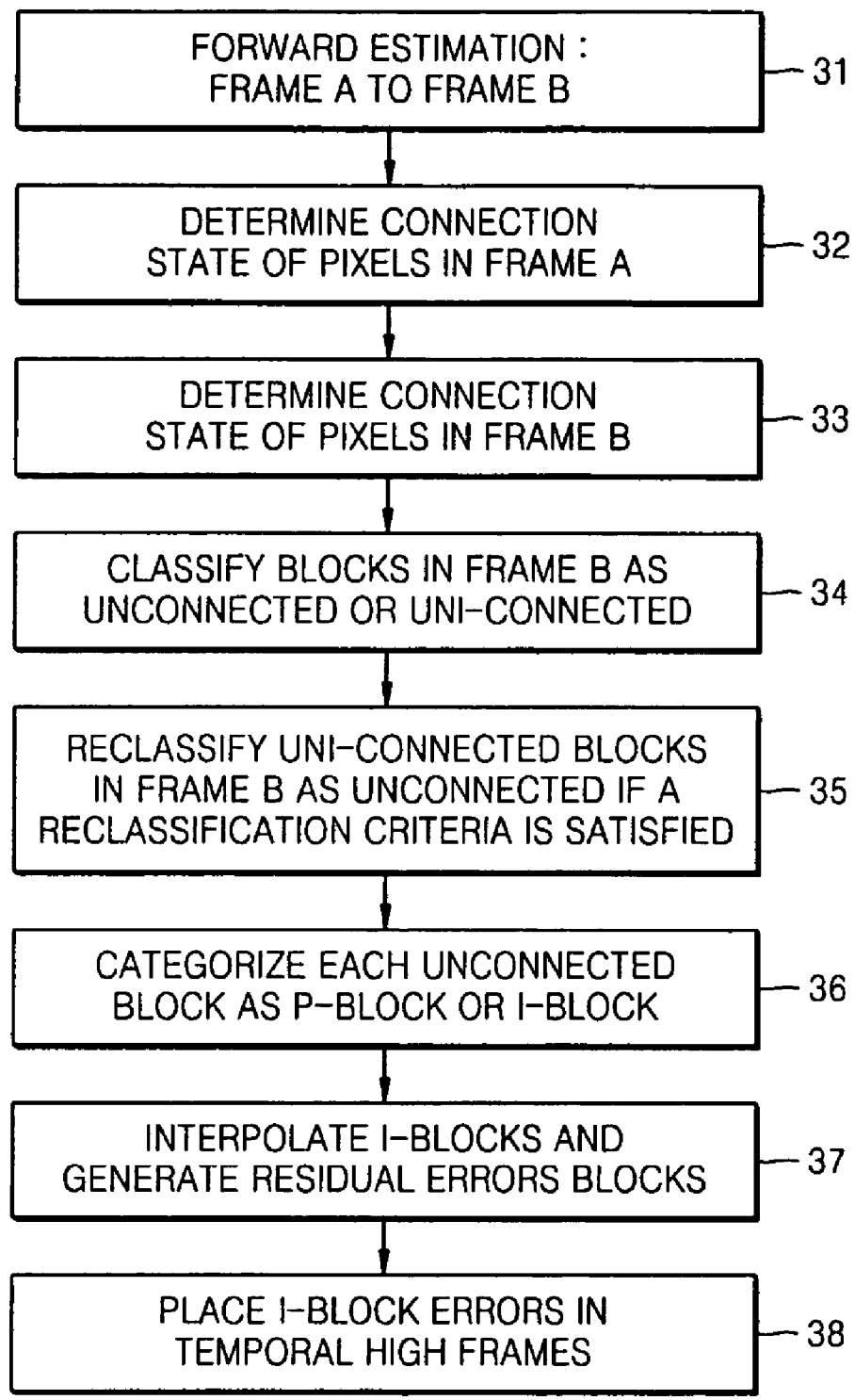
FIG. 3 is a flow chart depicting utilizing I-BLOCKs in temporal high frames generated by the MCTF process of FIG. 2, in accordance with an exemplary embodiment of the present invention.

FIG. 3 is a flow chart a method for utilizing I-BLOCKs in the MCTF temporal high frames, in accordance with an exemplary embodiment of the present invention.

Operation 31 utilizes two successive frames, A and B, in an MCTF filtering level, wherein forward estimation is performed from frame A to frame B. As an example, frames A and B could represent frames F1 and F2 in level 5 of FIG. 2, or frames L1 and L2 in level 4 of FIG. 2.

Figure 4:
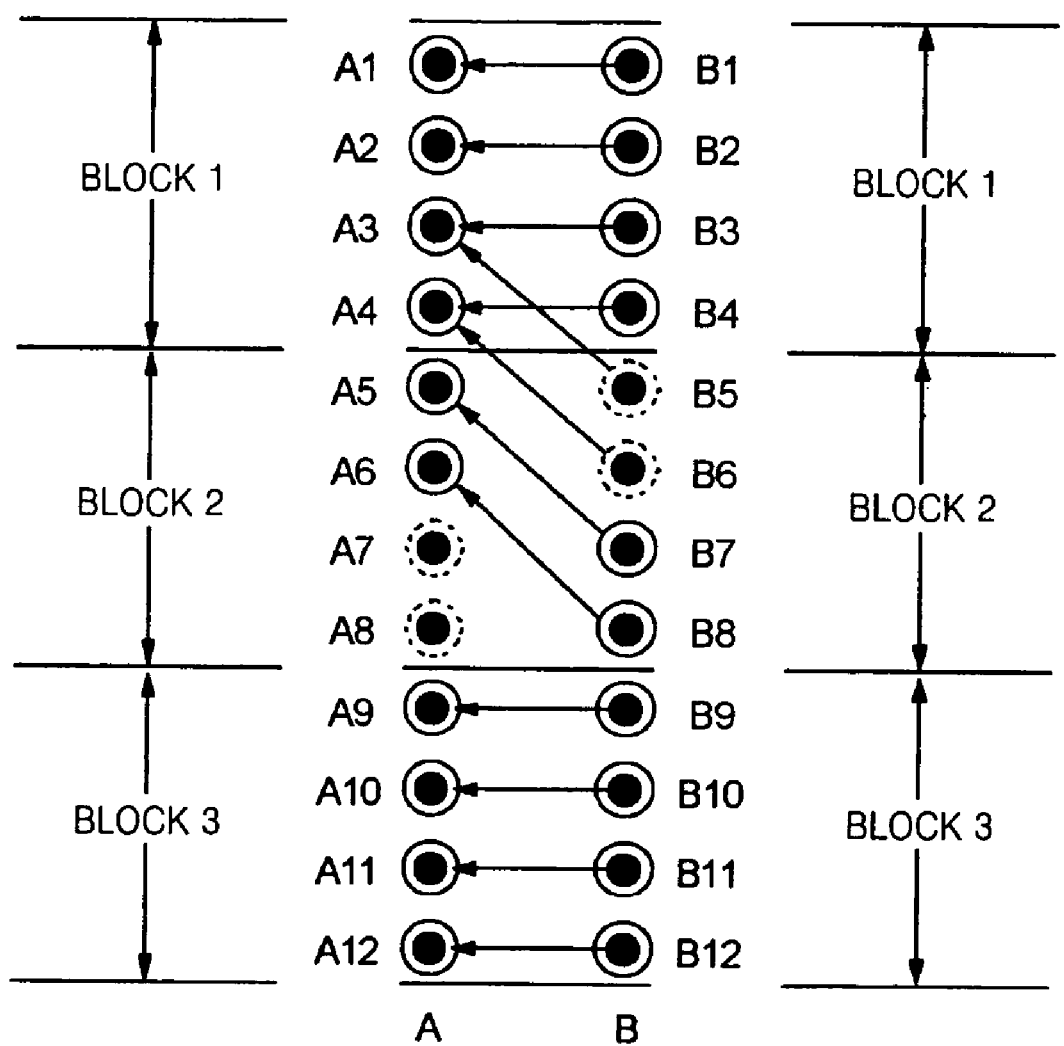
FIG. 4 illustrates connections between pixels of successive frames, in accordance with an exemplary embodiment of the present invention.

In operations 32 and 33, the connection state of pixels in frames A and B is determined as illustrated in FIG. 4 in accordance with an exemplary embodiment of the present invention. Each pixel in frames A and B will be classified as having a connection state of "connected" or "unconnected" as follows. FIG. 4 shows pixels A1, A2, . . . , A12 in frame A and pixels B1, B2, . . . , B12 in frame B. Pixels A1, A2, A3, and A4 are in block 1 of frame A. Pixels A5, A6, A7, and A8 are in block 2 of frame A. Pixels A9, A10, A11, and A12 are in block 3 of frame A. Pixels B1, B2, B3, and B4 are in block 1 of frame B. Pixels B5, B6, B7, and B8 are in block 2 of frame B. Pixels B9, B10, B11, and B12 are in block 3 of frame B. Pixels in frame A are used as references for pixels in frame B in relation to the forward motion estimation from frame A to frame B. Note that the blocks in frames A and B are 4×4 pixel blocks, and FIG. 4 shows only one column of each 4-column block. In FIG. 4, a pixel PA in frame A that is pointed to by an arrow from a pixel $P_B$ in frame B is being used as a reference for pixel $P_B$. For example, pixel A1 in frame A is being used as a reference for pixel B1 in frame B.

In operation 32, a pixel in frame A is labeled as unconnected if it is not used as a reference by any pixel in frame B. Accordingly, pixels A7 and A8 are unconnected. A pixel in frame A is connected if used as a reference for a pixel in frame B. Accordingly, pixels A1-A6 and A9-A12 are connected. Pixels A3 and A4 require special treatment, however, since pixels A3 and A4 are each being used as a reference by more than one pixel in frame B. For example, pixel A3 is being used as a reference by pixels B3 and B5 of frame B, and the present invention uses an algorithm based on minimum mean-squared displaced frame difference (DFD) (to be defined infra) calculations to retain pixel A1 as a reference for pixel B3 or for pixel B5 but not for both pixels B3 and B5. Noting that pixel A3 is within block 1 of frame A and that pixel B3 is within block 1 of frame B, the algorithm calculates DFD11 which is the mean-squared DFD between block 1 of frame A and block 1 of frame B. Noting that pixel A3 is within block 1 of frame A and that pixel B5 is within block 2 of frame B, the algorithm calculates DFD12 which is the mean-squared DFD between block 1 of frame A and block 2 of frame B. If DFD11 is less than DFD12 then pixel A3 is retained as a reference for pixel B3 and pixel A3 is dropped as a reference for pixel B5. If DFD12 is less than DFD11 then pixel A3 is retained as a reference for pixel B5 and is dropped a reference for pixel B3. If DFD11 is equal to DFD12 then any tie-breaker may be used. A first example of a tie-breaker is "scan order" which means that pixel A3 is retained as a reference for whichever of pixels B3 and B5 is first determined to use pixel A3 as a reference. A second example of a tie-breaker is to pick a random number R from a uniform distribution between 0 and 1, and to retain pixel A3 as a reference for pixel B3 if R is less than 0.5; or as a reference for pixel B5 if R is not less than 0.5. In the example of FIG. 4, DFD11 is less than DFD12 so that pixel A3 is retained as a reference for pixel B3 and dropped as a reference for pixel B5. Similarly, pixels B4 and B6 each use pixel A4 as a reference and the previously-described DFD-based algorithm may be used to retain pixel A4 as a reference for either pixel B4 or pixel B6 but not for both pixels B4 and B6. In the example of FIG. 4, pixel A4 is retained as a reference for pixel B4 and dropped as a reference for pixel B6 based on the previously-described DFD-based algorithm.

In operation 33, a pixel in frame B is labeled as unconnected if not using a reference pixel in frame A after the DFD-based algorithm has been applied to resolve those cases in which a pixel in frame A is used as a reference by more than one pixel in frame B. For example, pixels A3 and A4 were dropped as a reference for pixels B5 and B6, respectively, after application of the DFD-based algorithm, as explained supra. Accordingly, pixels B5 and B6 are unconnected. Otherwise pixels in frame B are connected. Accordingly, pixels B1-B4 and B7-B12 are connected. Note that if the previously-described DFD-based algorithm has been executed (i.e., when the connection states of the pixels in frame A were determined) then the arrow pointing from pixel B5 to pixel A3 and the arrow pointing from pixel B6 to pixel A4 in FIG. 4 are irrelevant since pixels A3 and A4 have already been dropped as a reference for pixels B5 and B6, respectively. While FIG. 4 shows operation 33 being executed after operation 32, operation 33 may alternatively be executed before operation 32. The previously-described DFD-based algorithm for resolving cases in which a pixel in frame A is used as a reference for more than one pixel in frame B may be executed at any time before, during, or after execution of operations 32 and 33. For example if operation 32 is executed prior to operation 33, then the previously-described DFD-based algorithm may be executed before operation 32, between operations 32 and 33, or after operation 33. As another example, if operation 33 is executed prior to operation 32, then the previously-described DFD-based algorithm may be executed before operation 33, between operations 33 and 32, or after operation 32.

What is actually needed as a result of executing operations 32 and 33 is the connection state (i.e., connected or unconnected) of each pixel in frame B relative to the pixels of frame A. Thus, operation 32 may alternatively be omitted, since the connection state of each pixel in frame B requires knowledge of the reference pixels in frame A for each pixel in frame B but does not require knowledge of the connection state of each pixel in frame A.

The mean-squared DFD between a block in frame A and a block in frame B is defined as follows. Let n denote the number of pixels in each of the blocks. Let $V_{A1}, V_{A2}, \ldots V_{An}$ denote the values (e.g., luminance or chrominance) of the pixels in the block in frame A. Let $V_{B1}, V_{B2}, \ldots, V_{Bn}$ denote the values of the corresponding pixels in the block in frame B. The mean-squared DFD between the block in frame A and the block in frame B is:

$$\text{Mean-squared DFD} = [(V_{A1}-V_{B1})^2 + (V_{A2}-V_{B2})^2 + \ldots + (V_{An}-V_{Bn})^2]/n \quad (1)$$

The previously-described DFD-based algorithm is applicable to motion vectors with sub-pixel accuracy in relation to connections between subpixels, as utilized in high performance video coders. A subpixel is location between adjacent pixels. The interpolated subpixel is used to calculate the DFD. Thus, no other changes in the MCTF algorithm are necessary but the use of a prescribed form of spatial interpolation when the reference pixel is not an integer. As an example, a separable 9-tap FIR interpolation filter may be utilized for this purpose.

After operations 32 and 33 of FIG. 4 have been executed, all pixels in frames A and B have been classified as being "unconnected" or "connected". Since the previously-described DFD-based algorithm eliminates multiple connections from two or more pixels in frame B to a reference pixel in frame A, each "connected" pixels in frame A is connected to exactly one pixel in frame B and vice versa.

Operation 34 classifies the blocks in frame B as being "uni-connected" or "unconnected", in accordance with an exemplary embodiment of the present invention. If at least a fraction F of the pixels in a block of a frame are unconnected, then the block is an "unconnected" block; otherwise the block is a "uni-connected" block. The fraction F has a value reflective of a tradeoff between image quality and processing time, since I-BLOCKs require extra processing time. The fraction F may have a value, inter alia, of at least 0.50 (e.g., in a range of 0.50 to 0.60, 0.50 to 0.75, 0.60 to 0.80, 0.50 to 1.00, 0.30 to 1.00, 0.50 to less than 1.00, etc.). By examining the reference pixels in frame A to which pixels in a uni-connected block in frame B are connected, a matched block in frame A (called a uni-connected block of frame A) may be determined for each uni-connected block in frame B. The resultant uni-connected blocks in frames A and B form a set of matched pairs of uni-connected blocks, wherein each matched pair consists of a uni-connected block in frame B and a matched uni-connected block in frame A. Let the matched pair of uni-connected blocks be denoted as first and second uni-connected blocks in frame A and frame B, respectively.

Operation 35 reclassifies the first and second uni-connected blocks of the matched pair of uni-connected blocks as being unconnected if the following reclassification criteria is satisfied, in accordance with an exemplary embodiment of the present invention. Let $V_1$ and $V_2$ denote the pixel variance of the first and second uni-connected blocks, respectively. The pixel variance of a block is the mean-squared deviation between the pixel values in the block and the mean pixel value for the block. Let VMIN denote the minimum of $V_1$ and $V_2$. Then the first and second uni-connected blocks are reclassified as being unconnected blocks if the mean-squared DFD between the first and second blocks exceeds $fV_{MIN}$, wherein f is a real number in a range of 0 to 1. For example, f may be in a range of, inter alia, 0.4 to 0.6, 0.5 to 0.7, 0.4 to 0.75, 0.5 to 0.9, 0.4 to 1.00, etc. After operation 35 is executed, the classification of each block in frame B as "unconnected" or uni-connected" is complete.

Operation 36 categorizes each unconnected block in frame B as a P-BLOCK or an I-BLOCK, in accordance with an exemplary embodiment of the present invention. An I-BLOCK will subsequently have its initial pixel values replaced by spatially interpolated values derived from neighboring pixels outside of the I-BLOCK, as will be described infra. The difference between an initial pixel value and a spatially interpolated pixel value of an I-BLOCK pixel is the residual error of the interpolated I-BLOCK pixel. The block of residual errors at all pixels in the I-BLOCK is called a residual error block of, or associated with, the I-block.

To determine whether an unconnected block is an I-BLOCK or a P-BLOCK, the interpolated I-BLOCK is formed, its residual error block is computed, and the absolute value of the sum of the residual errors ($S_{RES}$) in the residual error block is also computed. $S_{RES}$ is called the "residual interpolation error" of the unconnected block. The residual errors are the errors at the pixels of the residual error block. In addition, forward and backward motion is performed on the unconnected block. The sum of the absolute DFDs of the forward and backward motion compensated prediction errors are computed. The minimum of the sum of the absolute DFDs for the forward and backward motion compensated prediction errors ($S_{MC-MIN}$) is determined. $S_{MC-MIN}$ is called the "minimum motion compensated error" of the unconnected block. The unconnected block is classified as an I-BLOCK if $S_{RES}$ is less than $S_{MC}$ MIN. The unconnected block is classified as a P-BLOCK if $S_{RES}$ is not less than $S_{MC-MIN}$.

Figure 8:
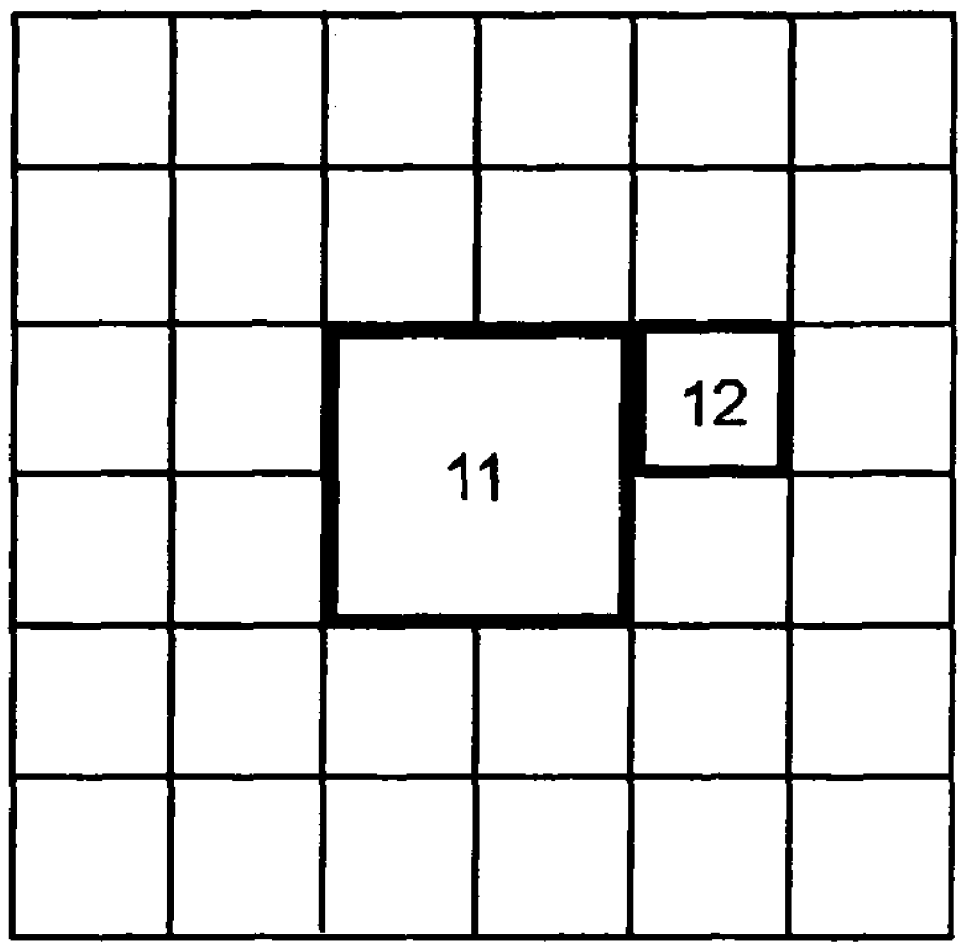
FIG. 8 illustrates a variable block size of I-BLOCKs in a frame, in accordance with an exemplary embodiment of the present invention.

In operation 37, the I-BLOCKs determined in operation 36 are processed by spatial interpolation from available neighboring pixels and the residual error block associated with the interpolated I-BLOCK is generated, in accordance with an exemplary embodiment of the present invention. The blocks in a frame may have a fixed size or a variable size. FIGS. 5-7 and 9 describe infra interpolation an exemplary embodiment for the fixed block size case in accordance with an exemplary embodiment of the present invention, and FIG. 8 is used to describe infra the variable block size case in accordance with an exemplary embodiment of the present invention.

In operation 38, the residual error block associated with the interpolated I-BLOCK is overlayed on (i.e., placed within) the pertinent temporal high frame associated with the frame pair A and B being analyzed, for subsequent compression of the pertinent temporal high frame by the embedded zero block coder 54 after execution of the spatial analysis of FIG. 2. FIG. 7C (described infra) shows that the residual error block contains numerous near zero values and is thus suitable for being efficiently compressed.

Figures 5, 6:
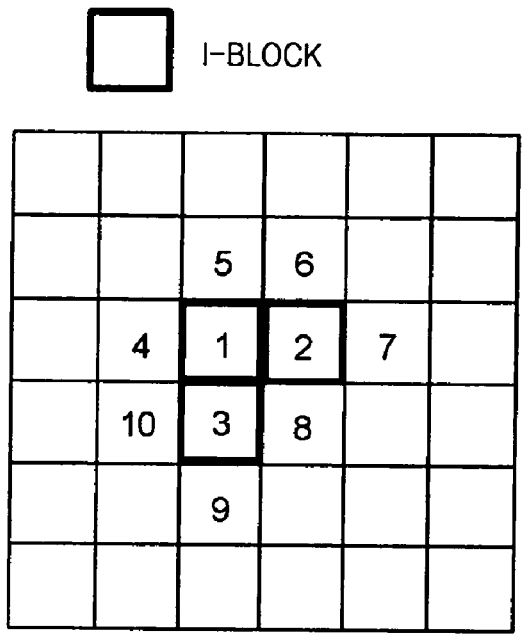
FIG. 5 illustrates a frame comprising I-BLOCKs and P-BLOCKs, in accordance with an exemplary embodiment of the present invention.
FIG. 6 illustrates notation used for spatial interpolation of an I-BLOCK, in accordance with an exemplary embodiment of the present invention.

FIG. 5 shows a frame comprising I-BLOCKs, P-BLOCKs, and uni-connected blocks. The I-BLOCKs comprise blocks 1-3, and the P-BLOCKs and uni-connected blocks comprise the remaining blocks which include blocks 4-10. Each I-BLOCK has four possible neighbors: an upper neighbor, a lower neighbor, a left neighbor, and a right neighbor. In the interpolation algorithms used herein, the blocks of a frame are processed in accordance with a scan order and only "available" blocks (i.e., previously processed I-BLOCKs having established pixel values therein, P-BLOCKs having original data therein, and/or uni-connected blocks) can be used for the spatial interpolation. For example, using a scan order of left-to-right and then top-to-bottom in FIG. 5 for block 1, only neighboring blocks 4 and 5 can be used for the block 1 spatial interpolations, since both block 2 and block 3 are not available. For block 2, however, there are four neighboring blocks available for the block 2 spatial interpolations after block 1 is interpolated, namely blocks 1 and 6-8. Similarly, there are four neighboring blocks available for the block 3 spatial interpolation after block 1 is interpolated, namely blocks 1 and 8-10.

The spatial interpolation is performed following a raster scanning rule such as the aforementioned left-to-right and then top-to-bottom scanning rule. Based on the number of available neighbors and their positions, there are different interpolation functions. FIG. 6 illustrates the following notation: "u" represents the upper neighboring pixels, "lw" represents the lower neighboring pixels, "lf" represent the left neighboring pixels, "r" represents the right neighboring pixels, and "in" represents the interpolated pixel values in the I-BLOCK. The interpolation may be linear or non-linear and many different interpolation schemes may be used.

FIGS. 7A-7C (collectively, "FIG. 7") illustrate a case in which only one neighbor block is available. The 4×4 pixel I-BLOCK 40 in FIG. 7A is defined by row segments 41-44, and it is assumed that the only available neighbors are in row segment 45 in a neighboring upper block above block 40. The example pixel values shown for I-BLOCK 40 in FIG. 7A are the initial values prior to the spatial interpolation. The pixel values in row segment 45 are used for spatial interpolation. For this case, the C-code in Table 1 may be used to effectuate the spatial interpolation.

TABLE 1 for (i=0; i<4; i++)
  for (j=0; j<4; j++)
    in[i*4+j] = u[j];

FIG. 7B shows the resultant interpolated values in the I-BLOCK 40 resulting from execution of the C-code of Table 1. FIG. 7C shows the residual error block determined by subtracting the interpolated pixel values of FIG. 7B from the initial pixel values of FIG. 7A. The residual error block depicted FIG. 7C is overlayed within (i.e., placed within) the pertinent temporal high frame associated with the frame pair A and B being analyzed, for subsequent compression of the pertinent temporal high frame by the embedded zero block coder 54 of FIG. 2. While FIGS. 7A-7C described the embodiment in which only upper neighboring pixels are available for interpolation, the cases in which only left, right, or lower neighboring pixels are available for interpolation may be derived analogously from the "upper" neighboring case described supra, or by a proper coordinate rotation.

Tables 2 and 3 illustrate interpolation algorithms in which two neighboring blocks are available. Table 2 specifies formulas for calculating the interpolated pixel values in[0] . . . in[15] (see FIG. 6) in the 4×4 I-BLOCK using available neighboring pixels in the upper and left positions in accordance with the notation of FIG. 6. Table 3 specifies C-code for calculating the interpolated pixel values in[0] . . . in[15] in the 4×4 I-BLOCK using neighboring pixels in the upper and lower positions in accordance with the notation of FIG. 6.

TABLE 2

| | | | |
|---|---|---|---|
| in[0]=(lf[0]+u[0])/2; | in[1]=u[1]; | in[2]=u[2]; | in[3]=u[3]; |
| in[4]=lf[1]; | in[5]=(in[4]+in[1])/2; | in[6]=in[2]; | in[7]=in[3]; |
| in[8]=lf[2]; | in[9]=in[8]; | in[10]=(in[9]+in[6])/2; | in[11]=in[7]; |
| in[12]=lf[3]; | in[13]=in[12]; | in[14]=in[13]; | in[15]=(in[11]+in[14])/2 |

TABLE 3 or (i=0; i<4; i++)
{
  in[i]=u[i];
  in[12+i]=lw[i];
  in[4+i] = in[8+i] = (u[i]+lw[i])/2;
}

Other exemplary embodiments in which two neighboring blocks are available may be derived analogously from the "upper and left" or "upper and lower" neighboring cases described supra in conjunction with Tables 2 and 3, respectively, or by a proper coordinate rotation.

Table 4 illustrates interpolation algorithms in which three neighboring blocks are available. Table 4 specifies C-code for calculating the interpolated pixel values in[0] . . . in[15] (see FIG. 6) in the 4×4 I-BLOCK using neighboring pixels in the upper, left, and right positions in accordance with the notation of FIG. 6.

TABLE 4

| | | | |
|---|---|---|---|
| in[0]=(lf[0]+u[0])/2; | in[1]=u[1]; | in[2]=u[2]; | in[3]=(u[3]+r[0])/2; |
| in[4]=lf[1]; | in[5]=(in[4]+in[1])/2; | in[7]=r[1]; | in[6]=(in[2]+in[7])/2; |
| in[8]=lf[2]; | in[9]=in[8]; | in[11]=r[2]; | in[10]=in[11]; |
| in[12]=lf[3]; | in[13]=in[12]; | in[15]=r[3]; | in[14]=in[15]; |

Other exemplary embodiments in which three neighboring blocks are available may be derived analogously from the "upper, left, and right" neighboring case described supra in conjunction with Table 4, or by a proper coordinate rotation.

Table 5 illustrates interpolation algorithms in which four neighboring blocks are available. Table 5 specifies C-code for calculating the interpolated pixel values in[0] . . . in[15] (see FIG. 6) in the 4×4 I-BLOCK using neighboring pixels in the upper, lower, left, and right positions in accordance with the notation of FIG. 6.

TABLE 5

| | | | |
|---|---|---|---|
| in[0]=(lf[0]+u[0])/2; | in[1]=u[1]; | in[2]=u[2]; | in[3]=(u[3]+r[0])/2; |
| in[4]=lf[1]; | in[5]=(in[4]+in[1])/2; | in[7]=r[1]; | in[6]=(in[2]+in[7])/2; |
| in[12]=(lf[3]+lw[0])/2; | in[13]=lw[1]; | in[14]=lw[2]; | in[15]=(lw[3]+r[3])/2; |
| in[8]=lf[2]; | in[9]=(in[8]+in[13])/2; | in[11]=r[2]; | in[10]=(in[14]+in[11])/2 |

FIG. 8 illustrates the variable block size case, which arises from 5-level hierarchical variable size block matching where block sizes range from 4×4 to 64×64. For example in FIG. 8, I-BLOCKs 11 and 12 are shown. Block 11 has a pixel size of 8×8 and block 12 has a pixel size of 4×4. If I-BLOCKs 11 and 12 are processed in the previously mentioned left-to-right and then top-to-bottom scanning order (i.e., block 11 is interpolated before block 12 is interpolated) then block 12 will not be available for block 11's interpolation. To simplify the interpolation, block 11 may be treated as 4 separate 4×4 I-BLOCKs for interpolation purposes, so that the spatial interpolation may be implemented as fixed-block interpolation.

FIGS. 9A-9F illustrate a directional spatial interpolation scheme for determining pixel values for I-BLOCKs, in accordance with an exemplary embodiment of the present invention. FIGS. 9A-9F depict a 4×4 I-BLOCK 61 within a portion of a frame 60. The portion of the frame 60 contains pixels P11 . . . P99. I-BLOCK 61 contains pixels P22, P23, P24, P25, P32, P33, P34, P35, P42, P43, P44, P45, P52, P53, P54, and P55. In FIGS. 9A-9F, all pixels not in I-BLOCK 61 are neighbors of the pixels in I-BLOCK 61. The interpolation for the pixels in I-BLOCK 61 are along parallel lines making a fixed angle θ with the X axis as illustrated by one of the parallel lines, namely line 66, shown in FIG. 9A. FIGS. 9B-9F each represent an embodiment with a different value of θ. For the purpose of estimating values of θ for illustrative purposes, it is assumed for simplicity that each pixel is a square. Thus, θ=45 degrees for the line 66 in FIG. 9A which passes through diagonally opposite vertices of pixels P25, P34, P43, and P52. Of course, θ will differ from 45 degrees for line 62 in FIG. 9A if the pixels have a rectangular, non-square shape. Note that θ and θ+180 degrees represent the same set of parallel lines. The interpolations along each such line utilizes pixel values of the nearest available neighbors on the line, wherein an available neighbor is a neighbor whose pixel value has been previously established. The directional interpolation scheme assumes that at least one neighbor is always available for each such line of the parallel lines.

FIG. 9B illustrates a directional interpolation such that θ=45 degrees with respect to parallel lines 63, 64, . . . , 69.

Lines 63, 64, . . . , 69 are called "directional lines." Since line 63 passes though pixel P22, line 63 is used to determine the value of pixel P22 based on interpolation using: neighbor pixels P13 and P31 if both pixel P13 and pixel P31 are available; only neighbor pixel P13 if P13 is available and pixel P31 is not available; or only neighbor pixel P31 if pixel P31 is available and pixel P13 is not available. Since line 64 passes though pixels P23 and P32, line 64 is used to determine the value of pixels P23 and P32 based on interpolation using: neighbor pixels P14 and P41 if both pixel P14 and pixel P41 are available; only neighbor pixel P14 if pixel P14 is available and pixel P41 is not available; or only neighbor pixel P31 if pixel P31 is available and pixel P13 is not available. Similarly, interpolations along lines 65, 66, 67, 68, and 69 are used to determine pixel values at (P24, P33, P42), (P25, P34, P43, P52), (P35, P44, P53), (P45, P54), and (P55), respectively.

Lines 67-69 present alternative possibilities for nearest neighbors. For example, line 68 has neighbor pixels (P36, P27, and P18) and (P63, P72, and P81) at opposite borders of the I-BLOCK 61. In choosing which neighbor of the neighbor pixels (P36, P27, and P18) to use, the directional interpolation will use pixel P36 if available since pixel P36 is the nearest neighbor of the neighbor pixels (P36, P27, and P18). If pixel P36 is unavailable then the directional interpolation will use pixel P27 if available since pixel P27 is the nearest neighbor of the neighbors (P27 and P18). If pixel P27 is unavailable then the directional interpolation will use the remaining neighbor pixel P18 if available. If pixel P27 is unavailable then the directional interpolation will not use any of pixels (P36, P27, and P18). Similarly, the directional interpolation will choose one pixel of neighbor pixels (P63, P72, and P81) based on the nearest available neighbor criteria for making this choice. Therefore, as a result of the applying the nearest available neighbor criteria, the directional interpolation along line 68 for determining the values of pixels P45 and P54 will utilize one of the following neighbor pixel combinations: pixel P63 alone, pixel P72 alone, P81 alone, pixels P63 and P36, pixels P63 and P27, pixels P63 and P18, pixels P72 and P36, pixels P72 and pixels P27, P72 and P18, pixels P81 and P36, pixels P81 and P27, pixels P81 and P18, pixel P36 alone, pixel P27 alone, and pixel P18 alone.

The directional interpolation for linear interpolation along line 68 is next illustrated for determining pixel values for pixels P45 and P54, assuming that neighbor pixels P36 and P63 are both available. The points Q0, Q1, Q2, Q3, and Q4 along line 68 are as shown in FIG. 9B. Point Q0, Q1, Q2, Q3, and Q4 is at the midpoint of the portion of line 68 that respectively spans pixel P27, P36, P45, P54, and P63. Let D12, D13, and D14 respectively denote the distance between point Q1 and point Q2, Q3, and Q4. Let F1214 and F1314 respectively denote D12/D14 and D13/D14. Let V36 and V63 respectively denote the pixel value at pixel P36 and P63. Then the pixel value at pixel P45 and P54 is $(1-F1214)*V36+F1214*V63$ and $(1-F1314)*V36+F1314*V63$, respectively.

The directional interpolation for linear interpolation along line 68 raises the question of how to do the interpolation if neighbor pixel P36 in not available and neighbor pixel P27 is available. If V27 denotes the pixel value at pixel P27 then V27 will substitute for V36 wherever V36 appears in the interpolation formula. However, the scope of the present invention includes three options for treating the distances along line 68.

A first option is to retain the parameters F1214 and F1314 in the interpolation formulas, which is conceptually equivalent utilizing point Q1 as a reference for measuring distances even though pixel P36 has been replaced by pixel P27 as the nearest available neighbor. For the first option, the pixel value at pixel P45 and P54 is $(1-F1214)*V27+F1214*V63$ and $(1-F1314)*V27+F1314*V63$, respectively.

A second option is to utilize distances from point Q0 where line 68 begins at neighbor pixel P27. For the second option, D02, D03, and D04 respectively denote the distance between point Q0 and point Q2, Q3, and Q4. Let F0204 and F0304 respectively denote D02/D04 and D03/D04. Then the pixel value at pixel P45 and P54 is $(1-F0204)*V27+F0204*V63$ and $(1-F0304)*V27+F0304*V63$, respectively.

A third option is to use a compromise between the first and second options. Instead of using either (F1214 and F1314) or (T0204 and F0304) as in the first and second options, the parameters $(F1214,F0204)_{AVE}$ and $(F1314,F0304)_{AVE}$ are used, wherein $(F1214,F0204)_{AVE}$ is a weighted or unweighted average of F1214 and F0204, and $(F1314,F0304)_{AVE}$ is a weighted or unweighted average of F1314 and F0304. Then the pixel value at pixel P45 and P54 is $(1-(F1214,F0204)_{AVE})*V27+(F1214,F0204)_{AVE}*V63$ and $(F1314,F0304)_{AVE}*V27+(F1314,F0304)_{AVE}*V63$, respectively. If $(F1214,F0204)_{AVE}$ and $(F1314,F0304)_{AVE}$ are weighted averages, the weighting could be based on extrinsic factors such as an extrinsic knowledge of the relative importance of pixels P36 and P27 to the image quality of the I-BLOCK 61 along line 68, irrespective of the distances of pixels P36 and P27 from points Q2 and Q3 along line 68.

Figure 9C:
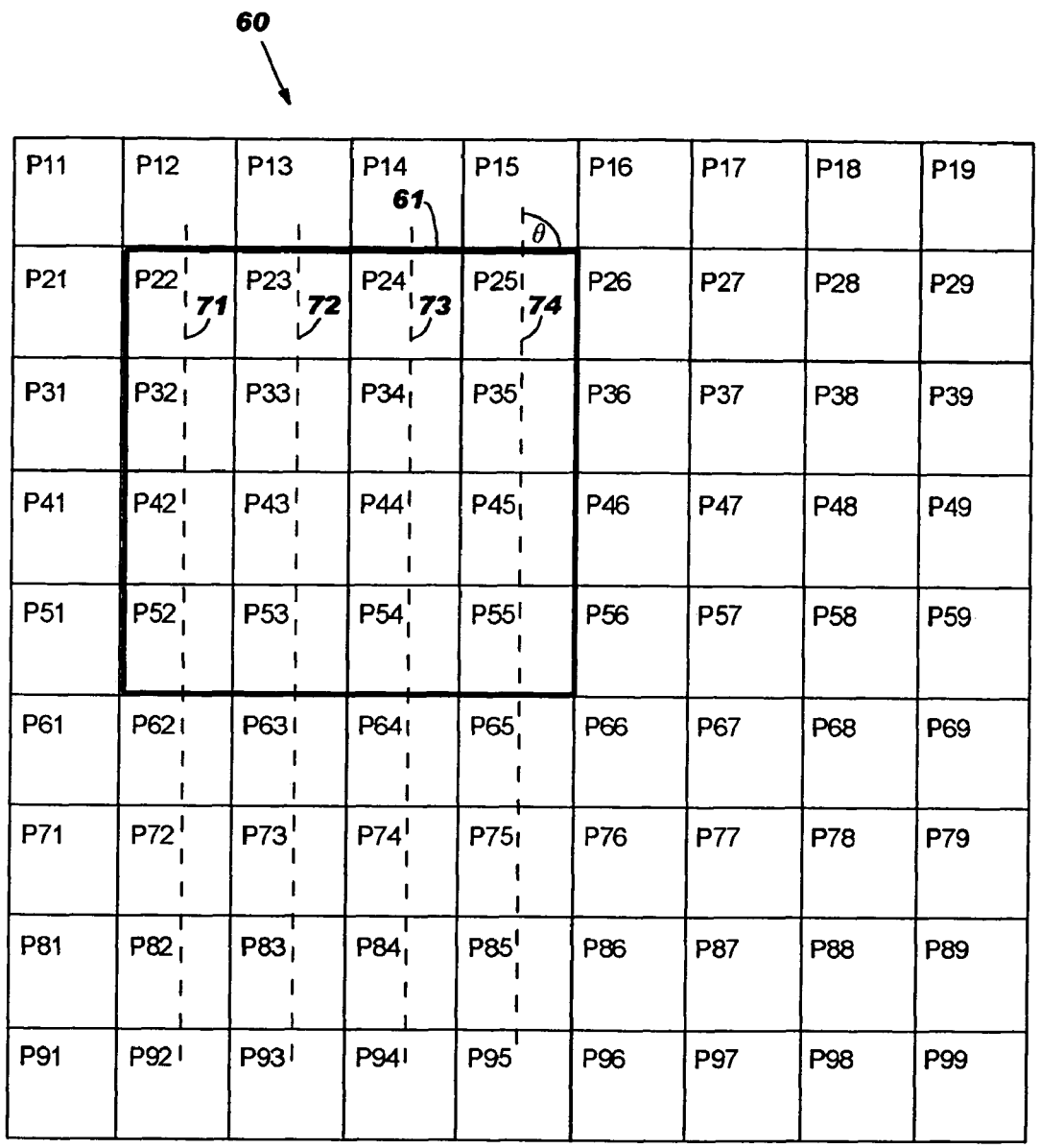

FIGS. 9C-9F are similar to FIG. 9B except for the value of θ. In FIG. 9C, θ=90 degrees for directional lines 71-74. Values at pixels P22, P32, P42, and P52 are determined from interpolation along line 71, using a subset of neighbor pixels P12, P62, P72, P82, and P92. Values at pixels P23, P33, P43, and P53 are determined from interpolation along line 72, using a subset of neighbor pixels P13, P63, P73, P83, and P93. Values at pixels P24, P34, P44, and P54 are determined from interpolation along line 73, using a subset of neighbor pixels P14, P64, P74, P84, and P94. Values at pixels P25, P35, P45, and P55 are determined from interpolation along line 74, using a subset of neighbor pixels P15, P65, P75, P85, and P95.

In FIG. 9D, θ=135 degrees for directional lines 81-87. The value at pixel P52 is determined from interpolation along line 81, using a subset of neighbor pixels P41, P63, P74, P85, and P96. Values at pixels P42 and P53 are determined from interpolation along line 82, using a subset of neighbor pixels P31, P64, P75, P86, and P97. Values at pixels P32, P43, and P54 are determined from interpolation along line 83, using a subset of neighbor pixels P21, P65, P76, P87, and P98. Values at pixels P22, P33, P44, and P55 are determined from interpolation along line 84, using a subset of neighbor pixels P11, P66, P77, P88, and P99. Values at pixels P23, P34, and P45 are determined from interpolation along line 85, using a subset of neighbor pixels P12, P56, P67, P78, and P89. Values at pixels P24 and P35 are determined from interpolation along line 86, using a subset of neighbor pixels P13, P46, P57, P68, and P79. The value at pixel P25 is determined from interpolation along line 87, using a subset of neighbor pixels P14, P36, P47, P58, and P69.

In FIG. 9E, θ=0 degrees (or 180 degrees) for directional lines 76-79. Values at pixels P22, P23, P24, and P25 are determined from interpolation along line 76, using a subset of neighbor pixels P21, P26, P27, P28, and P29. Values at pixels P32, P33, P34, and P35 are determined from interpolation along line 77, using a subset of neighbor pixels P31, P36, P37, P38, and P39. Values at pixels P42, P43, P44, and P45 are determined from interpolation along line 78, using a subset of neighbor pixels P41, P46, P47, P48, and P49. Values at pixels P52, P53, P54, and P55 are determined from interpolation along line 79, using a subset of neighbor pixels P51, P56, P57, P58, and P59.

In FIG. 9F, θ=26.56 degrees (i.e., θ is the inverse tangent of ⅔) for directional lines 101-105. Values at pixels P22 and P23 are determined from interpolation along line 101, using a subset of neighbor pixels P31 and P14. Values at pixels P32, P33, P24, and P25 are determined from interpolation along line 102, using a subset of neighbor pixels P41 and P16. Values at pixels P42, P43, P34, and P35 are determined from interpolation along line 103, using a subset of neighbor pixels P51, P26, P27, P18, and P19. Values at pixels P52, P53, P44, and P45 are determined from interpolation along line 104, using a subset of neighbor pixels P61, P36, P37, P28, and P29. Values at pixels P54 and P55 are determined from interpolation along line 105, using a subset of neighbor pixels P71, P46, P47, P38, and P39.

FIGS. 9A-9F illustrate directional spatial interpolation characterized by all pixel values in the I-BLOCK being determined by spatial interpolation along parallel directional lines. In contrast, FIGS. 7A-7C and Tables 1-5 illustrate nondirectional spatial interpolation characterized by all pixel values in the I-BLOCK being determined by nearest available neighbor spatial interpolation in which no directional line passing through the I-BLOCK is utilized in the spatial interpolations. Another spatial interpolation method for an I-BLOCK is hybrid spatial interpolation which comprises a combination of directional spatial interpolation and nondirectional spatial interpolation. With hybrid spatial interpolation, at least one directional line is used for some spatial interpolations in the I-BLOCK, and some pixel values in the I-BLOCK are determined by nearest available neighbor spatial interpolation in which no directional line passing through the I-BLOCK is utilized. When directional spatial interpolation or hybrid spatial interpolation is used, the chosen direction and hybrid mask must be coded and transmitted as side information. An embodiment of the present invention uses a short fixed Huffman code for this purpose.

FIG. 10 illustrates hybrid spatial interpolation, in accordance with an exemplary embodiment of the present invention. FIG. 10 includes directional lines 121-124 which are used in the spatial interpolations for determining values at pixels P25, P34, P43, and P52 (along line 121), pixels P35, P44, and P53 (along line 122), pixels P45 and P54 (along line 123), and pixel P55 (along line 124). However, values at pixels P22, P23, P24, P32, P33, and P42 are determined by nondirectional spatial interpolation using nearest neighbor upper pixels P12, P13, P14 and nearest neighbor left pixels P21, P31, and P41.

As illustrated in the preceding spatial interpolation examples associated with FIGS. 6-10 and Tables 1-5, the values for the pixels of each I-BLOCK in a given frame are calculated by spatial interpolation based on values of nearest available neighbor pixels relative to each the I-BLOCK in the given frame. A given pixel outside of a specified I-BLOCK of the given frame is the to be a neighbor pixel relative to the I-BLOCK if the given pixel is sufficiently close to the I-BLOCK to potentially contribute to the value of a pixel in the I-BLOCK by the spatial interpolation.

The preceding discussion herein in conjunction with FIGS. 6-10 and Tables 1-5 for determining values of pixels in I-BLOCKs by interpolation focused on linear interpolation. Nonetheless, the scope of the present invention includes nonlinear interpolation as well in accordance with any nonlinear interpolation scheme that exploits the relative importance of the various neighboring pixels which contribute to the value of the pixels in the I-BLOCK.

OBMC Processing

The present invention discloses exemplary embodiments relating to a processing of video frames, wherein each frame processed is divided into M blocks that include at least two differently sized blocks, and wherein M is at least 9.

With traditional block motion compensation, the current frame being processed is divided into blocks of pixels, wherein each such block $B_{CUR0}$ of pixels in the current frame is predicted from a block $B_{REF0}$ of the same size in the reference frame. The block $B_{CUR0}$ of pixels in the current frame is called a "current block" or a "self block". The self block $B_{CUR0}$ in the current frame is spatially shifted from the block $B_{REF0}$ in the reference frame by a motion vector $V_0$. Thus a pixel value $I_{CUR0}$ ($P_{CUR0}$) at a pixel location $P_0$ (identified by vector $P_{CUR0}$) in the self block $B_{CUR0}$ in the current frame is predicted to equal the pixel value $I_{REF0}$ ($P_{CUR0}-V_0$) at a pixel location identified by vector ($P_{CUR0}-V_0$) in the block $B_{REF0}$ in the reference frame. The dependent variable "I" denotes a pixel value of luminance and/or chrominance. A disadvantage of traditional block motion compensation relates to discontinuities introduced at block borders (blocking artifacts). The discontinuities may have the form of sharp horizontal and vertical edges which may be highly visible to the human eye and may also produce ringing effects (i.e., big coefficients in high frequency sub-bands) in the Fourier-related transform used for transform coding of the residual frames.

With overlapped block motion compensation (OBMC), nearest neighboring blocks of the self block $B_{CUR}$ may be utilized for predicting the pixel values in the self block $B_{CUR}$. For example, the nearest neighboring blocks may consist of the four nearest neighboring blocks immediately to the right, bottom, left, and top of the self block $B_{CUR}$, respectively denoted as $B_1$, $B_2$, $B_3$, and $B_4$ which are spatially shifted from corresponding blocks $B_{REF1}$, $B_{REF2}$, $B_{REF3}$, and $B_{REF4}$ in the reference frame by the motion vectors $V_1$, $V_2$, $V_3$, and $V_4$, respectively. The blocks $B_{REF1}$, $B_{REF2}$, $B_{REF3}$, and $B_{REF4}$ in the reference frame are most likely not nearest neighbor blocks of the block $B_{REF0}$ in the reference frame. A weight $W(P_{CUR0})$ is associated with a pixel location $P_0$ (identified by vector $P_{CUR0}$) in the self block $B_{CUR0}$. Weights $W(P_1)$, $W(P_2)$, $W(P_3)$, and $W(P_4)$ are associated with the pixel locations $P_1$, $P_2$, $P_3$, and $P_4$ in the nearest neighboring blocks $B_1$, $B_2$, $B_3$, and $B_4$, respectively, such that the pixel locations $P_1$, $P_2$, $P_3$, and $P_4$ correspond to the pixel location $P_0$. With OBMC, the pixel value $I_{CUR0}$ ($P_{CUR0}$) at the pixel location $P_0$ is predicted to equal $W(P_{CUR0})*I_{REF0}(P_{CUR0}-V_0)+[W(P_1)*I(P_1-V_1)+W(P_2)*I(P_2-V_2)+W(P_3)*I(P_3-V_3)+W(P_4)*I(P_4-V_4)]$. Thus, the predicted pixel value at the pixel location identified by vector $P_{CUR0}$ in the self block $B_{CUR0}$ mitigates the discontinuities introduced at block borders by taking into account pixel value contributions from nearest neighbor blocks in their displaced locations in the reference frame. An array of weights that includes $W(P_{CUR0})$ for all pixels in the self block $B_{CUR0}$ constitutes a "weighting window" for the self block $B_{CUR0}$. Similarly, an array of weights that includes $W(P_1)$, $W(P_2)$, $W(P_3)$, and $W(P_4)$, for all pixels in the nearest neighboring blocks $B_1$, $B_2$, $B_3$, and $B_4$ constitutes a weighting window for the nearest neighboring blocks $B_1$, $B_2$, $B_3$, and $B_4$, respectively. Examples of weighting windows and their generation according to the present invention are presented in FIGS. 17, 18, 21, and 22, discussed infra.

The present invention discloses variable block size OBMC. The blocks in the current frame and its relationship to blocks in the reference frame are illustrated next in FIGS. 11 and 12.

Figure 11:
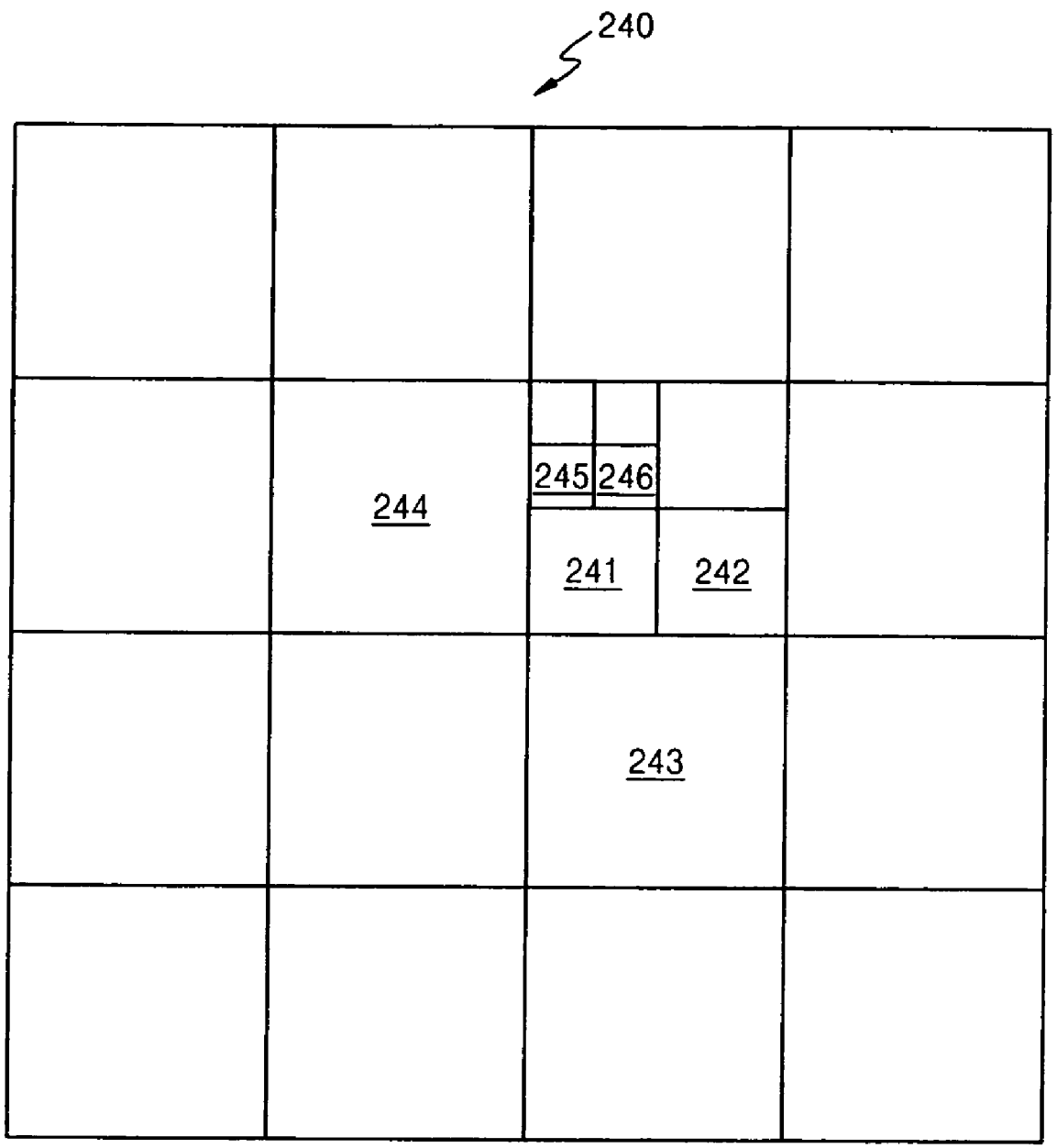
FIG. 11 illustrates a current frame that has been configured into variable-size blocks, in accordance with an exemplary embodiment of the present invention.

FIG. 11 illustrates a current frame 240 that has been configured into variables size blocks (e.g., by a quad tree algorithm), in accordance with an exemplary embodiment of the present invention. The current frame 240 comprises 22 blocks as shown. Each block of FIG. 11 is processed as a self block in consideration of its nearest neighbor blocks. For example, consider block 241 being processed as a self block. Self block 244 has nearest neighbor blocks 242-246. Note the self block may have a size that is equal to, larger than or smaller than the nearest neighbor block. In FIG. 11, the size of the self block 241 is equal to the size of its nearest neighbor block 242, larger than the size of its nearest neighbor blocks 245 and 246, and smaller than the size of its nearest neighbor blocks 243 and 244.

Figure 12:
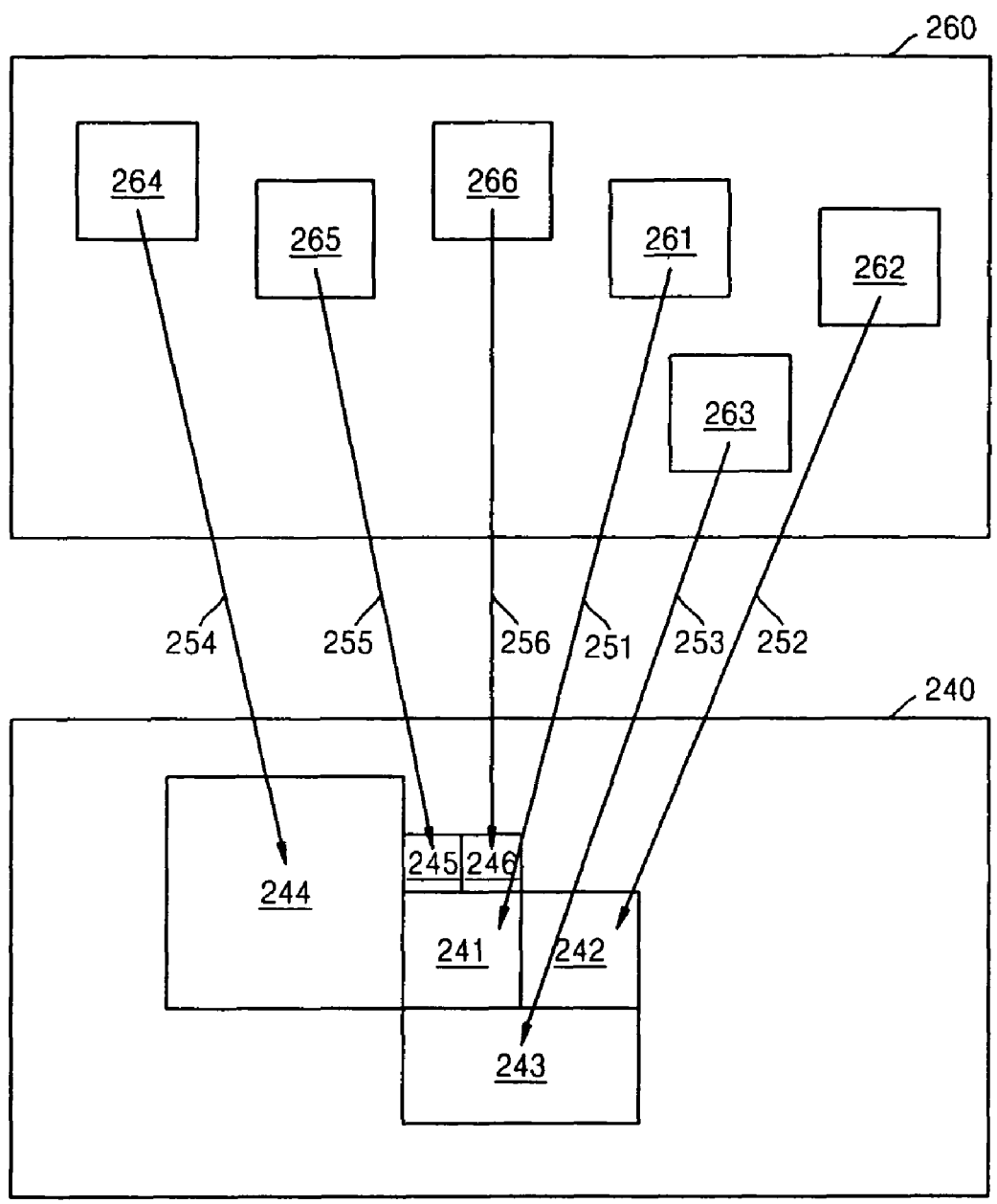
FIG. 12 illustrates the current frame of FIG. 11 and its reference frame together with motion vectors that link blocks in the current frame with corresponding blocks in the reference frame, in accordance with an exemplary embodiment of the present invention.

FIG. 12 illustrates the current frame 240 of FIG. 11 and a reference frame 260 together with vectors 251-256 that respectively link blocks 241-246 in the current frame 240 with corresponding blocks 261-266 in the reference frame 260, in accordance with an exemplary embodiment of the present invention. A normal projection of the vectors 251-256 onto the reference frame 260 are the motion vectors denoting a vector displacement of the blocks 241-246 from the blocks 261-266, respectively. Although the blocks 261-266 appear for simplicity as having the same size in the reference frame 260, the blocks 261-266 in reality have the same size as their corresponding blocks 241-246, respectively, in the current frame 240. The reference frame 260 represents one or more reference frames, each such reference frame having its own motion vectors and blocks associated with the blocks of the current frame, since each pixel in the current frame may be predicted from corresponding pixels in a single reference frame or in a plurality of reference frames.

The present invention discloses a method of compressing video that involves a spatiotemporal or space-time transformation utilizing motion compensated blocks in pairs of input frames, such as the representative pair having input frames A and B discussed supra in conjunction with FIG. 3. These blocks are of various sizes and are chosen to match the local motion vector field, so there are small blocks where the motion has a high spatial gradient and large blocks in more flat regions where the spatial gradient of the motion is small. Nevertheless as explained supra, the motion vectors of the different blocks are not continuous across the block edges. As a result artifacts can be created in the prediction of one frame from the other frame. OBMC of the present invention addresses this problem by making the prediction from a weighted combination of estimates using the current block's motion vector and the motion vectors of its nearest neighbor blocks. The OBMC of the present invention is further improved by iterative adjustments to the block motion vectors to arrive at improved motion vectors, which increase the accuracy of the resulting frame prediction and therefore increase coding efficiency. With the present invention, this iteration may be optionally omitted. The output of the MCTF obtained using the OBMC is then compressed for transmission or storage. Additionally, the motion vectors are sent to the receiver as overhead, and may constitute about 10-15% of the total bit rate.

Figure 13A:
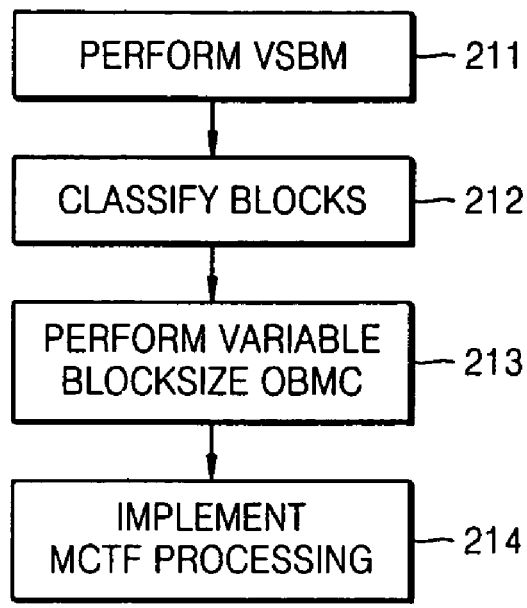
FIG. 13A is a flow chart for utilizing variable block-size OBMC in the MCTF temporal high frames of FIG. 2, in accordance with an exemplary embodiment of the present invention.
Figure 15:
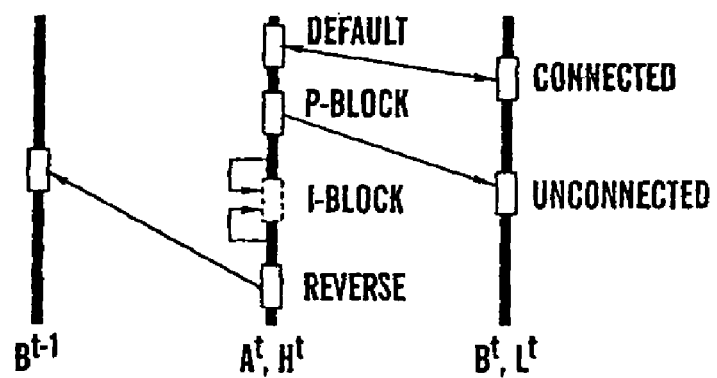
FIG. 15 illustrates two successive input frames to be transformed by the MCTF into a high temporal frame and a low temporal frame, in accordance with an exemplary embodiment of the present invention.

FIG. 13A is a flow chart illustrating a method for utilizing variable block size OBMC in the MCTF temporal high frames of FIG. 2, in accordance with an exemplary embodiment of the present invention. Prior to operation 211, the current frame has been configured into M blocks that include at least two differently sized blocks, wherein M is at least 9. In operation 211, the variable size block matching (VSBM) is performed to obtain the initial vectors for the motion blocks as is known in the art (e.g., see Ostermann, and Zhang, "Video Processing and Communications", Prentice-Hall, pp. 182-187 (2002)). I operation 212, the blocks in the current frame are classified as being either I-BLOCKs or motion blocks. A "motion block" is defined to be a non I-BLOCK. Detection and classification of unconnected blocks (i.e., I-BLOCKs and P-BLOCKs) and uniconnected blocks was described supra in conjunction with operations 31-36 of FIG. 3. FIG. 15 describes infra the various categories of motion blocks including P-BLOCKs, DEFAULT blocks, and REVERSE blocks. In operation 213, variable block size OBMC is performed to provide an overlap smoothing for the motion blocks and the I-BLOCKs. In operation 214, the motion field (i.e., the smoothed motion blocks and/or I-BLOCKs) generated in operation 213 is processed in accordance with MCTF.

Figure 13B:
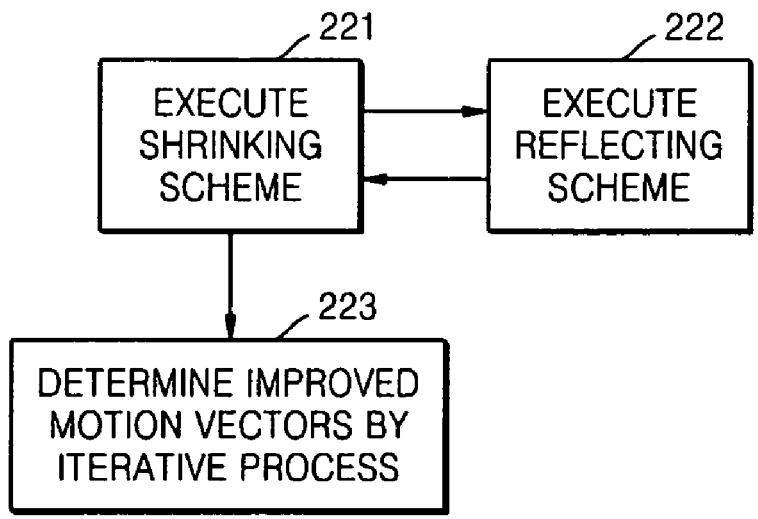
FIG. 13B is a flow chart describing the variable block-size OBMC processing operation of FIG. 13A, in accordance with an exemplary embodiment of the present invention.

FIG. 13B is a flow chart illustrating the variable block size OBMC processing of operation 213 of FIG. 13A, in accordance with an exemplary embodiment of the present invention. For a given self block and associated nearest neighbor block in the current frame, operation 221 executes a shrinking scheme that generates a weighting window for the self block and its associated nearest neighbor block which takes into account whether the self block is a motion block or an I-BLOCK, and also takes into account whether the nearest neighbor block is a motion block or an I-BLOCK. If the nearest neighbor block is an I-BLOCK, the shrinking scheme of operation 221 invokes operation 222 which executes a reflecting scheme that impacts the generation of the weighting widows in a manner that accounts for the intrinsic inability of the nearest neighbor I-BLOCK to communicate with the reference frame.

The shrinking scheme execution operation 221 is performed for all nearest neighbor blocks of the given self block, and then for all self blocks of the current frame in a sequence dictated by a predetermined scan order. Operation 223 is executed, wherein an initial motion vector for each self block in the current frame has been utilized. Although the initial motion vectors for the self blocks were used to generate the weighting windows, the initial motion vectors may not be the optimum weighting windows inasmuch as a perturbed set of motion vectors may result in more accurate predictions of pixel values in the current frame when the generated weighting windows are taken into account. Accordingly, operation 223 performs an iterative process such that each iteration perturbs the motion vectors in a manner that improves the accuracy of pixel values in the current frame in light of the weighting windows generated in operation 222.

Operations 221-223 in FIG. 13B reflect a simplified description of the variable block size OBMC processing operation 213 of FIG. 13A. Following the illustrative weighting window generation examples of FIGS. 16-18 and 21-22, FIG. 23 illustrates a flow chart that describes in detail an exemplary embodiment of the variable block size OBMC processing of operations 221-222 of FIG. 13B. In addition, FIG. 24 illustrates a flow chart that describes in detail the iterative process for improving the motion vectors in operation 223 of FIG. 13B.

Figure 14:
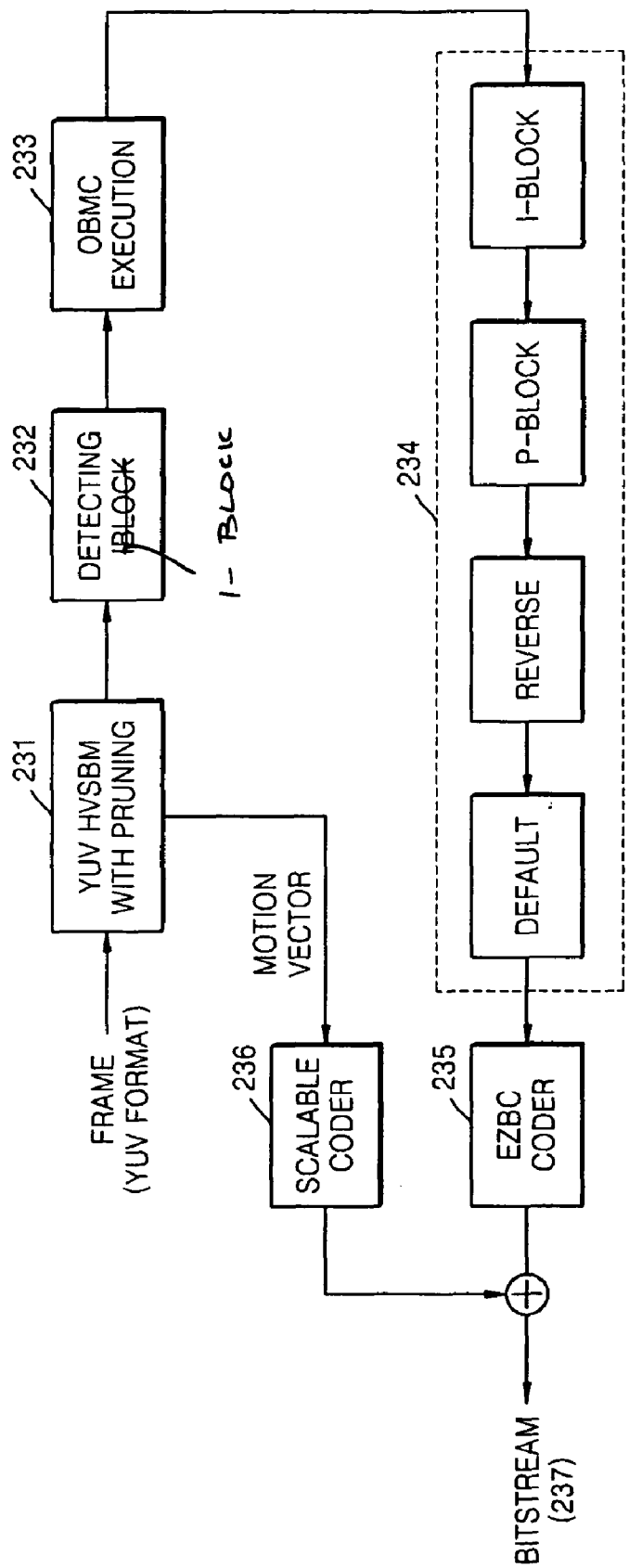
FIG. 14 is a block diagram of frame processing associated with the flow charts of FIGS. 13A-13B, in accordance with an exemplary embodiment of the present invention.

FIG. 14 is a block diagram of frame processing associated with the flow charts of FIGS. 13A-13B, in accordance with an exemplary embodiment of the present invention. FIG. 14 illustrates the following sequentially ordered processing: the component (YUV) hierarchical variable-size block matching (HVSBM) motion estimation 231 (which corresponds to operation 211 of FIG. 13A); I-BLOCK detection 232 (which corresponds to operation 212 of FIG. 13A); variable block size OBMC execution 233 (which is performed in operation 213 of FIG. 13A); MTCF processing 234 (which corresponds to operation 214 of FIG. 13A); and MC-EZBC coder processing 235. The HVSBM motion estimation 231 generates motion vectors which are processed by an arithmetic coder 236. A bit stream 237 is formed from coded output generated by the EZBC 235 and from coded output generated by the arithmetic coder 236.

In FIG. 14, the MCTF processing 234 sequentially comprises the processing of I-BLOCKs, P-BLOCKs, REVERSE blocks, and DEFAULT blocks. The REVERSE block prediction comprises a prediction of those blocks best predicted from the previous B frame. The pixels of the DEFAULT block includes those pixels actually taking part in the MC filtering, both for the "predict" operation for parent frame H and the "update" operation for parent frame L.

FIG. 15 illustrates two successive input frames A and B to be transformed by the MCTF into a high temporal frame H and a low temporal frame L, in accordance with an exemplary embodiment of the present invention. See FIG. 2 (and a discussion thereof supra) for a derivation of the H and L frames from frames A and B by the MCTF processing. In FIG. 2, however, a different choice is made for the temporal location of the H and L frames. In FIG. 2 the L frame is time referenced to that of the input frame A and the H frame is time referenced to that of the input frame B, whereas in FIG. 15 the H frame is time referenced to that of the input frame A and the L frame is time referenced to that of the input frame B. Actually, either set of time references has been found to work well and is present in modern MCTF based scalable video coders. The superscript "t" and "t−1" respectively denote a current time t and the previous time t−1. As indicated by the double arrow heads, the DEFAULT blocks participate in both predict (for frame H) and update (for frame L) processing, as mentioned supra. As indicated by single arrow heads, the PBLOCKs, REVERSE blocks and I-BLOCKs only affect one frame, namely the H frame. Update is not shown for these blocks. The I-BLOCK denotes a block employing spatial interpolation/prediction only as discussed supra. After I-BLOCK detection, the variable size OBMC execution 233 of FIG. 14 is performed.

In the OBMC framework, the present invention views any data received by the decoder prior to the decoding of a frame as a source of information about the true prediction scheme finally employed.

Figure 16:
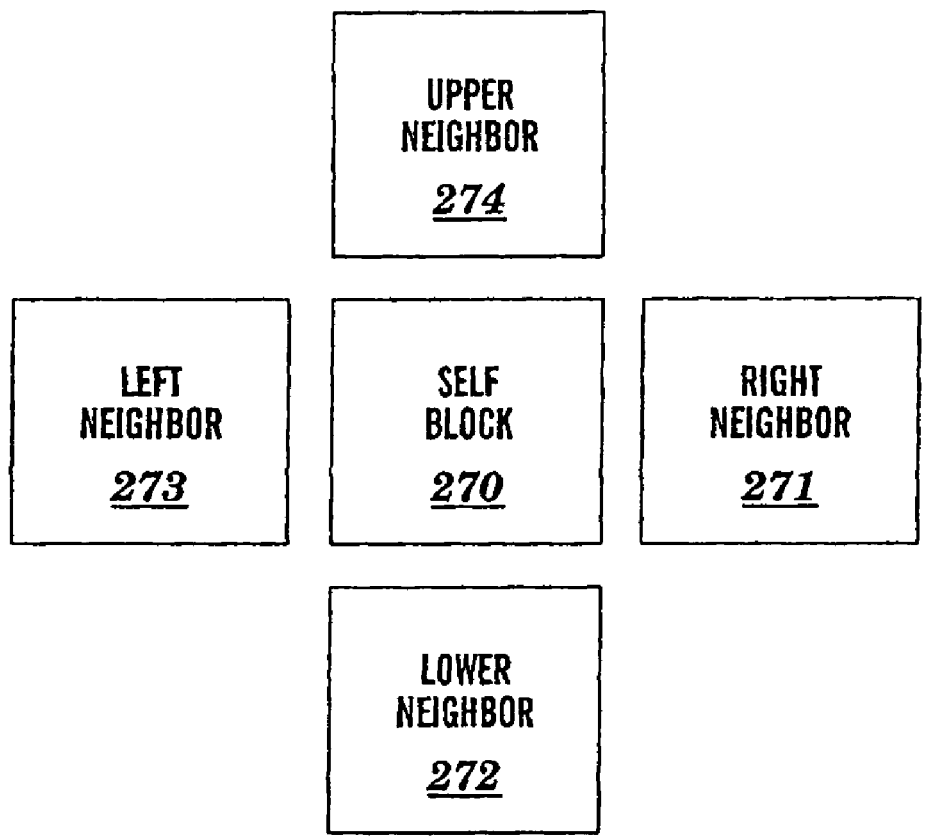
FIG. 16 illustrates a self block and associated nearest neighboring blocks used by OBMC, in accordance with an exemplary embodiment of the present invention.

FIG. 16 illustrates a self block and four nearest neighbor blocks in the current frame, in accordance with an exemplary embodiment of the present invention. The four nearest neighbor blocks of the self block 270 in FIG. 16 are a right nearest neighbor 271, a lower nearest neighbor 272, a left nearest neighbor 273, and an upper nearest neighbor 274. For the illustrated examples of FIGS. 17-18 discussed infra, the self block and its nearest neighbor blocks are assumed to have the same size. According to the preceding assumption, the weighting window used is symmetric left-to-right and top-to-bottom.

Figure 17A:
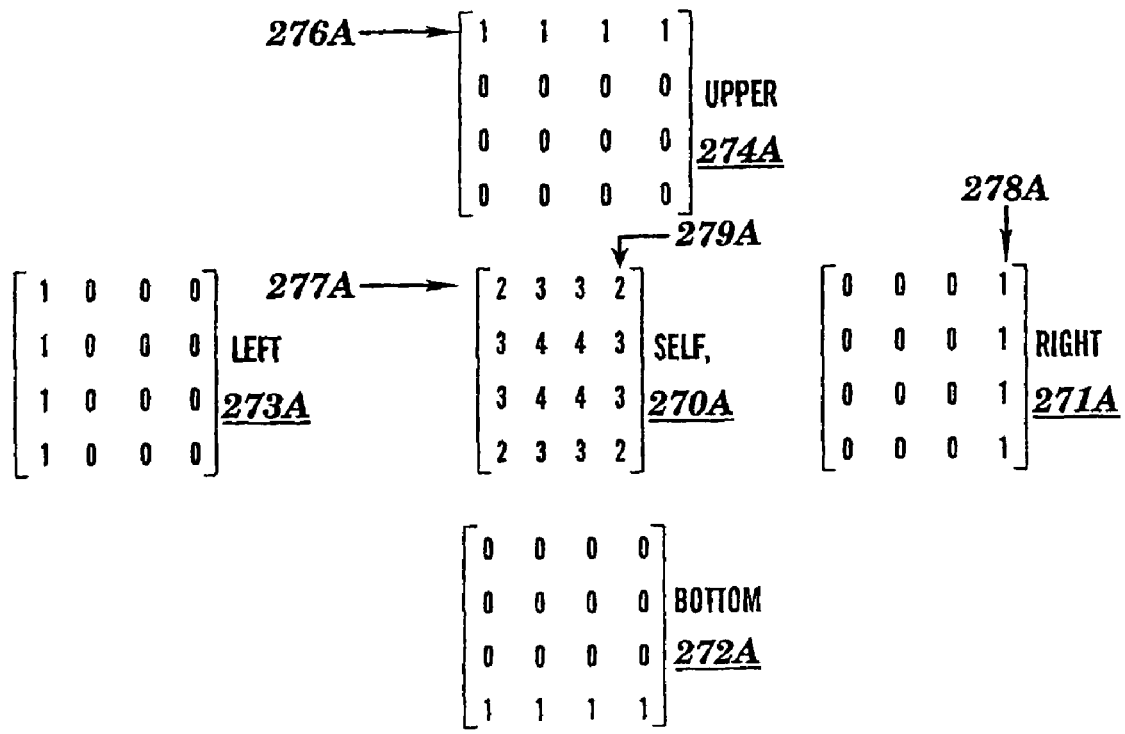
FIG. 17A illustrates 4×4 weighting windows, wherein a self block is a motion block, in accordance with an exemplary embodiment of the present invention.
Figure 17B:
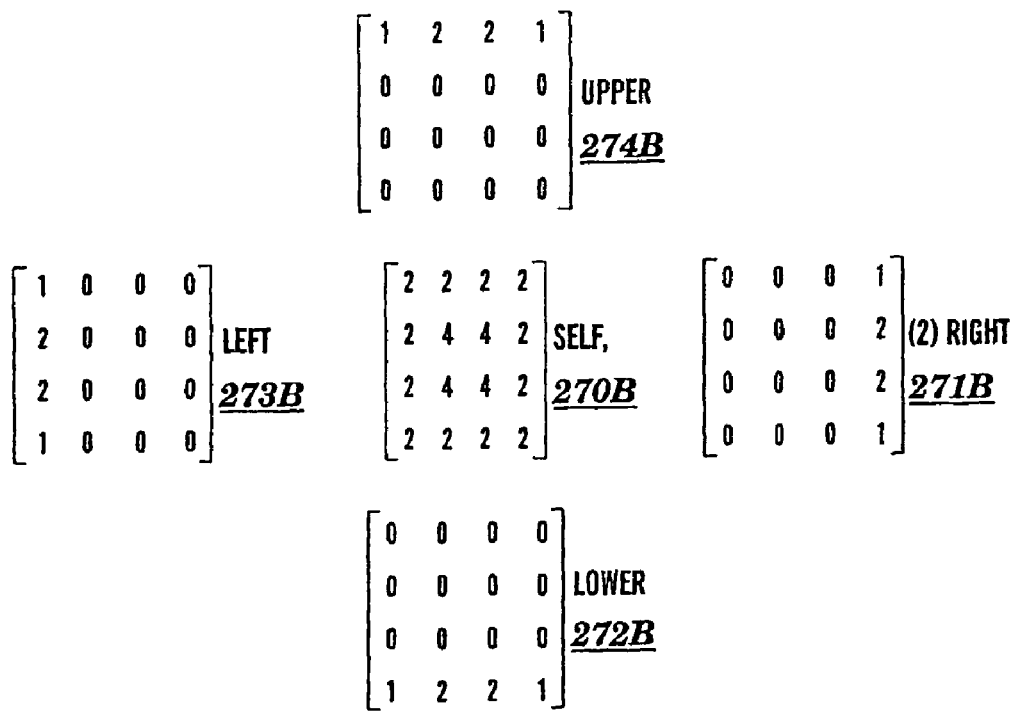
FIG. 17B illustrates 4×4 weighting windows, wherein a self block is an I-BLOCK, in accordance with an exemplary embodiment of the present invention.

FIGS. 17A and 17B illustrate 4×4 weighting windows, in accordance with an exemplary embodiment of the present invention. In FIG. 17A the self block is a motion block, and in FIG. 17B the self block is an I-BLOCK. FIG. 17A shows a weighting window 270A for the self block and its associated nearest neighbor weighting windows 271A, 272A, 273A, and 274A for the right nearest neighbor block, lower nearest neighbor block, left nearest neighbor block, and upper nearest neighbor block, respectively. FIG. 17B shows a weighting window 270B for the self block and its associated nearest neighbor weighting windows 271B, 272B, 273B, and 274B for the right nearest neighbor block, lower nearest neighbor block, left nearest neighbor block, and upper nearest neighbor block, respectively.

The following convention is used to represent the weighting windows in the examples of FIGS. 17, 18, 21A-21C and 22A-22C, using FIG. 17A for illustrative purposes. For the self block weighting window 270A, the pixel weights shown in FIG. 17A are in the same relative pixel positions as are the corresponding pixel values at the physical pixel locations. For the nearest neighbor blocks, however, the pixel weights shown in FIG. 17A are ordered and displayed reflectively opposite the corresponding pixel values at the physical pixel locations. For example in FIG. 17A with respect to the self block weighting window 270A and its upper neighbor weighting window 274A, the uppermost row 276A of weights (1 1 1 1) of the upper neighbor weighting window 274A is for pixels in the top row 277A of the self block (in terms of physical pixel locations) weighting window 270A. As another example in FIG. 17A with respect to the self block weighting window 270A and its right neighbor weighting window 271A, the rightmost column 278A of weights (1 1 1 1) of the right neighbor weighting window 271A is for pixels in the rightmost column 279A of the self block 270A.

The preceding convention has the visual advantage that if a nearest neighbor weighting window is superimposed over the self block weighting window 270A, the indicated weight at a given matrix position in the nearest neighbor-block weighting window and the weight directly underneath this matrix position in the self-block weighting window are being used as weights for the same physical pixel in the OBMC calculation of the present invention. Thus, when all nearest neighbor weighting windows are superimposed over the self block weighting window 270A, the sum of the weights at each matrix position is 4, or generally N for N×N blocks. For example in FIG. 17A, when all nearest neighbor weighting windows are superimposed over the self block weighting window 270A at the upper-right corner matrix position, the weights for the self block weighting window 270A, right neighbor weighting window 271A, lower neighbor weighting window 272A, left neighbor weighting window 273A, and upper neighbor weighting window 274A are 2, 1, 0, 0, and 1, respectively, which are summed to equal 4.

For a weighting window to be a probability weighting window, the sum of the weights in the weighting window would be equal to 1, which would result in the weights having a fractional or decimal value less than or equal to 1. For simplicity of representing the weights numerically, the weighting windows used in the illustrative examples herein in FIGS. 17-20 are normalized such that the sum of the weights is equal to N (instead of equal to 1) for a N×N weighting window size, with the understanding that the weighting window should be implemented as a probability weighting window (or its equivalent) when the weights in the weighting window are used to calculate pixel values.

In FIG. 17A with a fixed 4×4 block size, the self block is a motion block and two-dimensional (2-D) bilinear (i.e., straight-line) interpolation is used to determine the weights in the self block weighting window 270A and the nearest neighbor weighting windows 271A, 272A, 273A, and 274A. The 2-D bilinearly interpolated pixel values correspond to linear interpolation along the straight line between the center of the self block and the center of the neighboring block. Since the 2-D bilinear interpolation is two-dimensional, a bilinearly interpolated weight is the product of such interpolated values in two mutually orthogonal directions. The weights resulting from the 2-D bilinear interpolation have been rounded to the nearest integer, subject to the constraint that the normalization condition (i.e., the sum of the weights associated with each pixel is equal to N) is satisfied. If one or more self block boundaries coincide with a frame boundary, then at least one side of the self block will not have a nearest neighbor block and the resultant bilinear weighting window weights will therefore differ from the bilinear weighting window weights that exist when no self block boundary coincides with a frame boundary. Studies indicate that the 2-D bilinear interpolation weighting window is nearly as accurate as an iterated optimal weighting window. However, other forms of interpolation (e.g., biquadratic interpolation, exponential interpolation, etc.) may be used instead of bilinear interpolation for the weighting windows of FIG. 17A or for weighting windows of any other embodiment discussed herein such that bilinear interpolation is disclosed as being used.

In FIG. 17B, with fixed 4×4 block size, the self block is an I-BLOCK. The weights in the weighting windows in FIG. 17B are derived from the weights in the weighting windows in FIG. 17A by extracting portions of the weights in the self-block weighting window in and adding the portions to selected weights in the nearest neighbor weighting windows, subject to the constraint that the normalization condition is satisfied. The "portion of the weights" adjustment was experimentally determined in terms of giving a good visual error performance and was not optimized in any way. Other "portion of the weights" adjustments may be utilized if validated or substantiated by experimental and/or analytical methodology. The selected weights are weights which are near the block boundaries. The preceding modification of the weights of FIG. 17A when the self block is an IBLOCK facilitates a more aggressive smoothing of the interpolated pixel values at self block boundaries, by providing relatively higher weights to the neighbor blocks. The weight distribution method used for FIG. 17B is a "radiation scheme" that radiates weight components outward from the self cell to its neighbor cells.

For FIG. 17A and/or FIG. 17B, once the nearest neighbor weighting window has been determined for the right nearest neighbor, the nearest neighbor weighting window for the left nearest neighbor may be determined by exploiting the reflective symmetry shown in FIG. 16, or may be calculated via bilinear interpolation. Similarly, once the nearest neighbor weighting window has been determined for the bottom nearest neighbor, the nearest neighbor weighting window for the top nearest neighbor may be determined by exploiting the reflective symmetry shown in FIG. 16, or may be calculated via bilinear interpolation.

The example of FIGS. 17A and 17B illustrate an exemplary embodiment, wherein the self block is an I-BLOCK, and wherein the generated window of the self block consists of first pixel weights and second pixel weights. The first pixel weights are less than what the first pixel weights would have been if the self block had been a motion block, and the second pixel weights are equal to what the second pixel weights would have been if the self block had been the motion block. For example, the first pixel weights of "2" in selected matrix positions of the self I-BLOCK 270B of FIG. 17B are less than the weights of "3" in the corresponding selected matrix positions of the motion block 270A of FIG. 17A, and the second pixel weights are the remaining pixel weights which are the same weights (i.e., same weight magnitudes) in the self I-BLOCK 270B of FIG. 17B and the motion block 270A of FIG. 17A.

Accordingly, generating the weighting window for the self block may comprise: generating a first weighting window for the self block as if the self block is the motion block (e.g., generating the motion block 270A of FIG. 17A); and generating the weighting window for the self block from the first weighting window by reducing weights in the first weighting window (e.g., generating the self I-BLOCK 270B of FIG. 17B by reducing the weights in the motion block 270A of FIG. 17A).

Moreover, in the preceding embodiment illustrated by the example of FIGS. 17A and 17B, the generated window of each neighbor block of the self block may consist of third pixel weights and fourth pixel weights, wherein the third pixel weights are greater than what the third pixel weights would have been if the self block had been the motion block, and wherein the fourth pixel weights are equal to what the fourth pixel weights would have been if the self block had been the motion block. For example, the third weights are illustrated by selected portions of the right, bottom, left, and upper neighbor block weights which are greater in magnitude in FIG. 17B than in FIG. 17A, and the fourth weights are illustrated by the remaining portions of the right, bottom, left, and upper neighbor block weights which are equal in magnitude in FIG. 17B and FIG. 17A.

FIGS. 18A and 18B illustrate 8×8 weighting windows wherein the associated self block is a motion block and an IBLOCK, respectively, in accordance with an exemplary embodiment of the present invention. FIG. 18A shows a weighting window 270C for the self block and its associated nearest neighbor weighting windows 271C, 272C, 273C, and 274C for the right nearest neighbor block, lower nearest neighbor block, left nearest neighbor block, and upper nearest neighbor block, respectively. FIG. 18B shows a weighting window 270D for the self block and its associated nearest neighbor weighting windows 271D, 272D, 273D, and 274D for the right nearest neighbor block, lower nearest neighbor block, left nearest neighbor block, and upper nearest neighbor block, respectively. The methods for generating the weighting windows in FIGS. 18A and 18B are the same as the methods used to generate the weighting windows in FIGS. 17A and 17B as described supra.

Shrinking Scheme

As explained supra in conjunction with FIGS. 11 and 12, the self block and its associated nearest neighbor blocks may all have the same size, or the size of the self block may differ from the size of at least one of its associated nearest neighbor blocks. Essentially, there are three exemplary embodiments for a nearest neighbor block associated with of a given self block:

The spatial nearest neighbor block size is the same as that of the self block (e.g., self block 241 and its neighbor block 242 in FIG. 14), which is the "standard same block-size" case analyzed supra in conjunction with FIGS. 17A-18B. Thus, the weighting windows for this embodiment are generated as described supra in conjunction with FIGS. 17A-18B.

Figure 19:
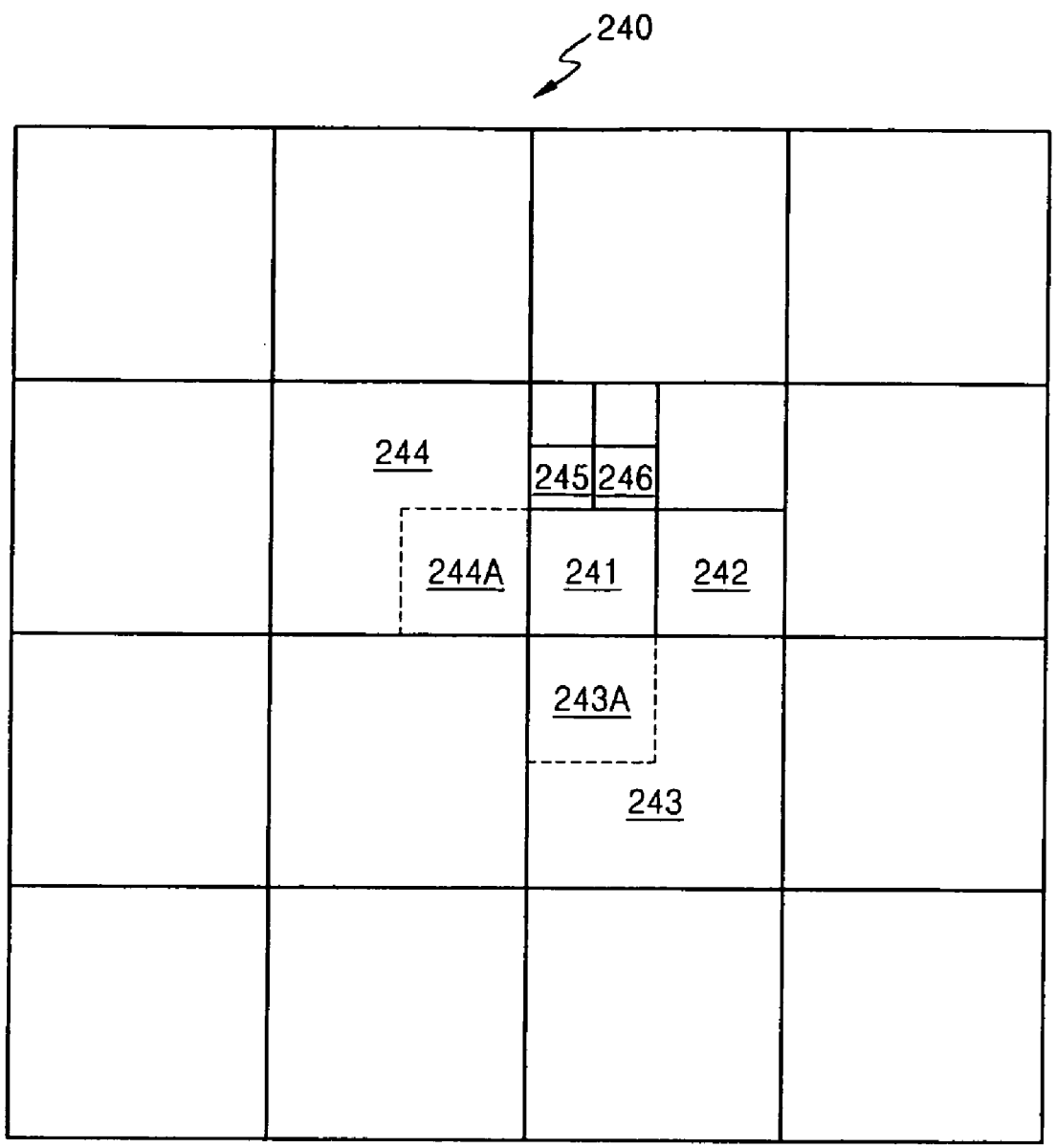
FIG. 19 shows the frame of FIG. 11 such that portions of selected nearest neighbor blocks are depicted, the selected nearest neighbor blocks being larger than their associated self block, in accordance with an exemplary embodiment of the present invention.

The spatial nearest neighbor block size is larger than that of the self block (e.g., self block 241 and its neighbor blocks 243 and 244 in FIG. 11), which is treated by utilizing the portion of the larger nearest neighbor block that is the same size as the self block, wherein the portion occupies the same space within the current frame as does the nearest neighbor block of the standard same block-size case (a). To illustrate, FIG. 19 illustrates frame 240 of FIG. 11, wherein portions 243A and 244A of nearest neighbor blocks 243 and 244 are shown, in accordance with an exemplary embodiment of the present invention. Portions 243A and 244A have the same size as self block 241 and occupy the space within the frame 240 appropriate to the standard same block-size case. For this embodiment, the portions 243A and 244A of nearest neighbor blocks 243 and 244, respectively, are utilized as effective nearest neighbor blocks to the self block 241. Thus, the portion 243A portion of the neighbor block 243 is the only portion of the neighbor block 243 whose weighting window impacts a predicting of pixel values in the self block 241 during the performing of OBMC on the self block 241. Similarly, the portion 244A of the neighbor block 244 is the only portion of the neighbor block 244 whose weighting window impacts a predicting of pixel values in the self block 241 during the performing of OBMC on the self block 241. In effect, the present invention "shrinks" the blocks 243 and 244 to the respective portions 243A and 244A. The self block 241 and the neighbor block 243 (or 244) may each be a motion block, wherein the generated weighting window of the portion 243A (or 244A) of the neighbor block 243 (or 244) may consist of bilinearly interpolated weights. The weighting windows for this embodiment are generated as described supra in conjunction with FIGS. 17A-18B for the standard same block-size case. However, the motion vector associated with the larger nearest neighbor block are used to provide the weighted neighbor estimate. For example with reference to FIG. 12, the motion vector 253 would be used to locate the block 263 in the reference frame 260 in conjunction with utilizing the portion 243A (see FIG. 19) of the larger neighbor block 243 for processing the self block 241.

Figure 20:
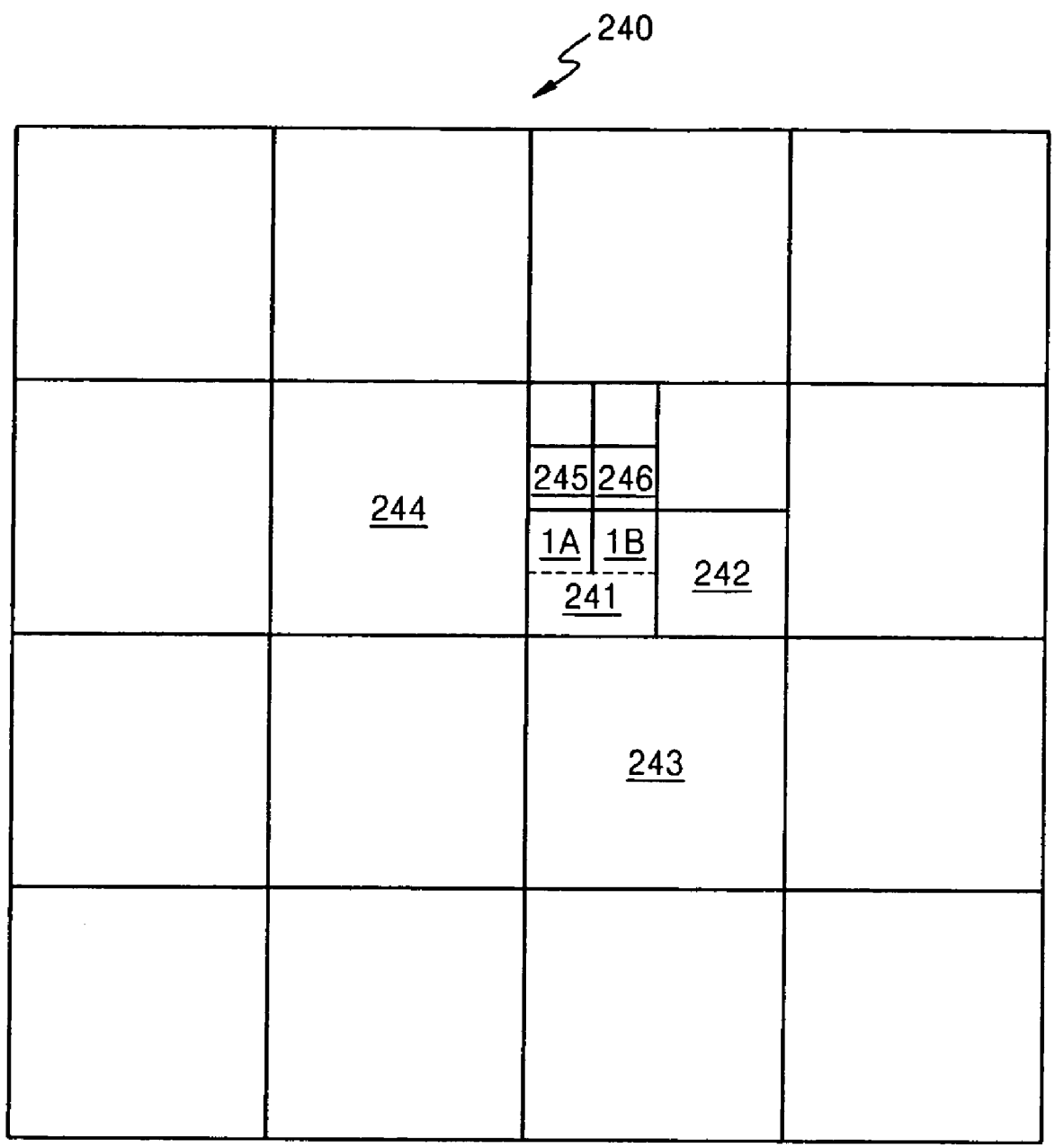
FIG. 20 shows the frame of FIG. 11, depicting portions of a self block that is larger than associated nearest neighbor blocks, in accordance with an exemplary embodiment of the present invention.

The spatial nearest neighbor block size is smaller than that of the self block (e.g., self block 241 and its neighbor blocks 245 and 246 in FIG. 11), which necessitates choosing a portion of the self block to be of the same size as the smaller nearest neighbor block and adjacently located with respect to smaller nearest neighbor block. To illustrate, FIG. 20 illustrates frame 240 of FIG. 11, wherein portions 1A and 1B of self block 241 are shown, in accordance with an exemplary embodiment of the present invention. Portions 1A and 1B have the same size as (and are located adjacent to) the nearest neighbor blocks 245 and 246, respectively. For this embodiment, the portions 1A and 1B of the self block 241 are utilized as effective self block portions with respect to the nearest neighbor blocks 245 and 246, respectively. The portion 1A of the self block 241 is the only portion of the self block 241 at which a predicting of pixel values is impacted by the weighting window of the neighbor block 245 during the performing of OBMC on the portion 1A of the self block 241. Similarly, the portion 1B of the self block 241 is the only portion of the self block 241 at which a predicting of pixel values is impacted by the weighting window of the neighbor block 246 during the performing of OBMC on the portion 1A of the self block 241. In effect, the present invention "shrinks" the self block 241 so as to utilize only the portions 1A and 1B

For the embodiment in which the spatial nearest neighbor block size is smaller than that of the self block, the weighting windows are generated as described infra in conjunction with the shrinking scheme examples of FIGS. 21A-21C and 22A-22C, wherein each utilized portion of the self block comprise an affected area and an unaffected area such that the affected area is affected by the smaller nearest neighbor block and the unaffected area is not affected by the smaller nearest neighbor block. For some applications, the affected area may comprise half of the smaller nearest neighbor block size, both horizontally and vertically. The weights in the weighting window of the affected area of the utilized portion of the self block and the corresponding portion of the weighting window of the smaller nearest neighbor block are the same as is derived from the standard same block-size case. The weights in the portion of the weighting window of the smaller nearest neighbor block that corresponds to the unaffected area of the utilized portion of the self block are "removed" and then set equal to zero. The weights in the unaffected area of the utilized portion of the self block are incremented (relative to the standard same block-size case) by the removed weights from the corresponding portion of the weighting window of the smaller nearest neighbor block, as will be illustrated infra in conjunction with the example of FIGS. 22A-22C.

Since a self block may have a different motion vector from its smaller nearest neighbor, this shrinking scheme reduces the smoothing at a motion discontinuity, since this shrinking scheme reduces the smoothing radius to be compatible with the smaller nearest neighbor block size.

For each self block, the operations of analyzing the relative block size of its nearest neighbors are repeated for each such nearest neighbor. The self blocks are sequentially processed in accordance with a predetermined scan order.

Figures 21A, 21B, 21C:
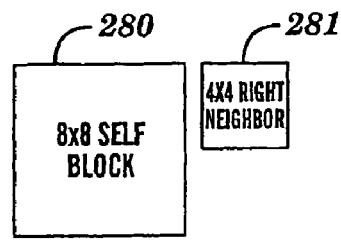
FIGS. 21A through 21C depict weighting windows for a self block and an associated smaller nearest neighboring block used by OBMC in conjunction with a shrinking scheme wherein the nearest neighboring block is a motion block, in accordance with an exemplary embodiment of the present invention.

FIGS. 21A-21C depict weighting windows for a self block and an associated smaller nearest neighboring block used by OBMC in conjunction with a shrinking scheme, wherein the nearest neighboring block is a motion block, in accordance with an exemplary embodiment of the present invention. In FIG. 21A, the self block 280 is an 8×8 block, and its right neighbor block 281 is a 4×4 block.

FIG. 21B provides a self block weighting window 280A and its right neighbor weighting window 281A, respectively associated with the self block 280 and the right neighbor block 281 of FIG. 21A. In FIG. 21B, the self block weighting window 280A includes a utilized portion 282A that is utilized in the OBMC procedure in conjunction with the right neighbor weighting window 281A. The utilized portion 282A is a "shrinked" form of the self block weighting window 280A and has the same size as the right neighbor weighting window 281A.

In FIG. 21B, the numerical weights shown are not the final weights but rather are the standard initial weights used for computing the final weights. The final weights are shown in FIG. 21C. In particular, the initial weights in FIG. 21B are the weights pertinent to the standard same block-size case. Thus, the weights in the self block weighting window 280A of FIG. 21B are the same bilinear weights that appear in the weighting window 270C of FIG. 18A, and the weights in the right neighbor weighting window 281A of FIG. 21B are the same bilinear weights that appear in the upper-right quadrant of the weighting window 271C of FIG. 18A In FIG. 21B, the utilized portion 282A consists of an affected area 283A and an unaffected area 284A. The pixels of the self block that relate to the affected area 283A are affected in the OBMC procedure by an affecting area 285A of the right neighbor weighting window 281A. The pixels of the self block that relate to the unaffected area 284A are unaffected in the OBMC procedure by an unaffecting area 286A of the right neighbor weighting window 281A.

The weights in FIG. 21C are derived from the weights in FIG. 121B as follows. The weights in the affecting area 285A and the affected area 283A in FIG. 21C are the same as in FIG. 21B. The weights in the unaffecting area 286A in FIG. 21B are added to the corresponding weights in the unaffected area 284A in FIG. 21B to form the weights in the unaffected area 284A in FIG. 21C, and the weights in the unaffecting area 286A in FIG. 21C are set to zero.

The preceding shrinking scheme illustrated in FIGS. 21A-21C avoids over smoothing at motion discontinuities. Since a large block may have a different a motion vector from its small nearest neighbors, the shrinking scheme can reduce over-smoothing at a motion discontinuity. The shrinking scheme can be applied to rectangular as well as the square block sizes discussed supra and the rectangular block sizes are thus within the scope of the present invention. Note, however, that a simple quadtree decomposition may be used to generate an array of square blocks only. An array of rectangular blocks may be effectuated by a horizontal and/or vertical splitting algorithm (e.g., splitting an 8×8 block into two 8×4 blocks or two 4×8 blocks).

For the preceding shrinking scheme illustrated in FIGS. 21A-21C, the nearest neighbor block is a motion block characterized by a motion vector. In contrast, a nearest neighbor block that is an I-BLOCK has no associated motion vector. If the nearest neighbor I-BLOCK does not participate in the OBMC smoothed prediction, however, the nearest neighbor I-BLOCK may create some block artifacts with nearest neighboring motion blocks (i.e., DEFAULT, P-BLOCK, or REVERSE block). Accordingly, the reflecting scheme of the present invention incorporates a nearest neighbor I-BLOCK into the framework of OBMC as discussed infra.

Reflecting Scheme

The reflecting scheme is used if a nearest neighbor is an I-BLOCK. The reflecting scheme reflects the nearest neighbor I-BLOCK weighting back on the self block. This effectively means that the self block's motion vector is used in place of the missing motion vector of the I-BLOCK.

Figures 22A, 22B, 22C:
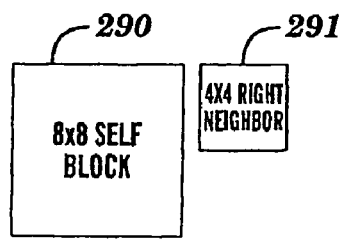
FIGS. 22A through 22C depict weighting windows for a self block and an associated smaller nearest neighboring block used by OBMC in conjunction with a reflecting scheme wherein the nearest neighboring block is an I-BLOCK, in accordance with an exemplary embodiment of the present invention.

FIGS. 22A-22C depict weighting windows for a self block and an associated smaller nearest neighboring block used by OBMC in conjunction with a shrinking scheme, wherein the nearest neighboring block is an I-BLOCK, in accordance with an exemplary embodiment of the present invention. In FIG. 22A, the self block 290 is an 8×8 block, and its right neighbor block 291 is a 4×4 block.

FIG. 22B provides a self block weighting window 290A and its right neighbor weighting window 291A, respectively associated with the self block 290 and the right neighbor block 291 of FIG. 22A. In FIG. 22B, the self block weighting window 290A includes a utilized portion 292A that is utilized in the OBMC procedure in conjunction with the right neighbor weighting window 291A. The utilized portion 292A has the same size as the right neighbor weighting window 291A.

In FIG. 22B, the numerical weights shown are not the final weights but rather are the standard initial weights used for computing the final weights. The final weights are shown in FIG. 22C. In particular, the initial weights in FIG. 22B are the weights pertinent to the standard same block-size case. Thus, the weights in the self block weighting window 290A of FIG. 22B are the same bilinear weights that appear in the weighting window 270C of FIG. 18A, and the weights in the right neighbor weighting window 291A of FIG. 22B are the same bilinear weights that appear in the upper-right quadrant of the weighting window 271C of FIG. 18A The weights in FIG. 22C are derived from the weights in FIG. 22B as follows. The weights in the right neighbor weighting window 291A in FIG. 22B are added to the utilized portion 292A in FIG. 22B to form the weights in the utilized portion 292A in FIG. 22C, and the weights in the right neighbor weighting window 291A in FIG. 21C are set to zero.

Experiments conducted by the inventors of the present invention show that if nearest neighbor I-BLOCKs are not included in the OBMC framework, there may be visible block boundaries between I-BLOCKs and motion compensated blocks, which is explained by the fact that the motion compensated blocks are interframe compensated whereas I-BLOCKs are intraframe interpolated/predicted. After nearest neighbor I-BLOCKs are incorporated into the OBMC framework as discussed supra, most of the block boundaries are eliminated and a slight Peak Signal to Noise Ratio (PSNR) gain is observed.

OBMC Weighting Window Algorithm

Figure 23:
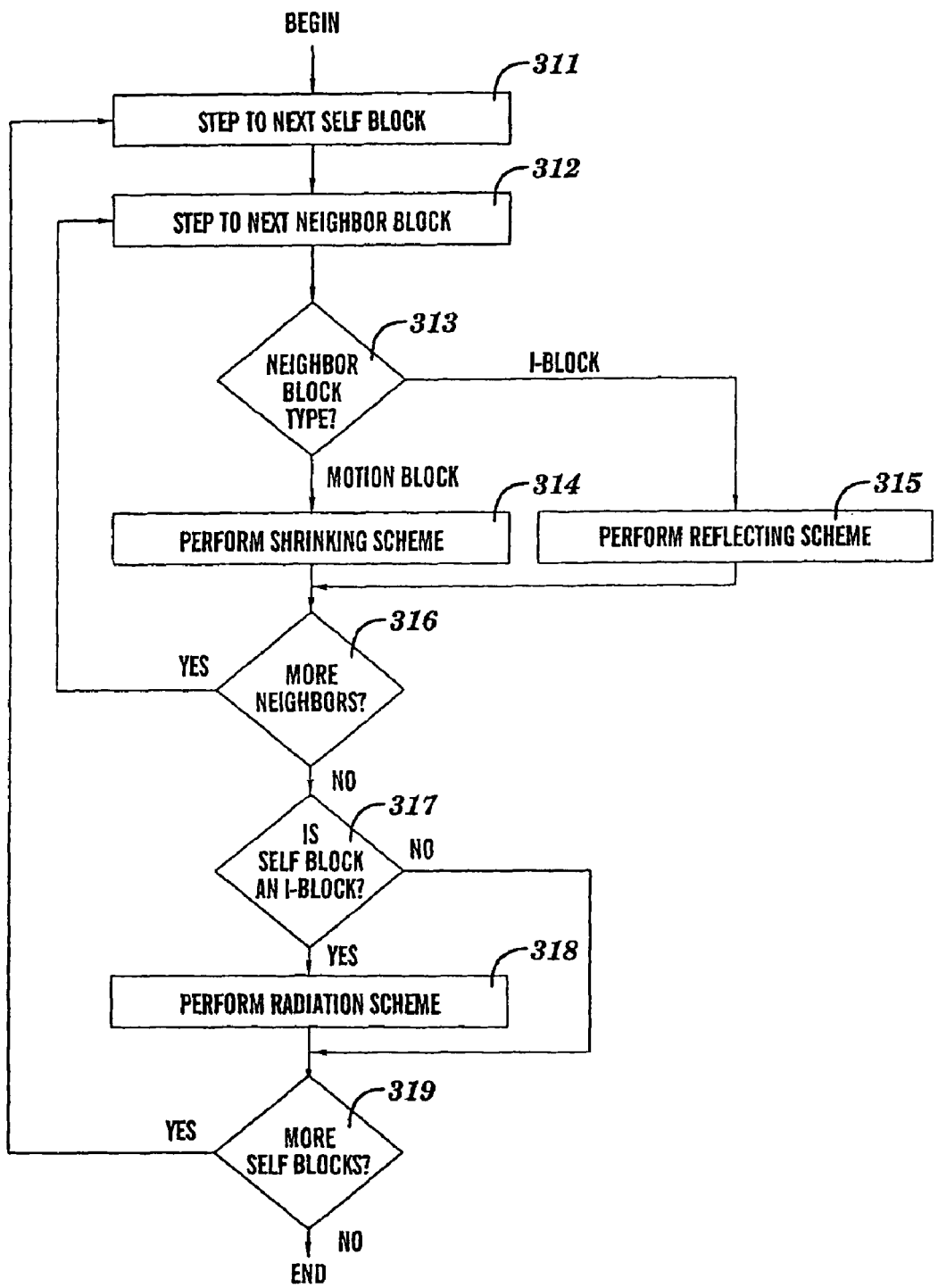
FIG. 23 is a flow chart for calculating weighting windows for variable block-size OBMC, in accordance with an exemplary embodiment of the present invention.
Figure 24:
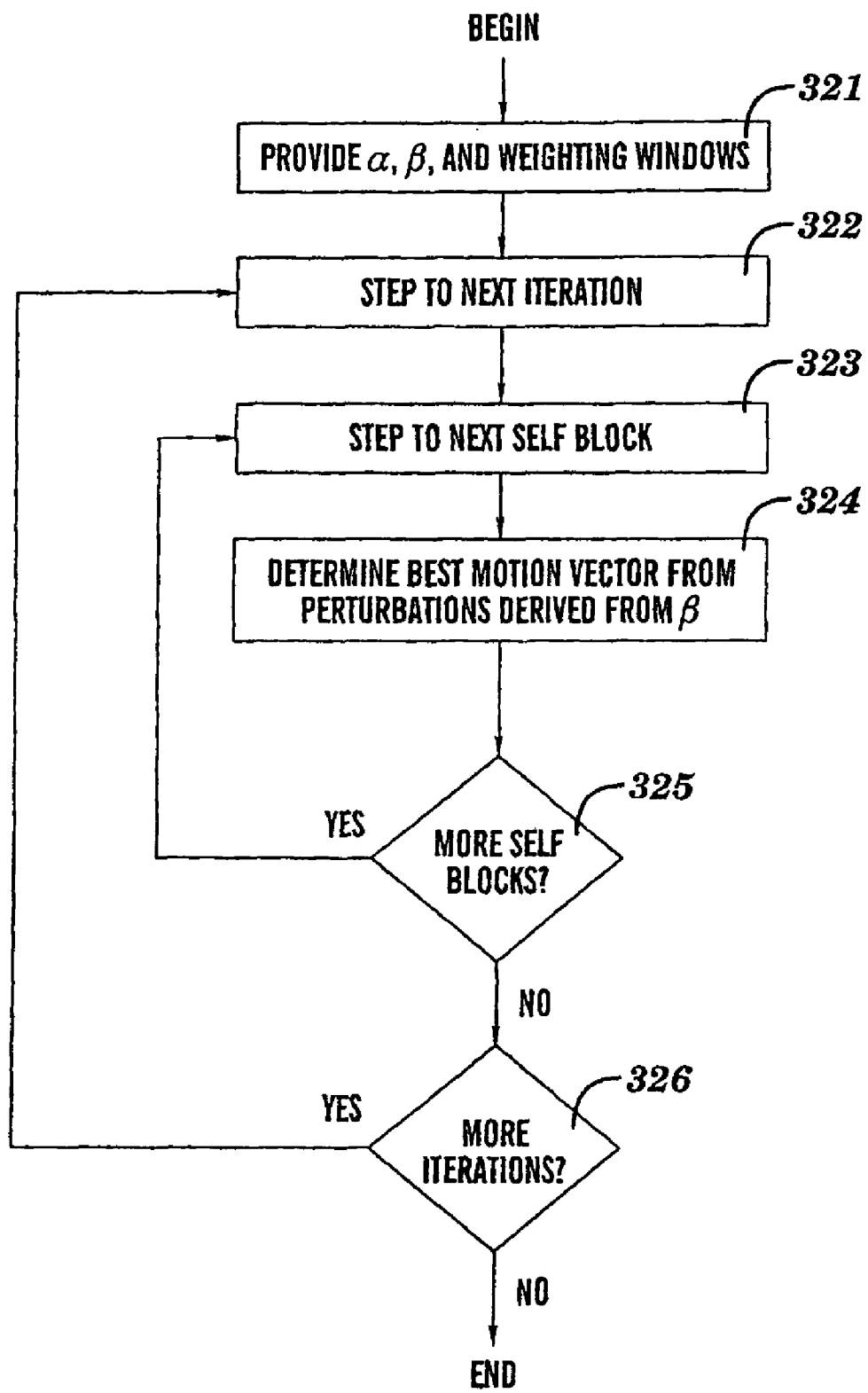
FIG. 24 is a flow chart for calculating successively improved motion vectors for the self blocks of a current frame processed according to variable block size OBMC using the probability weighting windows calculated according to according to the methodology described by the flow charts of FIGS. 13A, 13B, and 23, in accordance with an exemplary embodiment of the present invention.

Based on the preceding discussions of weighting windows for OBMC, FIG. 23 is a flow chart illustrating a method for calculating weighting windows for variable block size OBMC, in accordance with an exemplary embodiment of the present invention. The flow chart of FIG. 23 includes details of operations 221-222 in the flow chart of FIG. 11B discussed supra. The flow chart of FIG. 23 sequentially processes all self blocks in the current frame according to a predetermined scan order.

Operation 311 steps to the next self block to process which initially is the first block to be scanned according to the predetermined scan order. The next self block is processed with respect to its neighbor blocks consisting of the nearest neighbor blocks of the next self block. The neighbor blocks of the self block (i.e., next self block) comprise a first neighbor block. The self block and the first neighbor block may each be a motion block. The self block and the first neighbor block may each be an I-BLOCK. The self block may be a motion block and the first neighbor block may be an I-BLOCK. The self block may be an I-BLOCK and the first neighbor block may be a motion block.

For the self block established in operation 311, operation 312 steps to the next neighbor block which initially is a first neighbor block of a sequence of nearest neighbor blocks around the self block established in operation 311.

In operation 313, it is determined whether the neighbor block is a motion block or an I-BLOCK.

If it is determined that the neighbor block is a motion block then the shrinking scheme is performed in operation 314, followed by execution of operation 316. The shrinking scheme generates the weighting window for the self block and the neighbor block, based on whether the size of the neighbor block is equal to, larger than, or smaller than the size of the self block as discussed supra.

If it is determined that the neighbor block is an I-BLOCK, then the reflecting scheme is performed in operation 315, followed by execution of operation 316. The reflecting scheme generates the weighting window for the self block and the neighbor block in accordance with the procedure described supra in conjunction with FIGS. 22A-22C.

In operation 316, it is determined whether there are more neighbor blocks of the self block to process.

If it is determined that there are more neighbor blocks of the self block to process then the algorithm loops back to operation 312 to step to the next neighbor block to process.

If it is determined that there are no more neighbor blocks of the self block to process then operation 317 is executed.

I operation 317, it is determined whether the self block is an I-BLOCK. If it is determined that the self block is not an I-BLOCK, then operation 319 is executed. If it is determined that the self block is an I-BLOCK, then operation 318 performs the radiation scheme described supra in conjunction with FIG. 17B to modify the weighting window of the self block and its neighbor blocks, followed by execution of operation 319.

In operation 319, it is determined whether there are more self blocks in the frame to process. If it is determined that there are more self blocks in the frame to process, then the algorithm loops back to operation 311 to operation to the next self block to process. If it is determined that there are no more self blocks in the frame to process, then the algorithm ends.

Iterating on OBMC

OBMC allows the nearest neighboring motion vectors to affect the prediction error in the self block, and that makes such a decoupled estimation suboptimal. Moreover, OBMC specifies a non-causal nearest neighborhood, so there is no block scanning order such that, for every block, all its nearest neighbor blocks are scanned before it. Thus, the present invention uses an iterative estimation or search procedure for optimized motion estimation and spatial interpolation/prediction mode selection, which ensures that the mean absolute distortion (MAD) converges to a local minimum.

For each pixel location s (which is a two-dimensional spatial vector) in a self block b, a residual error r(s) for pixel location s is computed as, $$r(s) = I(s) - \sum_{v_s^k(i) \neq v_b^k} h_{1\,or\,2}(i)\tilde{I}(s - v_s^k(i)), \tag{2}$$

where the index i effectuates a summation over the nearest neighbors of the self block b, and k is an iteration index. In Equation (2), the $h_{1\,or\,2}(i)$ are the weighting window coefficients (i.e., weights) of the neighbor blocks i, wherein $h_1(i)$ is used as the weighting window when the self block b is a motion block, and wherein $h_2(i)$ is used as the weighting window when the self block b is an I-BLOCK. In Equation (2), $v_s(i)$ is a motion vector for the neighbor block i at pixel location s, and I(s) is the true pixel value at pixel location s, and $\tilde{I}$ denotes an interpolated value (needed because of sub-pixel accuracy) in the reference frame for the neighbor block pixel. The residual error image r(s) is the motion compensation error that results when vector $v_b^k$, namely the motion vector from the self block b or the spatial interpolation/prediction for the block, is omitted and all the nearest neighbors' motion vectors are fixed. Then, the present invention further optimizes $\hat{v}_b$ for motion blocks or further optimizes $\hat{m}_b$, the spatial interpolation mode, from the spatial interpolation modes permitted for I-BLOCKs, according to, $$\hat{v}_b = \underset{v}{\operatorname{argmin}} \sum_{s(j) \in v_b} |r(s(j)) - h_1(j)\hat{I}_{k-1}(s(j) - v_b)| \tag{3}$$

$$\hat{m}_b = \underset{m}{\operatorname{argmin}} \sum_{s(j) \in v_b} |r(s(j)) - h_2(j)\tilde{I}_k(s(j))| \tag{4}$$

Here $\hat{v}_b$ are the conditional best motion vector, and $\hat{m}_b$ are the conditional best spatial interpolation/prediction mode for block b, $\hat{I}_{k-1}(s(j)-V_b)$ is the motion compensated value with the motion vector from the block b, and $\tilde{I}_k(s(j))$ is the spatial interpolation/prediction value from self block b's nearest neighbors.

The OBMC iterations are controlled by the design parameters α and β, i.e., a predetermined total or maximum number of iterations α and an adjustment distance β for the motion vectors at each iteration. For example α=4 may be chosen. For example, motion vector perturbation parameter β=2 (corresponding to motion vector perturbations in proportionality to a fraction of a pixel unit in the orthogonal X and Y directions (e.g., horizontal and vertical directions, respectively): −4/8, −2/8, 0, +2/8, +4/8) may be chosen. Since the X and Y perturbations are independent, β=2 represents the preceding 5 perturbations in each of the X and Y directions for a total of 25 different directions of the motion vector at each iteration. Equations (3) and (4) determine which of the 25 motion vector perturbations is the best choice for the motion vector at each self block. When the best motion vector at each self block is so determined at a given iteration, the best motion vector is perturbed in accordance with β in the next iteration to determine a further improved value of the motion vector at each self block. The convergence speed is very fast, but it can be switched off to reduce computational complexity, resulting in a modest suboptimality, depending on the video clip.

Since bi-directional color HVSBM runs on both luminance and chrominance data, it follows naturally that the OBMC iterations may be applied to YUV simultaneously. U and V are sub-sampled frame data after K some transform from RGB data. Thus, the weighting windows used for U and V are also sub-sampled versions of those used for Y.

Based on the preceding discussion, the iterative estimation approach of the present invention for OBMC ("OBMC iterations") computes successively improved sets of motion vectors for each self block of the current frame for a fixed number (α) of iterations or until a convergence criteria is satisfied.

FIG. 24 is a flow chart illustrating a method for calculating successively improved motion vectors for the self blocks of a current frame processed according to variable block size OBMC using the weighting windows calculated according to the methodology described by the flow charts of FIGS. 13A, 13B, and 23, in accordance with an exemplary embodiment of the present invention. The calculated weighting windows constitute inputs to the OBMC iterations and do not change during the OBMC iterations.

In operation 321, α, β, and the weighting windows are provided as inputs.

Operation 322 steps to the next iteration to execute which initially is the first iteration.

For the iteration established in operation 322, operation 323 steps to the next self block to process which initially is the first block to be scanned according to a predetermined scan order.

In operation 324, the best motion vector for the self block selected from the perturbed β-based motion vectors, is determined using Equations (3) or (4) in conjunction with Equation (2).

In operation 325, it is determined whether there are more self blocks in the frame to process. If it is determined that there are more self blocks in the frame to process, then the algorithm loops back to operation 323 to step to the next self block to process. If it is determined that there are no more self blocks in the frame to process, then operation 326 is next executed.

I operation 326, it is determined whether there are more iterations to perform.

If it is determined that there are more iterations to perform then the algorithm loops back to operation 322 to step to the next iteration.

If it is determined that there are no more iterations to perform then the algorithm ends. There may be no more iterations to perform, because the number of iteration performed is equal to α. There may also be no more iterations to perform, because a predetermined convergence criteria for the updated motion vectors has been satisfied. For example, a convergence criteria may be, inter alia, that the mean square fractional change in the motion vectors (individually at each self block, or summed over all self blocks) from the immediately previous iteration to the present iteration is less than a predetermined tolerance. In a first exemplary embodiment, only α. is used in operation 326 to determine whether there are more iterations to perform. In a second exemplary embodiment, only a convergence criteria is used in operation 326 to determine whether there are more iterations to perform. In a third exemplary embodiment, both α. and a convergence criteria are used in operation 326 to determine whether there are more iterations to perform.

Modification of Lifting-Based MCTF

The present invention performs OBMC in a lifting implementation for DEFAULT blocks, i.e. with the prediction and update steps as normal in order to reduce the noise in the area of good motion. The specific equations for OBMC in lifting implementation are as follows, $$H[m,n] = \frac{1}{\sqrt{2}} A[m,n] - \frac{1}{\sqrt{2}} \sum_k h_k[m,n] \tilde{B}[m - d_{mk}, n - d_{nk}], \quad (5)$$

$$L[m - \bar{d}_m, n - \bar{d}_n] = \tilde{H}[m - \bar{d}_m + d_m, n - \bar{d}_n + d_n] + \sqrt{2} B[m - \bar{d}_m, n - \bar{d}_n]. \quad (6)$$

OBMC regards the motion vector field $(d_m, d_n)$ as random process. That means that pixel B[m, n] in frame B has motion vector $(d_{mk}, d_{nk})$ with probability $h_k[m, n]$ from its corresponding probability window as stated earlier, and is compensated by the weighted average of the predicted sub-pixels. In Equations (5) and (6), $(\bar{d}_m, \bar{d}_n)$ is the nearest integer to $(d_m, d_n)$. Although the form of the low temporal frame seems the same as that without OBMC, actually OBMC affects both high temporal frame and low temporal frame. The low temporal frames from OBMC are still visually preferred and more suitable for further stages of MCTF.

Scalable Coding for Motion Vector

Referring back to FIG. 14, in the scalable video coder MC-EZBC, prior to the coding of frame data, motion estimation is performed using hierarchical variable size block matching (HVSBM) 231 and a full motion vector quad-tree is formed between each frame pairs. Then the quad-tree is pruned in a rate-distortion sense. Due to a Haar filter, pixel values in low temporal frames are scaled up by a factor of √2 as a temporal level decreases. Motion compensated temporal filtering (MCTF) 234 is performed using the pruned motion vectors and produces high temporal frames and low temporal frames as mentioned above. MCTF will continue between the low temporal frames until a bottom temporal level. Finally, one temporal low frame and a set of high temporal frames are coded by an embedded zero block coder 235. Because of the properties of the embedded zero block coder 235 and the pyramid structure of MCTF, the temporal signal-to-noise ratio (SNR), and resolution scalability of frame data, i.e., texture data, are obtained.

The bitstream of motion vectors in each temporal layer can have temporal scalability after being grouped with the bitstream of frame data in that temporal layer. However, the bitstream of motion vectors is not still scalable with respect to SNR and resolution. The bitstream of motion vectors produced according to the prior art is optimized only in some range of bit rates at full resolution and is not optimized for low rates. More especially, in low resolution cases, the same number of motion vectors as that in full resolution are not required because a block size decreases and many motion vectors can be merged or replaced by only one representative. Furthermore, at low resolution, since motion vectors are scaled down, the full-accuracy motion vectors as that in full resolution are not required.

Therefore, to provide not only temporal scalability but also SNR and resolution scalability to the bitstream of motion vectors, the present invention suggests a method and apparatus for separating a motion vector into a basic layer and an enhancement layer according to pixel accuracies and a method and apparatus for separating motion vectors into a base layer including only motion vectors corresponding to blocks having a predetermined size or larger and an enhancement layer including only motion vectors corresponding to blocks smaller than the predetermined size.

First, motion vector estimation in the coding of motion vectors in each layer according to an embodiment of the present invention will be described.

Figure 25:
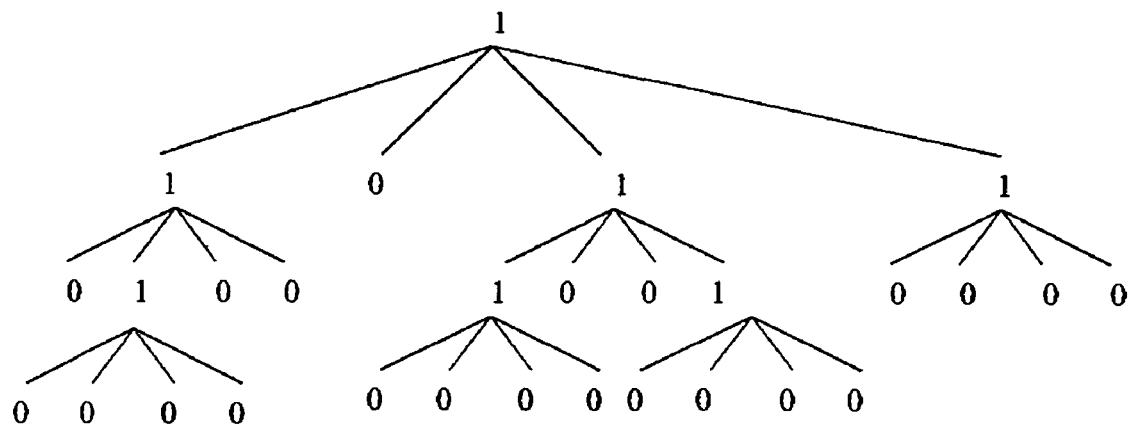
FIG. 25 illustrates an example of a quad-tree dividing map resulting from motion estimation according to an embodiment of the present invention.
Figure 26:
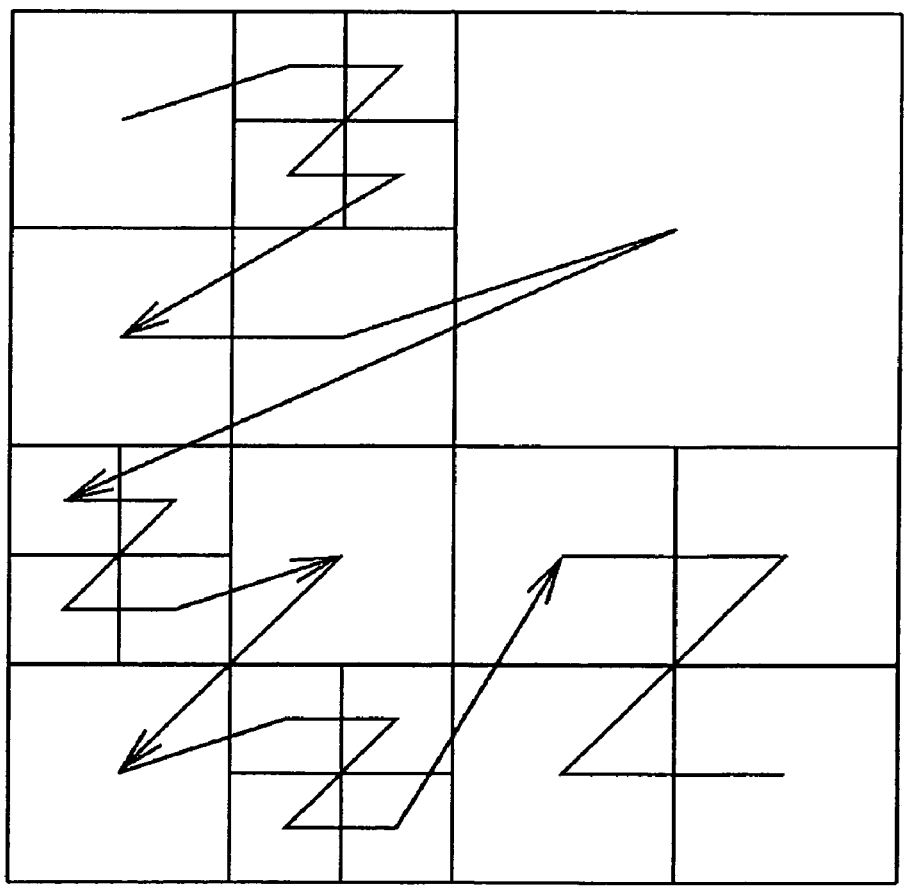
FIG. 26 illustrates the scan order of frames and blocks divided according to the quad-tree dividing map of FIG. 25.

FIG. 25 illustrates an example of a quad-tree dividing map resulting from motion estimation according to an embodiment of the present invention, and FIG. 26 illustrates the scan order of frames and blocks divided according to the quad-tree dividing map of FIG. 25.

Motion vector data resulting from motion estimation with respect to each frame using HVSBM includes a motion vector dividing map and motion vector information. The motion vector dividing map should be transmitted due to a non-uniform block structure. A 64×64 parent block and a quad-tree dividing map corresponding thereto are illustrated as an example in FIG. 25. In FIG. 25, each leaf node or terminal node is indicated by 0 and other intermediate nodes are indicated by 1. In other words, a block corresponding to the node 0 is not further divided into smaller blocks through variable size block motion estimation and a block corresponding to the node 1 is further divided into smaller blocks.

For the encoding of motion vectors, both an encoder and a decoder follows a quad-tree scan order as illustrated in FIG. 26. According to the quad-tree scan order, motion vectors of blocks are read by scanning the blocks left-to-right and top-to-bottom. In the encoding of motion vectors, it is desirable to encode only a difference between a previously encoded motion vector and a current motion vector along the scanning path, instead of to encode the x and y components of a motion vector of each block. In particular, in a scalable motion vector coding method according to the present invention, a motion vector for a current block is estimated based on the types of motion vectors of neighboring blocks scanned along the scanning path and a difference between the estimated motion vector and the actual motion vector of the current block is encoded using CABAC.

Figure 27:
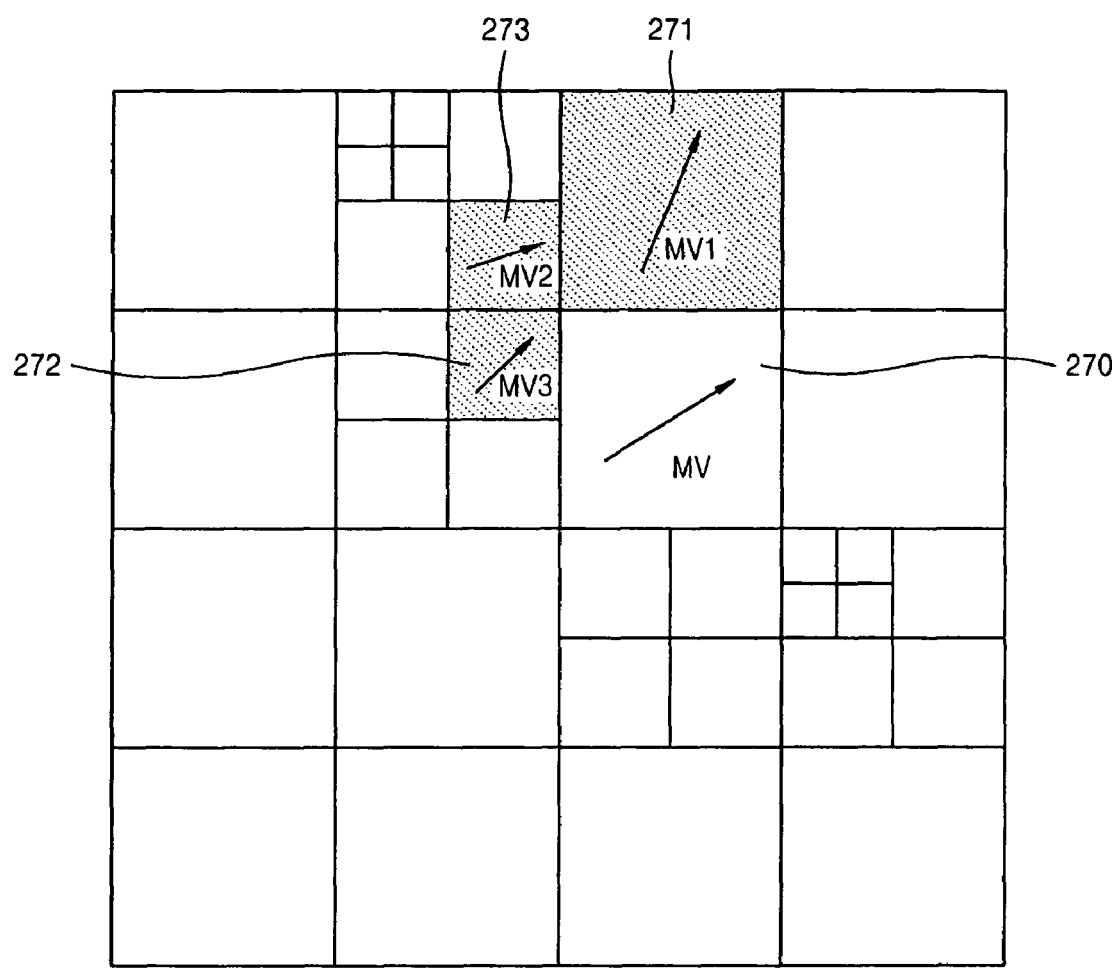
FIG. 27 is a view for explaining the spatial prediction of a motion vector of a current block from neighboring blocks according to an embodiment of the present invention.

FIG. 27 is a view for explaining the spatial prediction of a motion vector of a current block from neighboring blocks according to an embodiment of the present invention.

According to the foregoing scan order, a motion vector MV of a current block 270 can be spatially predicted from motion vectors MV1, MV2, and MV3 of three direct neighboring blocks 271, 272, and 273 of the current block 270. For example, the motion vector MV of the current block 270 may be predicted to be the average or median of the motion vectors MV1, MV2, and MV3 of the direct neighboring blocks 271, 272, and 273. In particular, in an embodiment of the present invention, for the prediction of the motion vector MV of the current block 270, a motion vector of the same type as the motion vector MV of the current block 270 is used among the motion vectors MV1, MV2, and MV3. Referring back to FIG. 15, there are four types of blocks to be encoded according to the present invention: DEFAULT blocks with prediction and update steps in lifting implementation between current and next frames, P-BLOCKs with a prediction operation from a next frame only, REVERSE blocks with prediction from a previous frame only, and I-BLOCKs with spatial prediction from neighboring pixels in the same frame. Motion vectors in the DEFAULT blocks and the P-BLOCKs are between current and next frames (defined as normal motion vectors), the motion vectors in the REVERSE blocks are between current and previous frames (defined as reverse motion vectors), and there is no motion vector in the I-BLOCKs except for a spatial prediction mode.

The characteristics of the normal motion vectors and the reserve motion vectors are quite different from each other in the coding of the motion vectors. For this reason, the two sets of motion vectors are separately predicted and coded, thereby improving the prediction and coding efficiency. Thus, in an embodiment of the present invention, a motion vector of a current block is predicted using motion vectors of neighboring blocks having the same type as the motion vector of the current block. For example, when the motion vector MV of the current block 270 is a normal motion vector in FIG. 27, i.e., is between current and next frames, a motion vector having the same type as the motion vector MV, i.e., a normal motion vector among the motion vectors MV1, MV2, and MV3 of the neighboring blocks 271, 272, and 273 of the current block 270 is used for the prediction of the motion vector MV of the current block 270. If there is no normal motion vector among the motion vectors MV1, MV2, and MV3 of the neighboring blocks 271, 272, and 273 of the current block 270, the motion vector MV of the current block 270 is predicted using a normal motion vector among motion vectors of previous blocks scanned according to the quad-tree scan order illustrated in FIG. 26. Next, a prediction residual between a predicted motion vector and an actual motion vector is coded by CABAC. In the following description, the foregoing combined spatial and scan-order prediction is consistently applied to the coding of a motion vector of each block in each layer.

Hereinafter, a description will be made regarding alphabet general partition (AGP) in which a motion vector is separated into a base layer and an enhancement layer according to pixel accuracies for scalable motion vector coding according to an embodiment of the present invention.

Figure 28:
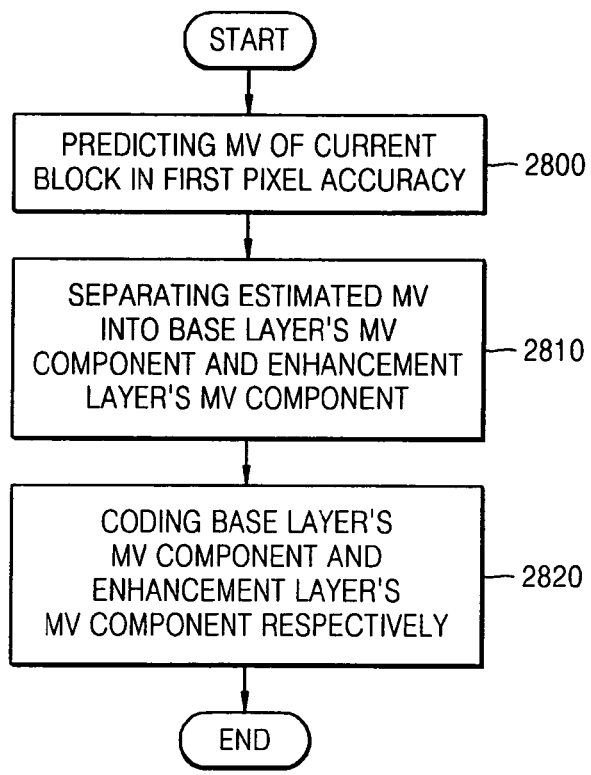
FIG. 28 is a flowchart illustrating a scalable motion vector coding method according to an embodiment of the present invention, in which a motion vector is separated into a base layer and an enhancement layer according to pixel accuracies.
Figure 29:
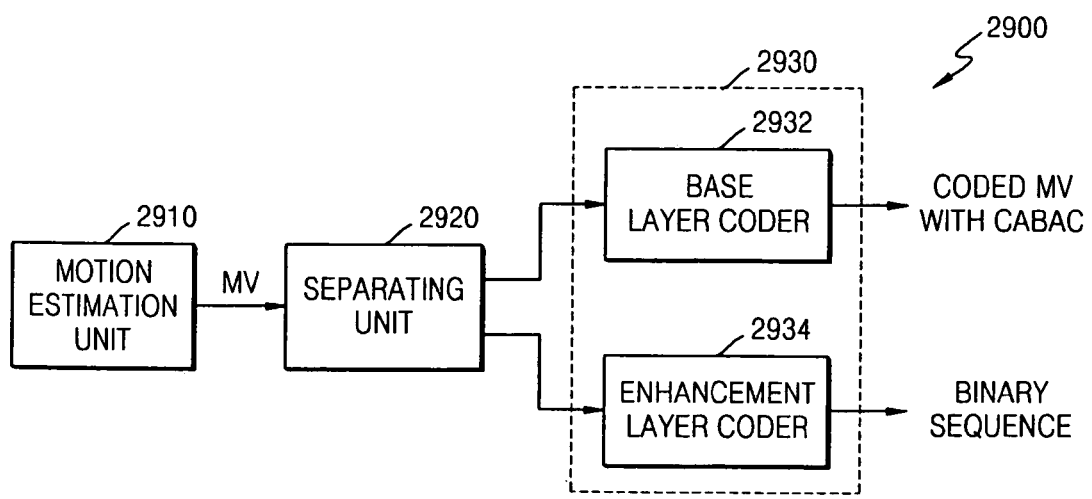
FIG. 29 is a block diagram of a scalable motion vector coder according to an embodiment of the present invention.
Figure 30:
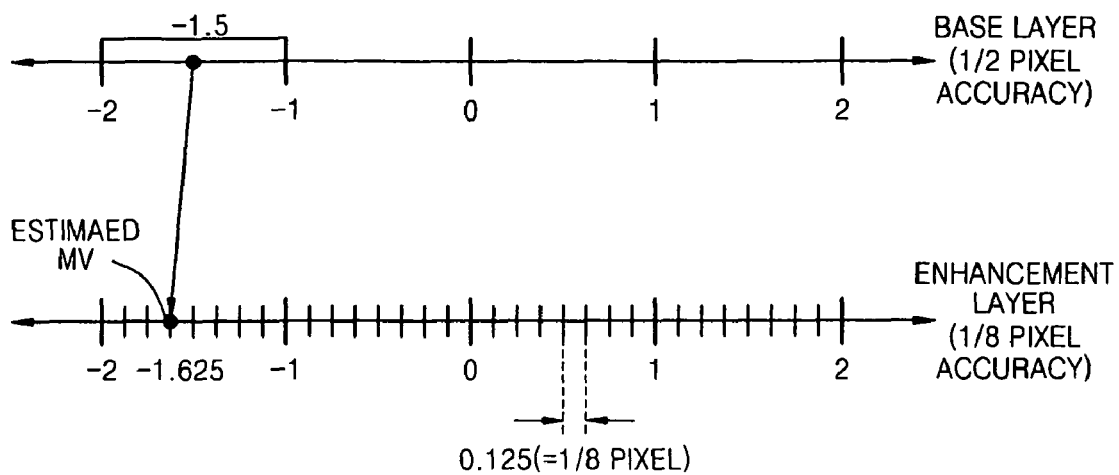
FIG. 30 illustrates division of a motion vector according to pixel accuracies according to an embodiment of the present invention.

FIG. 28 is a flowchart illustrating a scalable motion vector coding method according to an embodiment of the present invention, in which a motion vector is separated into a base layer and an enhancement layer according to pixel accuracies. FIG. 29 is a block diagram of a scalable motion vector coder according to an embodiment of the present invention. FIG. 30 illustrates division of a motion vector according to pixel accuracies according to an embodiment of the present invention.

Referring to FIG. 28, a motion vector of a current block is estimated with a first pixel accuracy in operation 2800. In MC-EZBC, the motion estimation of the current block is performed with a ⅛ pixel accuracy. Although the pixel accuracy can reduce a mean squared error (MSE) after motion compensation, a ¼ or ⅛ pixel accuracy of motion vectors is quite random due to the camera noise and quantization noise because the MSE after motion compensation is already near a total noise variance after ¼ or ⅛ pixel accuracy motion compensation. Thus, the motion vector can be modeled as follows (the one dimensional case is presented for convenience of explanation although the motion vector has two components such as x and y components). However, the spirit of the present invention can also be applied to scalable motion vector coding for a motion vector in other dimensions.

$$r_k = s_k + n_k \tag{7}$$

where $r_k$ is an estimated kth motion vector, $s_k$ is an actual kth motion vector, and $n_k$ is a noisy motion vector due to noises in frame data. All of the three components $r_k$, $s_k$, and $n_k$ are assumed to be in the ⅛ pixel accuracy.

Since noises in frame data are quite small, they only contaminate ¼ and ⅛ pixel accuracies of the estimated motion vector during motion estimation. In the scalable motion vector coding method according to an embodiment of the present invention, the estimated motion vector $r_k$ is separated into two symbols in operation 2810, as follows:

$$r_k = r_{k1} + r_{k2} \quad (8),$$

where $r_{k1}$ is a major symbol up to the ½ pixel accuracy and $r_{k2}$ is a sub-symbol for the ¼ and ⅛ pixel accuracies. For example, if the estimated motion vector $r_k = -1.625$, then $r_{k1} = -1.5$ and $r_{k2} = -0.125$. As such, in the scalable motion vector coding method according to an embodiment of the present invention, the estimated motion vector $r_k$ is separated into a major symbol having low pixel accuracy and a sub-symbol having high pixel accuracy corresponding to a difference between the actual value of the estimated motion vector and the major symbol. Here, the major symbol forms a base layer of the motion vector and the sub-symbol forms an enhancement layer of the motion vector. In an embodiment of the present invention, the major symbol is estimated from motion vectors of neighboring blocks of a current block based on a predetermined scan order and the type of a motion vector to be estimated and a residual between the estimated motion vector and the actual motion vector is coded using CABAC, as described with reference to FIGS. 26 and 27. The sub-symbol is coded in a binary sequence in operation 2820.

Except for one case, it is not necessary to code the sign of the sub-symbol because the signs of the sub-symbol and the major symbol are the same. In the above example, since the major symbol $r_{k1} = -1.5$, it can be seen that the sign of the sub-symbol $r_{k2}$ is negative and thus, the sub-symbol $r_{k2}$ can be coded as 0.125. The exceptional case is for motion vectors in a range [−0.375, +0.375]. For those motion vectors, the major symbol $r_{k1} = 0$. In this case, the sign of the sub-symbol cannot be known from the major symbol. For this case, a sign bit indicating whether the sub-symbol is positive or negative may be added to the bitstream of motion vectors.

Figure 31:
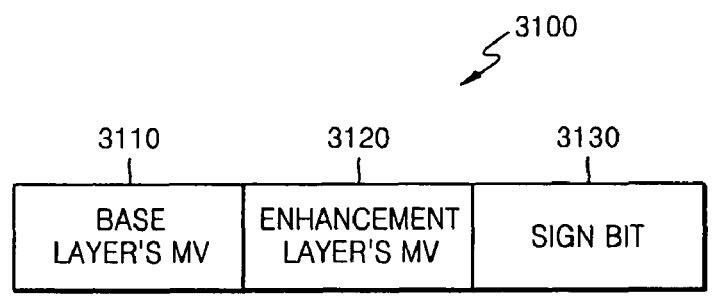
FIG. 31 illustrates a motion vector bitstream 3100 produced according to an embodiment of the present invention.

FIG. 31 illustrates a motion vector bitstream 3100 produced according to an embodiment of the present invention. Referring to FIG. 31, the motion vector bitstream 3100 includes base layer's motion vectors 3110 composed of major symbols having low pixel accuracy, enhancement layer's motion vectors 3120 composed of sub-symbols having high pixel accuracy, and sign bits 3130 indicating the signs of the sub-symbols. As mentioned above, the sign bits 3130 are added when the major symbols are 0, e.g., the base layer's motion vectors 3110 having the ⅛ pixel accuracy are in the range [−0.375, +0.375].

At high rates and full resolution, all the three parts of the motion vector bitstream 3100, i.e., the base layer's motion vectors 3110, the enhancement layer's motion vectors 3120, and the sign bits 3130, are transmitted. In this case, the lossless motion vectors can be obtained and frames can be reconstructed at a decoder. However, at low rates, the enhancement layer's motion vectors 3120 and the sign bits 3130 are thrown away and only the base layer's motion vectors 3110 are transmitted. In this case, by substituting frame data for the enhancement layer's motion vectors 3120 and the sign bits 3130 in the motion vector bitstream 3100, a limited bandwidth can be efficiently used in the same bit budget in spite of lossy motion vectors. In other words, although the motion vectors are lossy, their inaccuracy can be compensated by the more accuracy of frame data. The total performance can be improved by separating motion vectors according to pixel accuracies and substituting frame data for enhancement layer's motion vectors according to channel states.

In addition, at low resolution, since the motion vectors are scaled down in MC-EZBC, the same accuracy for motion vectors as that in full resolution are not required. Thus, the sub-symbol and sign bit parts can be thrown away and the saved bits can be spent on frame data.

Referring back to FIG. 29, a scalable motion vector coder 2900 according to an embodiment of the present invention includes a motion estimation unit 2910, a separating unit 2920, and a motion vector coding unit 2930.

The motion estimation unit 2910 performs HVSBM (231 of FIG. 14) to estimate an actual motion vector of a current block with a first pixel accuracy. Here, the first pixel accuracy is the ⅛ pixel accuracy.

A set of motion vectors for each frame, obtained through motion estimation of the motion estimation unit 2910, is input to the separating unit 2920. The separating unit 2920 separates the estimated motion vectors having the first pixel accuracy into base layer's motion vector components having a low second pixel accuracy and enhancement layer's motion vector components having a high third pixel accuracy. Here, the second pixel accuracy may be the ½ pixel accuracy and the third pixel accuracy may be the ¼ or ⅛ pixel accuracy.

The motion vector coding unit 2930 includes a base layer coder 2932 for coding the base layer's motion vector components and an enhancement layer coder 2934 for coding the enhancement layer's motion vector components. The base layer coder 2932 scans motion vectors of blocks of a current frame according to a predetermined scan order, estimates a base layer of a motion vector of a current block from motion vectors of neighboring blocks of the current block having the same type as the motion vector of the current block, and codes a residual between the estimated base layer and the actual base layer of the motion vector of the current block using CABAC. The enhancement layer coder 2934 codes sub-symbols of the enhancement layer in a binary sequence.

In the foregoing description, a motion vector may also be separated into a base layer and at least two enhancement layers according to additionally subdivided pixel accuracies. Although the sub-symbol is coded in a binary sequence in the foregoing description, it may also be coded using CABAC.

Hereinafter, a scalable motion vector coding method according to another embodiment of the present invention will be described.

In general, in a scalable image, after one spatial level down, a block size is halved. In other words, 16×16, 8×8, and 4×4 blocks become 8×8, 4×4, and 2×2 blocks. After one or two spatial level down, the same number of motion vectors as those at full resolution are not required. Moreover, the motion vectors are also scaled down by a factor of 2 after one spatial level-down. If adjacent two motion vectors have a difference less than 2 pixels at full resolution, then in half resolution they have a difference less than 1 pixel. For these two motion vectors, they can be replaced by any one of them. In the scalable motion vector coding method according to another embodiment of the present invention, by merging blocks smaller than a predetermined size using the foregoing fact, a motion vector field has a layered structure composed of a base layer including only motion vectors of blocks of a predetermined size or larger and an enhancement layer including only motion vectors of blocks smaller than the predetermined size.

Figure 32:
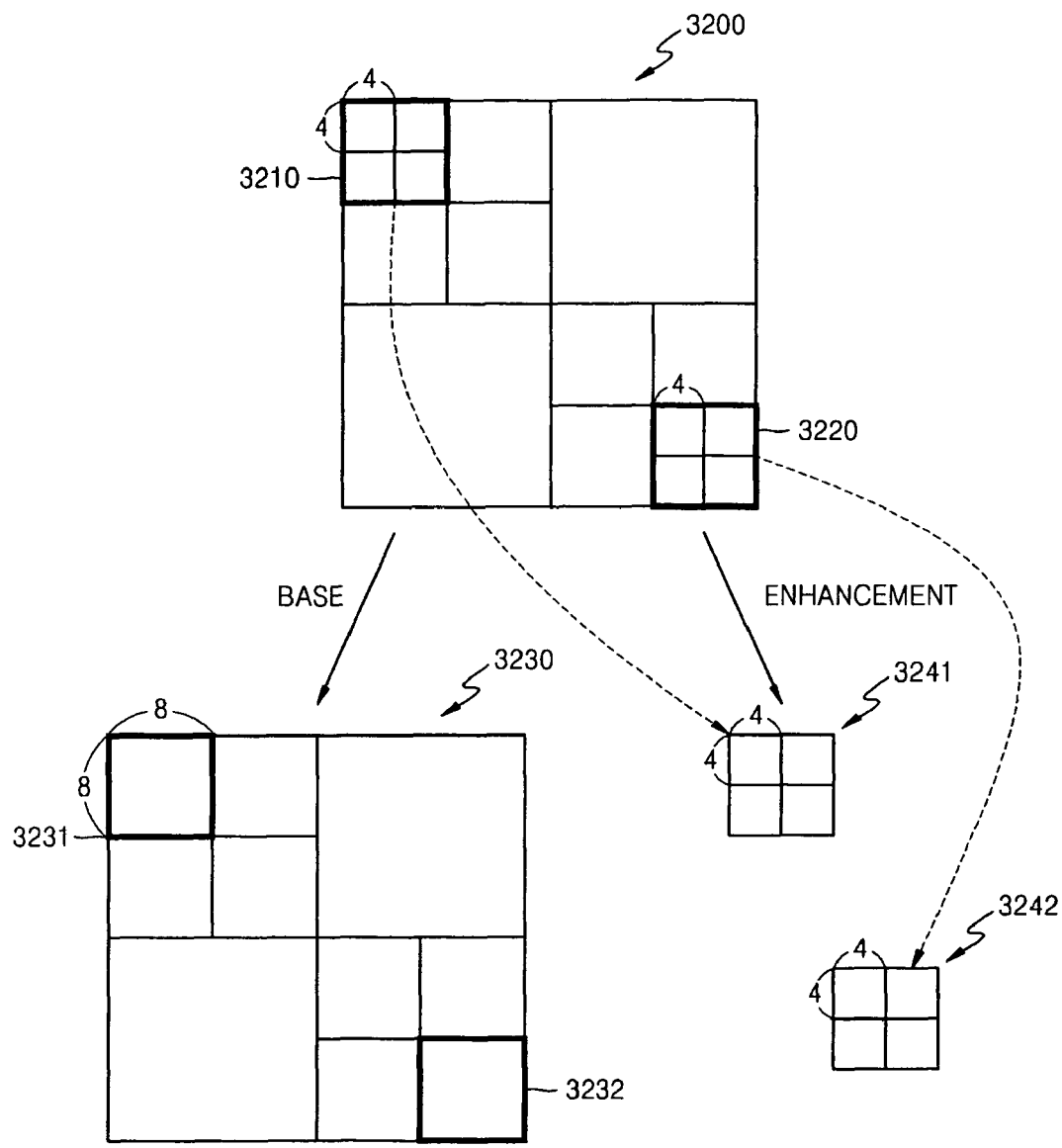
FIG. 32 is a view for explaining a layered structure of a motion vector, applied to the scalable motion vector coding method according to another embodiment of the present invention.

FIG. 32 is a view for explaining a layered structure of a motion vector, applied to the scalable motion vector coding method according to another embodiment of the present invention.

In the scalable motion vector coding method according to another embodiment of the present invention, among blocks estimated using VSBM, small blocks smaller than the predetermined size are merged to form a larger block and a representative motion vector selected among motion vectors of the small blocks is assigned to the formed larger block. In this way, a base layer having only motion vectors of blocks of a predetermined size or larger is formed and motion vectors of blocks of a predetermined size or smaller to be merged are formed as an enhancement layer.

It is assumed that a predetermined block 3200 of a current frame is divided as shown in FIG. 32 after motion estimation using VSBM. A 64×64 block of the current frame may b& divided into 4×4 blocks using HVSBM, but the block 3200 has a size of 32×32 in FIG. 32 for convenience of explanation. As mentioned above, in the scalable motion vector coding method according to another embodiment of the present invention, small blocks of a predetermined size or smaller are merged into a larger block and a representative motion vector among motion vectors of the small blocks is assigned to the larger block. Here, the first motion vector in the quad-tree scan order of FIG. 26 may be determined to be the representative motion vector based on the type of the motion vector. In other words, in the scalable motion vector coding method according to another embodiment of the present invention, in the determination of the representative motion vector, the first normal motion vector and the first reverse motion vector among motion vectors of blocks scanned in the quad-tree scan order are assigned to the larger block based on the type of the motion vector. For example, by merging four 4×4 blocks 3210 corresponding to children nodes in the quad-tree structure as a result of HVSBM into a single 8×8 block 3231, a base layer including only motion vectors of 8×8 or larger blocks is formed. The first normal motion vector and the first reverse motion vector among motion vectors of the four 4×4 blocks 3210 scanned in the quad-tree scan order are assigned to the 8×8 block 3231 into which the four 4×4 blocks 3210 are merged. Similarly, four 4×4 blocks 3220 corresponding to children nodes in the quad-tree structure are merged into a single 8×8 block 3232 and the first normal motion vector and the first reverse motion vector among motion vectors of the four 4×4 blocks 3220 are assigned to the 8×8 block 3232.

Motion vectors of the four 4×4 blocks 3210 and the four 4×4 blocks 3220 form enhancement layers 3241 and 3242 and are coded independently of a base layer 3230 including motion vectors of 8×8 or larger blocks.

In the scalable motion vector coding method according to another embodiment of the present invention, since the normal motion vector and the reverse motion vector have different characteristics, the normal motion vector and the reverse motion vector are assigned to the larger block to reserve the representative normal motion vector to be assigned to a block having the normal motion vector among four children nodes and the representative reverse motion vector to be assigned to a block having the reverse motion vector among the four children nodes.

Figure 33:
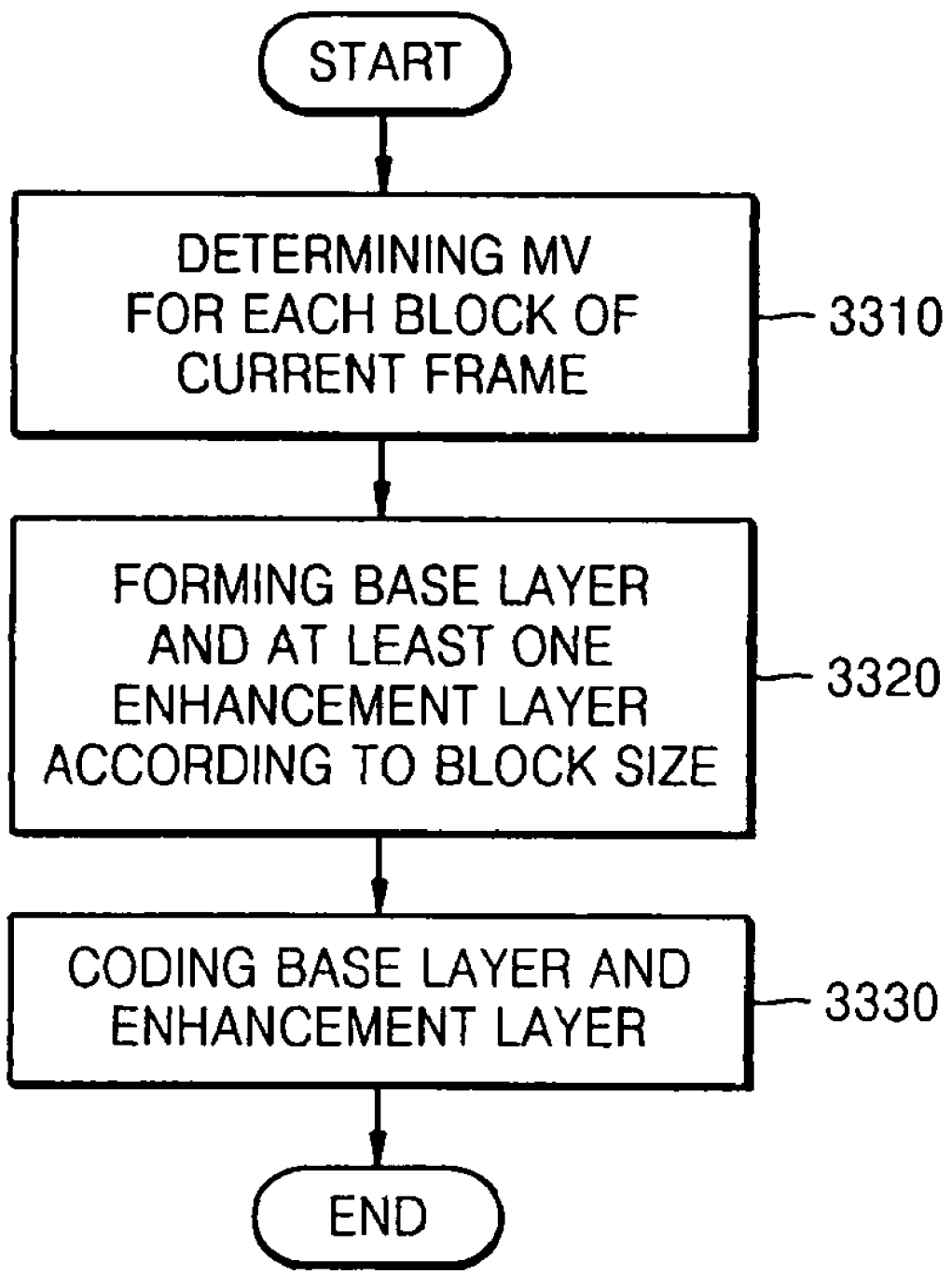
FIG. 33 is a flowchart illustrating the scalable motion vector coding method according to another embodiment of the present invention.

FIG. 33 is a flowchart illustrating the scalable motion vector coding method according to another embodiment of the present invention.

Referring to FIG. 33, a current frame is divided into a plurality of blocks and motion estimation is performed to determine a motion vector for each block in operation 3310. As mentioned above, HVSBM may be used to determine the motion vector for each block.

By using motion vectors of the divided blocks, a base layer including motion vectors of blocks of a predetermined size or larger and at least one enhancement layer including motion vectors of blocks smaller than the predetermined size are formed in operation 3320. At this time, blocks corresponding to parent nodes in the quad-tree structure are assigned a normal motion vector and a reverse motion vector as representative motion vectors, which are selected among motion vectors of children nodes according to a sub-sample selection scheme to be described later.

The base layer and the enhancement layer are coded in operation 3330. For the coding of the base layer and the enhancement layer, blocks of the base layer and the enhancement layer are scanned-according to a predetermined scan order, a motion vector of a current block is estimated from motion vectors of neighboring blocks of the current block based on the type of the motion vector, and a residual between the estimated motion vector and the actual motion vector is coded using CABAC.

Figure 34:
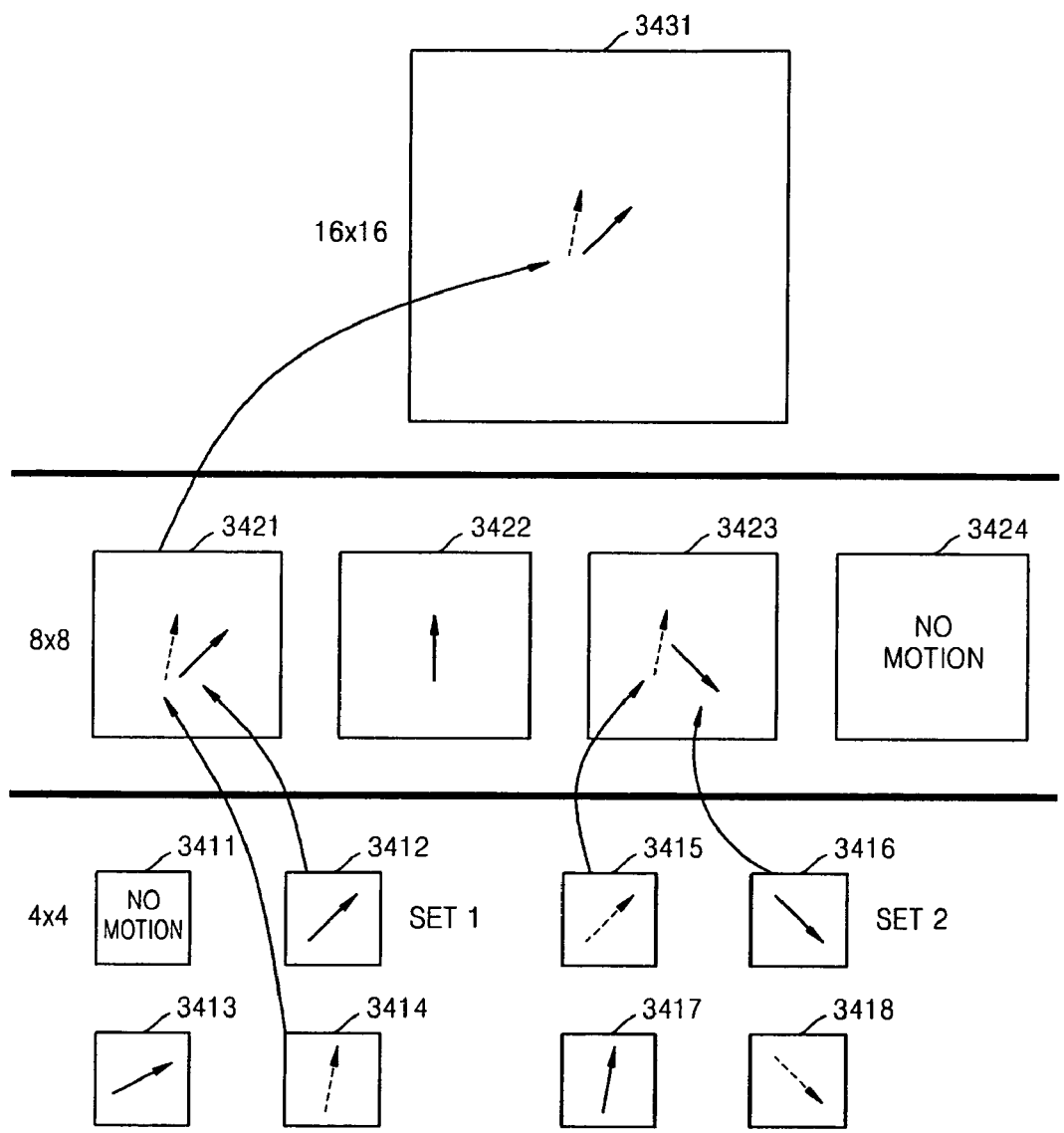
FIG. 34 is a view for explaining a sub-sample selection scheme applied to a layered structure of a motion vector according to another embodiment of the present invention.

FIG. 34 is a view for explaining a sub-sample selection scheme applied to a layered structure of a motion vector according to another embodiment of the present invention. In FIG. 34, a dotted arrow indicates a reverse motion vector and a solid arrow indicates a normal motion vector.

Referring to FIG. 34, representative normal and reverse motion vectors are selected from four 4×4 children blocks and are assigned to an 8×8 parent block as illustrated in Set 1 and Set 2 of FIG. 34. The first normal and reverse motion vectors in the quad-tree scan order of FIG. 26 may be selected as the representative normal and reverse motion vectors. For example, a normal motion vector of a 4×4 block 3412 having the first normal motion vector according to the quad-tree scan order is assigned as the representative normal motion vector to an 8×8 parent block 3412. A reverse motion vector of a 4×4 block 3414 having the first reverse motion vector is assigned as the representative reverse motion vector to the 8×8 parent block 3412.

Motion vectors of blocks having sizes larger than or equal to 8×8 are coded as a base layer and motion vectors of 4×4 blocks are coded as an enhancement layer. Then a two-layer structure for motion vector coding is formed. When the first normal and reverse motion vectors according to the quad-tree scan order are assigned to the 8×8 block and coded as a base layer, since the first normal and reverse motion vectors in the four 4×4 children blocks have already been coded at the base layer, it is not necessary to code them again in the enhancement layer. Thus, the total number of coded motion vectors is the same as that of coded motion vectors without a layered structure.

In the case of a large channel bandwidth, i.e., at high rates, both the base layer and enhancement layer of motion vectors can be transmitted. In this case, at a decoder, motion vectors can be reconstructed without distortion. In the case of a small channel bandwidth, i.e., at low rates, the enhancement layer may be thrown away and more bits may be spent on frame data. Then in four grouped 4×4 blocks, all the normal motion vectors are replaced by their corresponding representatives in their 8×8 parent blocks.

Figure 36:
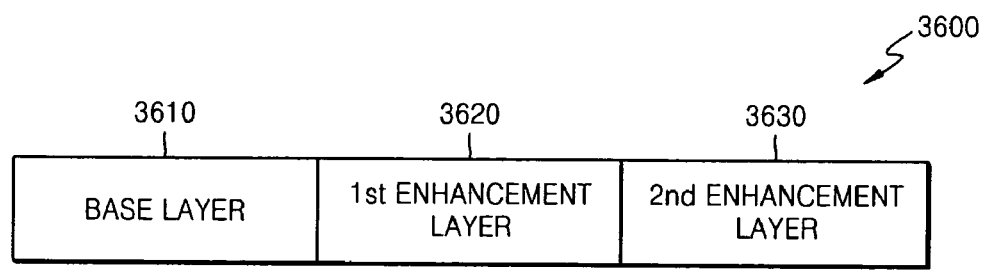
FIG. 36 illustrates a bitstream produced by the scalable motion vector coding method and the scalable motion vector coder according to another embodiment of the present invention.

When the motion vectors are layered into a base layer and at least one enhancement layer, four 8×8 parent blocks are merged into a 16×16 block again and normal and reverse motion vectors selected from motion vectors of the 8×8 children blocks are assigned to the 16×16 block, thereby forming a three-layer structure for motion vector coding. FIG. 36 illustrates a motion vector bitstream 3600 when the motion vectors having the three-layer structure are coded. In the three-layer structure for motion vector coding, motion vectors of blocks having sizes larger than or equal to 16×16 form a base layer, motion vectors of 8×8 blocks having children nodes form a first enhancement layer, and motion vectors of 4×4 blocks form a second enhancement layer. In this case, at a decoder, when only base layer's motion vectors are received due to a limit of a channel bandwidth, motion vectors of the 16×16 block are replaced by motion vectors of children blocks of the 16×16 block. For example, in FIG. 34, if the decoder receives a base layer including only motion vectors of blocks having sizes larger than or equal to 16×16, it replaces all the reverse motion vectors of 8×8 and 4×4 blocks divided according to received block map information by the reverse motion vector of the top-most 16×16 block. Similarly, if the decoder receives a base layer including only motion vectors of blocks larger than 16×16, it replaces all the normal motion vectors of 8×8 and 4×4 blocks divided according to received block map information by a normal motion vector of the top-most 16×16 block.

In addition to the three-layer structure, the motion vectors may also have a four-layered structure. By merging four 16×16 blocks into a 32×32 block and assigning representative normal and reverse motion vectors selected among motion vectors of the four 16×16 blocks to the 32×32 block, the four-layered structure may include a base layer composed of motion vectors of blocks-larger than 32×32, a first enhancement layer composed of motion vectors of the 16×16 blocks, a second enhancement layer composed of motion vectors of the 8×8 blocks, and a third enhancement layer composed of motion vectors of the 4×4 blocks.

When each motion vector layer is coded, motion vector estimation using the foregoing scan order and neighboring blocks is used. In other words, as described with reference to FIGS. 26 and 27, if at least one of neighboring blocks located above, to the left of, and above and to the left of a current block has a motion vector having the same type as a motion vector of the current block (i.e., a normal or reverse motion vector), the motion vector of the current block may be estimated from the same-type motion vector of the neighboring block. If there is no the same-type motion vector in any of the neighboring blocks, the motion vector of the current block may be estimated from the same-type motion vector of a previously processed block in the quad-tree scan order.

Figure 35:
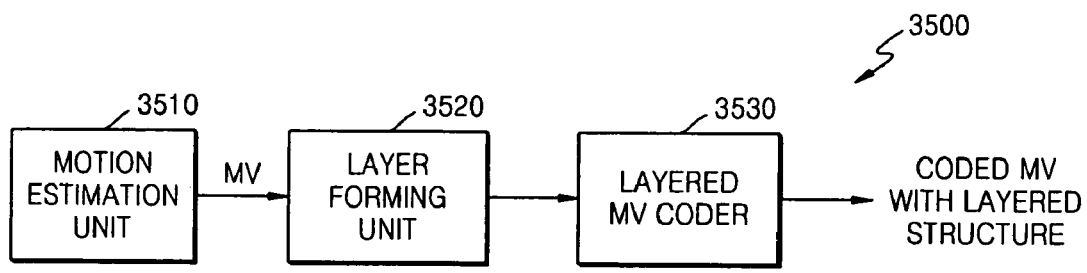
FIG. 35 is a block diagram of a scalable motion vector coder 3500 according to another embodiment of the present invention.

FIG. 35 is a block diagram of a scalable motion vector coder 3500 according to another embodiment of the present invention.

Referring to FIG. 35, the scalable motion vector coder 3500 includes a motion estimation unit 3510, a layer forming unit 3520, and a layered motion vector coder 3530.

The motion estimation unit 3510 divides a current frame into a plurality of blocks and performs motion estimation to determine a motion vector for each of the divided blocks through HVSBM (231 of FIG. 14).

A set of motion vectors of each frame, obtained through motion estimation of the motion estimation unit 3510, is input to the layer forming unit 3520. The layer forming unit 3520 forms a base layer including motion vectors of blocks larger than or equal to a predetermined size and at least one enhancement layer including motion vectors of blocks smaller than the predetermined size, using the motion vectors of the divided blocks. As mentioned above, the layer forming unit 3520 selects normal and reverse motion vectors as representative motion vectors from motion vectors of children nodes according to the sub-sample selection scheme and assigns the selected normal and reverse motion vectors to a large block corresponding to a parent node.

The layered motion vector coder 3530 scans motion vectors of the base layer and the enhancement layer according to a predetermined scan order, estimates a motion vector of a current block from motion vectors of neighboring blocks having the same type as the motion vector of the current block, and codes a residual between the estimated motion vector and the actual motion vector using CABAC. In the coding of the enhancement layer, all information up to this enhancement layer, i.e., an updated motion field and updated context model information in a previous layer, may be used.

The scalable motion vector coding method according to an embodiment of the present invention may be replaced by a conventional motion vector coding method selectively according to encoded motion vectors and predetermined rate distortion (RD) costs. This is because motion-vector coding into a layered structure according to another embodiment of the present invention does not have a large influence on a reconstructed image of a smooth image due to a small difference between motion vectors, but may aggravate distortion of a reconstructed image of a complicated image. Thus, by comparing RD costs of bitstreams generated by motion vector coding into a layered structure according to another embodiment of the present invention and conventional motion vector coding into a non-layered structure, the two coding methods may be selectively used according to the result of comparison.

FIG. 36 illustrates a bitstream produced by the scalable motion vector coding method and the scalable motion vector coder according to another embodiment of the present invention. In FIG. 36, the bitstream is produced for motion vectors have a three-layer structure including one base layer and two enhancement layers.

Referring to FIG. 36, when motion vectors are coded into a three layer, a base layer 3610 includes motion vector information of blocks having sizes equal to or larger than 16×16, a first enhancement layer 3620 includes motion vector information of 8×8 blocks, and a second enhancement layer 3630 includes motion vector information of 4×4 blocks. As mentioned above, the motion vector information of all the layers can be transmitted at high rates, but motion vector information of the base layer 3610 or the motion vector information of the first enhancement layer 3620 can be selectively transmitted according to a channel status.

Figure 37:
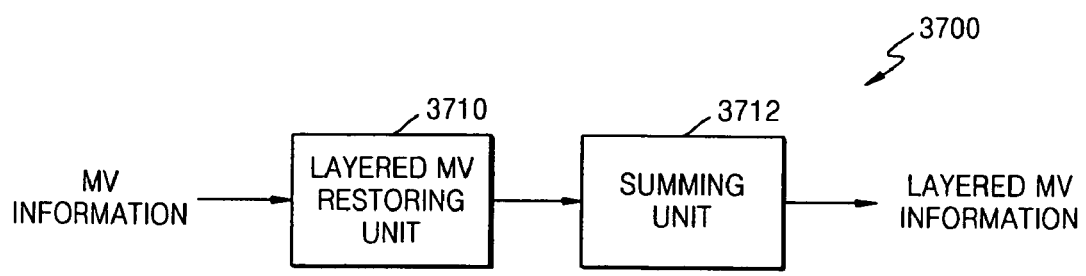
FIG. 37 is a block diagram of a scalable motion vector decoder 3700 according to an embodiment of the present invention.

FIG. 37 is a block diagram of a scalable motion vector decoder 3700 according to an embodiment of the present invention.

Referring to FIG. 37, the scalable motion vector decoder 3700 includes a layered motion vector restoring unit 3710 and a summing unit 3712.

The layered motion vector restoring unit 3710 extracts layered motion vector information coded according to an embodiment of the present invention from an input bitstream and analyzes the extracted motion vector information to read motion information of each layer. Motion vector information coded according to an embodiment of the present invention includes motion vector components of a base layer and an enhancement layer having different pixel accuracies. Motion vector information coded according to another embodiment of the present invention includes a base layer composed of motion vectors of blocks larger than or equal to a predetermined size and at least one enhancement layer composed of motion vectors of blocks smaller than the predetermined size. The layered motion vector restoring unit 3710 restores motion vectors of the base layer and the enhancement layer by decoding the layered motion vector information.

The summing unit 3712 outputs the motion vectors of the base layer restored by the layered motion vector restoring unit 3710 if the received bitstream includes only motion vector information of the base layer. If the received bitstream includes motion vector information of the base layer and the enhancement layer, the summing unit 3712 adds the motion vector components of the enhancement layer to the motion vector components of the base layer, thereby outputting layered motion vector information.

Meanwhile, the present invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (e.g., transmission over the Internet). The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scalable motion vector coding method comprising:
   estimating, by a scalable motion vector coder, a motion vector of a current block with a first pixel accuracy;
   separating, by the scalable motion vector coder, the estimated motion vector into a base layer motion vector component having a second pixel accuracy and an enhancement layer motion vector component having a third pixel accuracy; and
   coding, by the scalable motion vector coder, the base layer motion vector component and the enhancement layer motion vector component.

2. The scalable motion vector coding method of claim 1, further comprising estimating the base layer motion vector component using motion vectors of neighboring blocks of the current block, which are previously processed according to a predetermined scan order.

3. The scalable motion vector coding method of claim 2, further comprising coding a difference between the base layer motion vector component estimated using the motion vector of the neighboring blocks and an actual base layer motion vector component using context-based adaptive binary arithmetic coding.

4. The scalable motion vector coding method of claim 2, wherein the estimating the base layer motion vector component comprises estimating the base layer motion vector component using an average or a median of the motion vectors of the neighboring blocks.

5. The scalable motion vector coding method of claim 2, wherein the neighboring blocks are located above, to the left of, and above and to the left of the current block.

6. The scalable motion vector coding method of claim 2, further comprising:
   identifying a type of the motion vector of the current block according to whether a reference frame indicated by the motion vector of the current block estimated with the first pixel accuracy is a previous or next frame of the current frame; and
   estimating the base layer motion vector component using motion vectors of the neighboring blocks having the same type as the motion vector of the current block among the neighboring blocks previously processed according to the predetermined scan order.

7. The scalable motion vector coding method of claim 2, wherein the predetermined scan order is a quad-tree scan order.

8. The scalable motion vector coding method of claim 1, wherein the enhancement layer motion vector component is coded in a binary sequence.

9. The scalable motion vector coding method of claim 1, wherein the second pixel accuracy is lower than the first pixel accuracy, and the third pixel accuracy is higher than the second pixel accuracy.

10. The scalable motion vector coding method of claim 1, wherein the first pixel accuracy is a ⅛ pixel accuracy, the second pixel accuracy is a ½ pixel accuracy, and the third pixel accuracy is one of a ¼ pixel accuracy and the ⅛ pixel accuracy.

11. The scalable motion vector coding method of claim 1, further comprising adding a bit indicating a sign of the enhancement layer motion vector if the separated base layer motion vector component is 0.

12. A scalable motion vector coder comprising:
    a motion estimation unit which estimates a motion vector of a current block with a first pixel accuracy;
    a separating unit which separates the estimated motion vector into a base layer motion vector component having a second pixel accuracy and an enhancement layer motion vector component having a third pixel accuracy; and
    a motion vector coding unit which codes the base layer motion vector component and the enhancement layer motion vector component.

13. The scalable motion vector coder of claim 12, wherein the motion vector coding unit estimates the base layer motion vector component using motion vectors of neighboring blocks of the current block, which are previously processed according to a predetermined scan order.

14. The scalable motion vector coder of claim 13, wherein the motion vector coding unit codes a difference between the base layer motion vector component estimated using the motion vector of the neighboring blocks and an actual base layer motion vector component using context-based adaptive binary arithmetic coding.

15. The scalable motion vector coder of claim 13, wherein the estimated base layer motion vector component is estimated using an average or a median of the motion vectors of the neighboring blocks.

16. The scalable motion vector coder of claim 13, wherein the neighboring blocks are located above, to the left of, and above and to the left of the current block.

17. The scalable motion vector coder of claim 13, wherein the motion vector coding unit identifies a type of the motion vector of the current block according to whether a reference frame indicated by the motion vector of the current block estimated with the first pixel accuracy is a previous or next frame of the current frame and estimates the base layer motion vector component using motion vectors of the neighboring blocks having the same type as the motion vector of the current block among the neighboring blocks previously processed according to the predetermined scan order.

18. The scalable motion vector coder of claim 13, wherein the predetermined scan order is a quad-tree scan order.

19. The scalable motion vector coder of claim 12, wherein the motion vector coding unit comprises an enhancement layer coding unit that codes the enhancement layer motion vector component in a binary sequence.

20. The scalable motion vector coder of claim 12, wherein the second pixel accuracy is lower than the first pixel accuracy and the third pixel accuracy is higher than the second pixel accuracy.

21. The scalable motion vector coder of claim 12, wherein the first pixel accuracy is a ⅛ pixel accuracy, the second pixel accuracy is a ½ pixel accuracy, and the third pixel accuracy is one of a ¼ pixel accuracy and the ⅛ pixel accuracy.

22. The scalable motion vector coder of claim 12, wherein the motion vector coding unit adds a bit indicating the sign of the enhancement layer motion vector if the separated base layer's motion vector component is 0.

23. A scalable motion vector decoding method for decoding a motion vector coded into a base layer and an enhancement layer, the comprising:

extracting, by a scalable motion vector decoder, motion vector information by analyzing an input bitstream;

restoring, by the scalable motion vector decoder, motion vector components of the base layer and the enhancement layer from the extracted motion vector information; and summing, by the scalable motion vector decoder, the restored motion vector components of the base layer and the enhancement layer to generate a layered motion vector, wherein the base layer has a pixel accuracy that is lower than that of an estimated motion vector and the enhancement layer has a pixel accuracy that is higher than that of the motion vector component of the base layer.

24. A scalable motion vector decoder for decoding a motion vector coded into a base layer and an enhancement layer, the decoder comprising:

a motion vector restoring unit which extracts motion vector information by analyzing an input bitstream and restoring motion vector components of the base layer and the enhancement layer from the extracted motion vector information; and a summing unit which sums the restored motion vector components of the base layer and the enhancement layer to generate a layered motion vector, wherein the base layer has a pixel accuracy that is lower than that of an estimated motion vector and the enhancement layer has a pixel accuracy that is higher than that of the motion vector component of the base layer.

* * * * *